US011148703B2

(12) United States Patent
Sugishita et al.

(10) Patent No.: US 11,148,703 B2
(45) Date of Patent: Oct. 19, 2021

(54) SUPPORT BRACKET FOR STEERING APPARATUS AND STEERING APPARATUS

(71) Applicant: NSK Ltd., Tokyo (JP)

(72) Inventors: Suguru Sugishita, Maebashi (JP); Naoki Kabe, Maebashi (JP)

(73) Assignee: NSK Ltd., Tokyo (JP)

( * ) Notice: Subject to any disclaimer, the term of this patent is extended or adjusted under 35 U.S.C. 154(b) by 67 days.

(21) Appl. No.: 16/606,379

(22) PCT Filed: Nov. 1, 2017

(86) PCT No.: PCT/JP2017/039470
§ 371 (c)(1),
(2) Date: Oct. 18, 2019

(87) PCT Pub. No.: WO2018/193657
PCT Pub. Date: Oct. 25, 2018

(65) Prior Publication Data
US 2020/0189642 A1 Jun. 18, 2020

(30) Foreign Application Priority Data
Apr. 21, 2017 (JP) .............................. JP2017-084226

(51) Int. Cl.
B62D 1/16 (2006.01)
B62D 1/185 (2006.01)
B62D 1/187 (2006.01)

(52) U.S. Cl.
CPC ............... B62D 1/16 (2013.01); B62D 1/185 (2013.01); B62D 1/187 (2013.01)

(58) Field of Classification Search
CPC .......... B62D 1/16; B62D 1/185; B62D 1/187; B62D 1/195; B62D 1/184; B60R 25/021
See application file for complete search history.

(56) References Cited

U.S. PATENT DOCUMENTS 5,481,938 A 1/1996 Stuedemann et al.
6,139,057 A 10/2000 Olgren et al.
(Continued)

FOREIGN PATENT DOCUMENTS

JP 2008/201339 A 9/2008
JP 2008-265646 A 11/2008
(Continued)

OTHER PUBLICATIONS

English translation of document C2 (Japanese-language Written Opinion (PCT/ISA/237) previously filed on Oct. 18, 2019) issued in PCT Application No. PCT/JP2017/039470 dated Jan. 30, 2018 (eight (8) pages).
(Continued)

Primary Examiner — Drew J Brown
(74) Attorney, Agent, or Firm — Crowell & Moring LLP

(57) ABSTRACT

Construction for reinforcing the strength of a pair of support plate sections is achieved. Upper end edges of the pair of support plate sections are fastened to a bottom surface of a bridge plate section of an installation plate section via lug sections for welding. A reinforcing member comprising a protrusion which is convex on the outside in the width direction and concave on the inside in the width direction is provided from the upper end section to the lower end section of the front-end section of each one of the pair of support plate sections.

21 Claims, 48 Drawing Sheets

(56) References Cited

U.S. PATENT DOCUMENTS

| | | | |
|---|---|---|---|
| 8,984,984 B2 | 3/2015 | Yokota et al. | |
| 9,522,692 B2* | 12/2016 | Takahashi | B62D 1/195 |
| 10,059,363 B2* | 8/2018 | Sugishita | B62D 1/185 |
| 2012/0272778 A1 | 11/2012 | Okada et al. | |
| 2013/0213173 A1 | 8/2013 | Moriyama | |
| 2014/0053677 A1 | 2/2014 | Sakata | |
| 2014/0251061 A1 | 9/2014 | Moriyama | |
| 2015/0107398 A1 | 4/2015 | Nagasawa et al. | |
| 2015/0122075 A1* | 5/2015 | Mihara | B62D 1/184 74/493 |
| 2016/0167694 A1 | 6/2016 | Hagiwara et al. | |
| 2016/0167695 A1* | 6/2016 | Hagiwara | B62D 1/192 74/493 |
| 2019/0300041 A1* | 10/2019 | Kurokawa | B62D 1/189 |
| 2021/0009186 A1* | 1/2021 | Sugishita | B62D 1/18 |

FOREIGN PATENT DOCUMENTS

| | | |
|---|---|---|
| JP | 2013-95284 A | 5/2013 |
| JP | 2013-116700 A | 6/2013 |
| JP | 2014-15120 A | 1/2014 |
| JP | 2014-040181 A | 3/2014 |
| JP | 2014-58200 A | 4/2014 |
| JP | 2014-104871 A | 6/2014 |
| JP | 2015-214291 A | 12/2015 |
| JP | 2016-188070 A | 11/2016 |
| JP | 2016-222056 A | 12/2016 |
| JP | 2017-74884 A | 4/2017 |
| KR | 10-2014-0053646 A | 5/2014 |
| WO | WO 2014/163112 A1 | 10/2014 |

OTHER PUBLICATIONS

International Search Report (PCT/ISA/210) issued in PCT Application No. PCT/JP2017/039470 dated Jan. 30, 2018 with English translation (four (4) pages).

Japanese-language Written Opinion (PCT/ISA/237) issued in PCT Application No. PCT/JP2017/039470 dated Jan. 30, 2018 (six (6) pages).

European Search Report issued in European Application No. 17906624.6 dated Apr. 14, 2020 (four pages).

* cited by examiner

US 11,148,703 B2

SUPPORT BRACKET FOR STEERING APPARATUS AND STEERING APPARATUS

TECHNICAL FIELD

The present invention relates to a support bracket for steering apparatus for supporting a steering column on a vehicle body, and to a steering apparatus comprising this support bracket for steering apparatus.

BACKGROUND ART

As illustrated in FIG. 54, the steering apparatus for applying steering angle to steered wheels transmits movement of the steering wheel 1 to a steering gear unit via the steering shaft 2 so as to apply a steering angle to the left and right steered wheels 3. As such steering apparatus, steering apparatus that enables adjustment of the position of the steering wheel in accordance with the size and operating posture of the operator is known.

FIG. 55 and FIG. 56 illustrate an example of a steering apparatus having a conventional configuration disclosed in JP2014-104871(A). This steering apparatus comprises a tilt and telescoping mechanism that is able to adjust the up-down position and the forward-backward position of the steering wheel 1 in accordance with the size and operating posture of the operator, and further comprises an electric power steering apparatus. This steering apparatus comprises a steering shaft 2 to which the steering wheel 1 is fastened at the rear-end section (right end section in FIG. 55), a steering column 4 in which this steering shaft 2 is rotatably supported, a steering force assisting apparatus 5 for applying an auxiliary torque to this steering shaft 2, and a steering gear unit 7 for displacing tie rods 6 based on the rotation of the steering shaft 2. In this specification, unless otherwise stated, the forward-backward direction is the forward-backward direction of the vehicle body to which the steering apparatus is installed, the width direction is the width direction of the vehicle body, and the up-down direction is the up-down direction of the vehicle body.

The steering shaft 2 is constructed by combining an inner shaft 8 that is located on the front side and an outer shaft 9 that is located on the rear side so as to be able to transmit rotation force and to be able to relatively displace in the axial direction. The inner shaft 8 and the outer shaft 9 enable adjustment of the forward-backward position of the steering wheel 1 by relatively displacing in the axial direction, and also have a function to contract the whole length of the steering shaft 2 during a collision accident.

The steering column 4 is constructed by externally fitting the front-end side section of the outer column 11 that is located on the rear side onto the rear-end side section of the inner column 10 that is located on the front side so as to be able to relatively displace in the axial direction, and enables adjustment of the forward-backward position of the steering wheel 1 as well as has a function to contract the whole length of the steering column 4 together with the steering shaft 2 during a collision accident. The front-end section of the inner column 10 (left end section in FIG. 55) is connected to and fastened to the rear-end surface of the gear housing 12 of the steering force assisting apparatus 5. The inner shaft 8 is inserted into the gear housing 12, and the front-end section of the inner shaft 8 is connected to the input shaft of the steering force assisting apparatus 5. The front-end section of the output shaft 13 of the steering force assisting apparatus 5, which is connected to this input shaft via a torsion bar, is protruded from the front-end surface of the gear housing 12.

The inner column 10 is supported by part of the vehicle body 15 via a gear housing 12 and a lower bracket 14. The lower bracket 14 supports the gear housing 12 around the tilt axis 16 that is located in the width direction so as to be freely swingable.

A section near the front-end of the outer column 11 is supported by part of the vehicle body 15 via a support bracket 17. The support bracket 17 is supported by the vehicle body 15 so as to be able to break away in the forward direction when a strong impact load in the forward direction is applied thereto.

In order to enable adjustment of the forward-backward position and the up-down position of the steering wheel 1, the outer column 11 is supported so as to be able to move in the forward-backward direction and the up-down direction with respect to the support bracket 17. Therefore, a slit 19 that extends in the axial direction of the outer column 11 is provided in the bottom surface of the front-end section of the outer column 11 and a pair of clamp sections 20 is integrally formed with the outer column 11 on both sides in the width direction of the slit 19. In positions that are aligned with each other of the pair of clamp sections 20, a telescopic adjustment long hole 21 that extends in the forward-backward direction is respectively formed. Further, a pair of support plate sections 22 is provided in the support bracket 17 on both sides in the width direction of the pair of clamp sections 20. A tilt adjustment long hole 23 that extends in the up-down direction is respectively provided in sections that are aligned with each other in part of the pair of support plate sections 22 and are aligned with a part in the forward-backward direction of the pair of telescopic adjustment long holes 21.

In a state where the pair of clamp sections 20 is held by the pair of support plate sections 22 of the support bracket 17, the adjustment rod 24 is inserted though the pair of telescopic adjustment long holes 21 and the pair of tilt adjustment long holes 23 in the width direction (left and right direction in FIG. 56). An adjustment nut 25 is screwed onto the other end of the adjustment rod 24, and this adjustment nut 25 is able to rotate by the adjustment lever 26.

By rotating the adjustment nut 25 based on the operation of the adjustment lever 26 to change the space between this adjustment nut 25 (one of the pressing sections) and the anchor section 27 of the adjustment rod 24 (the other of the pressing sections), the outer column 11 can be fixed or unfixed to the support bracket 17, and by changing the space between the pair of clamp sections 20, the outer column 11 can be fixed or unfixed to the inner column 10. In the present example, the pair of pressing sections is composed of the adjustment nut 25 and the anchor section 27 of the adjustment rod 24. In a state where the space between the adjustment nut 25 and the anchor section 27 is expanded, the outer column 11 is moved in the forward-backward direction (relatively displaces with respect to the inner column 10) within a range where the adjustment rod 24 can displace inside the pair of telescopic adjustment long holes 21 (telescopic adjustment range) so as to adjust the forward-backward position of the steering wheel 1. Further, by moving the steering column 4 in the up-down direction within a range where the adjustment rod 24 can displace inside the pair of tilt adjustment long holes 23 (tilt adjustment range), it is possible to adjust the up-down position of the steering wheel 1. This steering column 4 pivotally displaces in the up-down direction around the tilt axis 16.

The front-end section of the output shaft 13 of the steering force assisting apparatus 5 is connected to the rear-end section of the intermediate shaft 29 via a universal joint 28. The input shaft 31 of the steering gear unit 7 is connected to the front-end section of this intermediate shaft 29 via another universal joint 30. This steering gear unit 7 comprises a rack and a pinion (not shown) and the input shaft 31 is connected to the pinion of these. Tie rods 6 are connected to both end sections of the rack that meshes with this pinion, and a desired steering angle is applied to the steered wheels 3 (see FIG. 55) by pushing and pulling the tie rods 6 based on the displacement in the axial direction of this rack. The steering force assisting apparatus 5 applies an auxiliary torque to the output shaft 13 at a predetermined magnitude in a predetermined direction by an electric motor 32 via a worm reduction gear.

If an anti-thief steering lock apparatus such as disclosed in JP2008-265646(A) is assembled in the steering apparatus of a conventional construction, there is a possibility that problems may arise from the aspect of ensuring durability of the support bracket 17. The steering lock apparatus is constructed by installing a lock unit (keylock cylinder) around the lock through hole 33 that is formed in part of the outer column 11 and installing a key-lock collar in part of the steering shaft 2 respectively. In a state where an ignition key is removed, the key-lock pin that is provided in this lock unit and a key-lock hole (recessed section) that is provided in this key-lock collar engage so as to prevent the steering shaft 2 from rotating with respect to the outer column 11.

If the steering wheel 1 is forced to rotate in a state where such steering lock apparatus is in operation, the torque (twisting force) is sequentially transmitted to the steering shaft 2, the key-lock collar, the lock unit, the outer column 11, and the support bracket 17, and is eventually supported by the vehicle body 15. Between the outer column 11 and the support bracket 17, from the outer column 11, the torque which is transmitted from the lock unit is transmitted to the pair of support plate sections 22 of the support bracket 17. During this, when the strength of the pair of support plate sections 22 is insufficient, the pair of support plate sections 22 plastically deforms and there is a possibility that the outer column 11 cannot be maintained stably.

FIG. 57 illustrates another example of the steering apparatus of the conventional construction that is disclosed in JP2015-214291(A). In this steering apparatus, a nut 25a is fastened to a section that protrudes from the outside surface of the support plate sections 22 of one support plate section of the pair of support plate sections 22 (right side in FIG. 57) of the tip end sections of the adjustment rod 24, and a thrust bearing 91 and a pressing plate 92 are provided between the outside surface of the other of the support plate sections 22 and the nut 25a. An engagement piece 93 is provided on the inside surface of the pressing plate 92 and this engagement piece 93 is engaged with the tilt adjustment long hole 23 that is provided in the one support plate section 22 so as to be able to only displace along this tilt adjustment long hole 23 (in a state where rotation is prevented).

The base end section of the adjustment lever 26 is connected and fastened to a section of the base end section of the adjustment rod 24 which protrudes from the outside surface of the other support plate section 22 of the pair of support plate sections 22 (left side in FIG. 57), and a cam apparatus 78 is provided between the outside surface of the other support plate section 22 and the adjustment lever 26. This cam apparatus 78 expands and contracts the dimension in the axial direction based on the relative displacement of the drive-side cam 94 and the driven-side cam 95. The driven-side cam 95 is engaged with the tilt adjustment long hole 23 that is provided in the other support plate section 22 so as to be able to displace only along this tilt adjustment long hole 23 (in a state where rotation is prevented). On the other hand, the drive-side cam 94 is able to rotate with the adjustment rod 24 by the adjustment lever 26.

When adjusting the position of the steering wheel 1, the drive-side cam 94 is rotated and driven by rotating the adjustment lever 26 in a predetermined direction (generally downwards) so as to contract the dimension in the axial direction of the cam apparatus 78. Then, by expanding the space between the facing inside surfaces of the driven-side cam 95 (one pressing section) and the pressing plate 92 (the other pressing section) of the pair of pressing sections, the force of the pair of support plate sections 22 that is suppressing the pair of clamp sections 20 is released. At the same time, the inner diameter of the fitting holding section of the front section of the outer column 11 into which the rear section of the inner column 10 is fitted is elastically expanded to reduce the surface pressure acting on the contacting section between the inner peripheral surface of the front section of the outer column 11 and the outer circumferential surface of the rear section of the inner column 10. In this state, within the range that the adjustment rod 24 can displace inside the telescopic adjustment long holes 21 and the tilt adjustment long holes 23, adjustment of the up-down position and the forward-backward position of the steering wheel 1 becomes possible.

After moving the steering wheel 1 to a desired position, the dimension of the cam apparatus 78 in the axial direction is expanded by rotating the adjustment lever 26 in a direction that is opposite to the predetermined direction (generally upwards). By doing this, the space between the facing inside surfaces of the driven-side cam 95 and the pressing plate 92 is contracted, and the pair of clamp sections 20 is strongly suppressed by the pair of support plate sections 22. At the same time, the inner diameter of the fitting holding section of the front section of the outer column 11 into which the rear section of the inner column 10 is fitted is elastically contracted so as to increase the surface pressure acting on the contacting section between the inner peripheral surface of the front section of the outer column 11 and the outer circumferential surface of the rear section of the inner column 10. In this state, the up-down position and the forward-backward position of the steering wheel 1 is maintained in a position after adjustment.

In the steering apparatus of this example, the installation plate section 54 of the support bracket 17 is composed of a bridge plate section 55 that is provided in the center in the width direction and a pair of side plate sections 56 that is provided on both sides in the width direction of this bridge plate section 55. In such a support bracket 17, when the accuracy of the installation surface (not shown) which is provided in the vehicle body 15 is degraded, there is a possibility that the influence of this accuracy may affect the pair of support plate sections 22.

For example, when the installation surface of the vehicle body 15 is inclined with respect to the width direction (left and right direction in FIG. 57) as illustrated with two-dot chain lines a in FIG. 57 (slant downwards), in an assembled state, the pair of side plate sections 56 of the installation plate section 54 as well inclines with respect to the width direction in imitation of the installation surface of the vehicle body 15 as illustrated with two-dot chain lines 8 in FIG. 57. When the pair of side plate sections 56 incline like this and the influence of this inclination affects the pair of support plate sections 22, the pair of support plate sections 22 inclines (deforms) in a direction where the lower end sections come closer as illustrated with two-dot chain lines 8 in FIG. 57. As a result, the pair of support plate sections 22 contacts the outer column 11 in sections that are different from the sections that it should come in contact and the retentivity of the pair of clamp sections 20 changes so that there is a possibility that the operability may deteriorate when adjusting the position of the steering wheel 1.

PRIOR ART DOCUMENTS

Patent Documents

[Patent Document 1] JP2014-104871(A)
[Patent Document 2] JP2008-265646(A)
[Patent Document 3] JP2015-214291(A)

SUMMARY OF INVENTION

Problem to be Solved by the Invention

Taking the situation described above into consideration, the objective of the present invention is to achieve a structure of a bracket for a steering apparatus that is capable of increasing the strength of the pair of support plate sections of the support bracket. Further, the objective of the present invention is to achieve a structure of a bracket for a steering apparatus that ensures the rigidity of the support bracket even when the accuracy of the installation surface of the vehicle body is not sufficient enough, and the influence of this accuracy does not easily affect the support plate section of at least one of the pair of support plate sections.

Means for Solving the Problems

The support bracket for steering apparatus of the present invention comprises an installation section and a pair of support plate sections.

The installation section is fixed to the vehicle body in use. In other words, this installation section has a fixed section for fixing the support bracket to the vehicle body in use.

The pair of support plate sections is arranged separately and oppositely from each other in the width direction of the vehicle body, and each upper end section thereof is connected to a bottom surface of the installation section, and has a fixed-side through hole respectively. This fixed-side through hole is constructed by a tilt adjustment long hole that extends in the up-down direction when assembled in a steering apparatus that comprises a tilt mechanism capable of adjusting the height position of the steering wheel. On the other hand, when assembled in a steering apparatus that does not comprise the tilt mechanism, the fixed-side through hole is constructed by a circular hole.

Especially, in the support bracket for steering apparatus of the present invention, a reinforcing member that extends in the up-down direction and of which an upper end edge is a free end is provided in at least one of the positions that are shifted to the front side or the rear side from the fixed-side through hole of each one of the pair of support plate sections. The reinforcing member is for increasing the section modulus with respect to the width direction of each of the pair of support plate sections. Further, in the present invention, as the upper end edge of the reinforcing member is constructed by the free end that is not connected to other members, the upper end edge of the reinforcing member is not connected to the bottom surface of the installation section.

Preferably, the installation section is composed of an installation plate section. More specifically, the installation plate section may comprise a bridge plate section and a pair of side plate sections that is provided on both sides of the bridge plate section with respect to the width direction of the vehicle body. In this configuration, at least one side plate section of the pair of side plate sections may have an installation-side slit that extends in the forward-backward direction at the middle section in the forward-backward direction of the inner end section in the width direction. This installation-side slit may be composed of a through-hole that passes through the at least one side plate section in the thickness direction as well as a recessed section, a groove, or an opening section that does not pass through the at least one side plate section in the thickness direction.

In this configuration, a pair of ribs may be arranged separately in the forward-backward direction at the inner end section in the width direction of the at least one side plate section and at a part of both end sections in the width direction of the bridge plate section continuous with the inner end section in the width direction of the at least one side plate section.

At least one rib of the pair of ribs may be arranged to extend in the width direction of the vehicle body on the bridge plate section.

The bridge plate section may comprises a center plate section that is arranged so as to be parallel to the width direction of the vehicle body and a pair of side inclined plate sections that is arranged on both sides of the center plate section with respect to the width direction of the vehicle body and is inclined downward as going outward with respect to the width direction of the vehicle body.

In the present invention, the reinforcing member may comprises a protrusion that extends in the up-down direction which is convex on the outside in the width direction and is concave on the inside in the width direction.

The reinforcing member may be provided in both of a position that is shifted to the front side than the fixed-side through hole and a position that is shifted to the rear side than the fixed-side through hole of the pair of support plate sections respectively. In this configuration, the reinforcing member that is provided on the front side than the fixed-side through hole and the reinforcing member that is provided on the rear side than the fixed-side through hole may respectively have a cross-sectional shape that is different from each other or a cross-sectional shape that is the same as each other.

In the present invention, the upper end sections of the pair of support plate sections may be fixed to the bottom surface of the installation section by welding respectively.

In the present invention, a slit in the up-down direction that passes through each one of the pair of support plate sections in the width direction is respectively provided therein at a section that is located between the reinforcing member and the fixed-side through hole with respect to the forward-backward direction and that is aligned with the fixed-side through hole at least in the up-down direction (the section which overlaps with the fixed-side through hole with respect to the forward-backward direction). The section that is aligned with the fixed-side through hole with respect to the up-down direction means a section which overlaps with the fixed-side through hole with respect to the up-down direction.

Further, the steering apparatus of the present invention comprises a steering column for rotatably supporting a steering shaft on its inside and a support bracket for steering apparatus of the present invention.

More specifically, the steering apparatus of the present invention may comprise, for example, a steering column, a displacement bracket, a support bracket, an adjustment rod, a pair of pressing sections, and an expansion/contraction device.

The steering column is for rotatably supporting a steering shaft on its inside in use.

The displacement bracket is, for example, fixed to and provided in part of the steering column, and a through hole on the displacement side is provided so as to pass through in the width direction thereof. The through hole on the displacement side is, for example, constructed by a telescopic adjustment long hole that extends in the forward-backward direction in case that the steering apparatus comprises a telescoping mechanism capable of adjustment of the forward-backward position of the steering wheel, or a circular hole in case that the steering apparatus does not have the telescoping mechanism.

The support bracket is constructed by the support bracket for steering apparatus of the present invention.

The adjustment rod is provided so as to be inserted through the through hole on the displacement side and the fixed-side through hole in the width direction.

The pair of pressing sections is provided in sections that protrude from the outside surfaces of the pair of support plate sections of the support bracket of both end sections of the adjustment rod.

The expansion/contraction device is for expanding and contracting the space between the pair of pressing sections.

Based on the expansion and construction of the expansion and contraction mechanism, it is possible to switch an unlocked state where the forward-backward position of a telescoping mechanism is provided) or the up-down position (if a tilt mechanism is provided) of the steering wheel is adjustable and a locked state where this steering wheel can be maintained at a position after adjustment.

Effect of Invention

With the present invention which is configured as described above, it is possible to increase rigidity of the pair of support plate sections of the support bracket.

That is, in the present invention, of the pair of support plate sections, a reinforcing member that extends in the up-down direction is provided in at least one of the positions which is shifted on the front side or the rear side than the fixed-side through hole. Due to this, it is possible to increase rigidity of the pair of support plate sections against the torsion torque that is applied from the steering column. As a result, plastic deformation of the pair of support plate sections is prevented based on this torsion torque.

MODES FOR CARRYING OUT INVENTION

First Example

Figure 54:
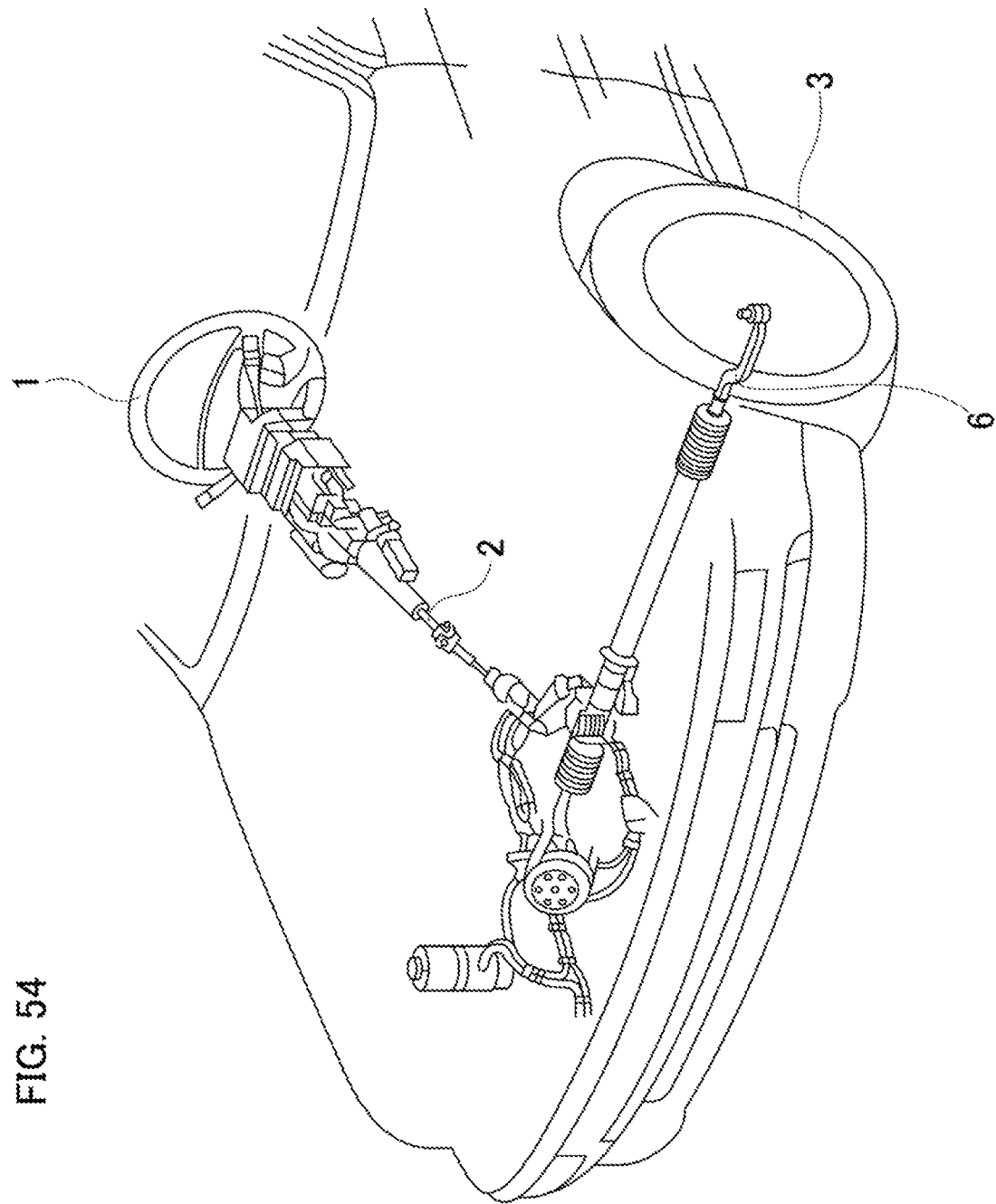
FIG. 54 is a simplified perspective view illustrating an example of a steering apparatus mounted on a vehicle.
Figure 55:
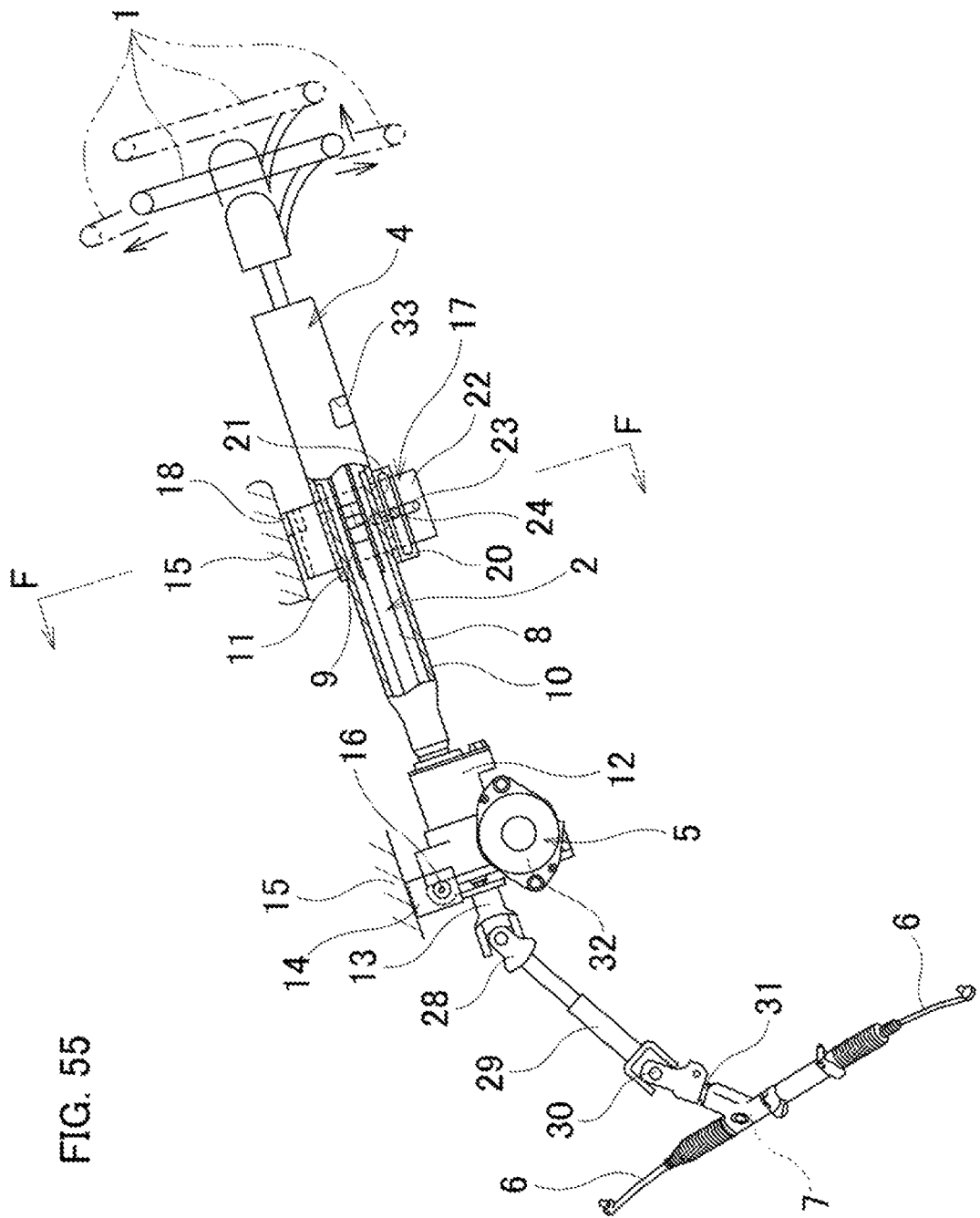
FIG. 55 is a simplified side view of an example of a steering apparatus of the conventional construction.

FIG. 1 to FIG. 18 illustrate a first example of an embodiment of the present invention. The steering apparatus to which a support bracket 17a of the present example has been incorporated supports a steering shaft 2 on the inner diameter side of a cylindrical steering column 4 that is supported by a vehicle body 15 via a plurality of rolling bearings (not shown) so as to be able to rotate freely. And a steering wheel 1 (see FIG. 54 and FIG. 55) is fastened to the rear-end section of the steering shaft 2, where it is protruded backward than the rear-end opening of the steering column 4.

An electric motor 32, which is a power source for applying auxiliary power, is provided in the front-end section of the steering column 4 with the electric motor 32 supported by a gear housing 12 that is fastened to the front-end section of the steering column 4. Output torque (auxiliary power) of the electric motor 32 is applied to the steering shaft 2 via a reduction gear that is provided in the gear housing 12. The gear housing 12 is supported by and fastened to the vehicle body 15 via a lower bracket 14.

The steering apparatus of the present example comprises a tilt mechanism for adjusting the up-down position of the steering wheel 1 and a telescoping mechanism for adjusting the forward-backward position of the steering wheel 1.

The front-end section of the outer column 11a that is located backward is loosely fitted to the rear-end section of the inner column 10 that is located forward so as to be able to relatively displace in the axial direction as well as to extend and contract the whole length, to form the telescoping mechanism. The outer column 11a is supported by the support bracket 17a of the present example so as to be able to move in the forward-backward direction. The steering shaft 2 that is supported inside the steering column 4 so as to be able to rotate freely has a construction where an inner shaft 8 and an outer shaft 9 are combined so as to be able to transmit torque by way of a spline fit or the like as well as to be able to extend and contract.

The tilt mechanism is formed by supporting the steering column 4 with respect to the vehicle body 15 so as to be able to pivotally displace around the tilt axis 16 that is provided in the width direction, and by supporting the outer column 11a with respect to the support bracket 17a so as to be able to move in the up-down direction.

In the illustrated structure, the outer column 11a is made of light alloy such as aluminum alloy and magnesium alloy, and is formed from a held section body 34 that is located in the front half section and a cylindrical section 35 that is located in the rear half section so as to be integral in the axial direction. The held section body 34 is supported so as to be able to move in the forward-backward direction and the up-down direction with respect to the support bracket 17a. Accordingly, a slit 36 that extends in the axial direction is provided on the bottom surface of the held section body 34 so that the front-end section of the slit 36 in the axial direction opens to the front-end surface of this held section body 34. Further, slits 37a, 37b that extend in the circumferential direction are provided in a section near the front-end and a section near the rear-end of the lower half of this held section body 34. While the slit 37a in the circumferential direction on the front side is formed to circumferentially intersect the section near the front-end of the slit 36 in the axial direction, the slit 37b in the circumferential direction on the rear side is formed to circumferentially intersect the rear-end section of the slit 36 in the axial direction. In the present example, a pair of clamp sections 38 is provided in sections on both sides in the width direction of the held section body 34, where it is surrounded by three sides by the slit 36 in the axial direction and the slits 37a, 37b in the circumferential direction.

The pair of clamp sections 38 is surrounded by three sides by the slit 36 in the axial direction and the slits 37a, 37b in the circumferential direction, so rigidity in the width direction is lower compared to other sections of the outer column 11a, and it is possible to elastically deform in the width direction (the inner diameter can be elastically expanded or contracted). The pair of clamp sections 38 has a partially cylindrical inner peripheral surface, and is arranged in sections that are adjacent to both sides in the circumferential direction of the slit 36 in the axial direction, and has a shape that extends in the axial direction. Planar overhang plate sections 39 are provided in the lower end sections of the outside surfaces in the width direction of the pair of clamp sections 38 so as to protrude outward in the width direction. The outside surfaces in the width direction of the overhang plate sections 39 are respectively made as a flat pressing surface 40. A plurality of (five in the illustrated example) planar reinforcing ribs 51 that extends in the width direction is provided separately in the forward-backward direction between the top surface of the overhang plate sections 39 and the cylindrical surface shaped upper end section and the middle section of the respective outside surfaces in the width direction of the pair of clamp sections 38.

A reinforcement bridge section 41 is provided in the lower section of the held section body 34 so as to cover the pair of clamp sections 38 from below and to be integral with the outer column 11a. This reinforcement bridge section 41 is composed of a reinforcement plate section 42 and a pair of connecting sections 43a, 43b, and has an approximately U-shape as viewed from the width direction. The reinforcement plate section 42 is located below the pair of clamp sections 38 so as to extend in the width direction and the forward-backward direction. Further, the reinforcement plate section 42 comprises a flat plate section 44 that is located to be parallel with the center axis of the outer column 11a and a pair of lower extension sections 45 that is provided so as to extend downward from the bottom surface on both sides in the width direction of this flat plate section 44, and has an approximate U-shaped cross section. A notch 46 that passes through in the up-down direction is provided in the middle section in the width direction of the front-end section of the reinforcement plate section 42 (flat plate section 44). A plurality of (three in the illustrated example) planar plate reinforcing connecting sections 52 that extend in the width direction are provided separately in the forward-backward direction between the bottom surface in the middle section in the width direction of the flat plate section 44 and the inside surfaces in the width direction of the pair of lower extension sections 45.

The connecting section 43a of the pair of connecting sections 43a, 43b which is located forward is provided so as to extend upward from both side sections (both side sections of the notch 46) in the width direction of the front-end section of the reinforcement plate section 42, and is connected to sections of the front-end section of the bottom surface of the held section body 34 that are adjacent to the front side of the slits 37a, 37b in the circumferential direction and are on both sides in the circumferential direction of the slit 36. On the other hand, the connecting section 43b that is located on the rear side is provided so as to extend upward from the rear-end section of the reinforcement plate section 42, and is connected to a section of the bottom surface of the rear-end section of the held section body 34 that is adjacent to the rear side of the rear-end section of the slit 36 in the axial direction.

In the illustrated example, by providing the reinforcing bridge section 41 as illustrated above, torsional rigidity of the outer column 11a is improved, and a gap 47 having an approximately U-shape as viewed from the width direction is respectively provided between this reinforcement bridge section 41 and the pair of clamp sections 38. Of these gaps 47, the space that exists between the tip end section (lower end section) of the pair of clamp sections 38 and the top surface of the reinforcement plate section 42 (flat plate section 44) and extends in the axial direction of the outer column 11a, is made to be a telescopic adjustment long hole 21a to which the adjustment rod 24a can be inserted in the width direction.

A pair of torque transmission surfaces 49a, 49b for transmitting torque acting on the outer column 11a to the inner side surfaces of the pair of support plate sections 22 of the support bracket 17a is provided respectively in sections of both side surfaces in the width direction of the outer column 11a that are separated in the up-down direction with the pair of clamp sections 38 in between.

In order to provide a pair of torque transmission surfaces 49a on the upper side of the pair of torque transmission surfaces 49a, 49b, straight protrusion sections 50a that protrude outside in the width direction and extend in the axial direction of the outer column 11a are provided in sections of both side surfaces in the width direction of the outer column 11a (held section body 34) that overlap with the center axis of the outer column 11a with respect to the up-down direction. The outside surfaces in the width direction of the protrusion sections 50a are flat planes, and function as the torque transmission surfaces 49a of the upper side. On the other hand, in order to provide a pair of torque transmission surfaces 49b of the lower side of the pair of torque transmission surfaces 49a, 49b, straight protrusion sections 50b that protrude outside in the width direction and extend in the axial direction of the outer column 11a are provided in the lower end sections of the outside surfaces in the width direction of the lower extension sections 45. The outside surfaces in the width direction of the protrusion sections 50b are flat planes and function as the torque transmission surfaces 49b of the lower side. Each of the pair of torque transmission surfaces 49a, 49b has a shape that extends in the axial direction of the outer column 11a, and has sufficiently high rigidity with respect to the width direction compared to the pair of clamp sections 38. Further, a plurality of (six in the illustrated example) recessed sections 53 that are recessed inward in the width direction are provided in the middle sections in the up-down direction (upward of the protrusion sections 50b) of the outside surfaces in the width direction of the lower extension sections 45 are provided so as to be separated in the forward-backward direction.

Figure 10:
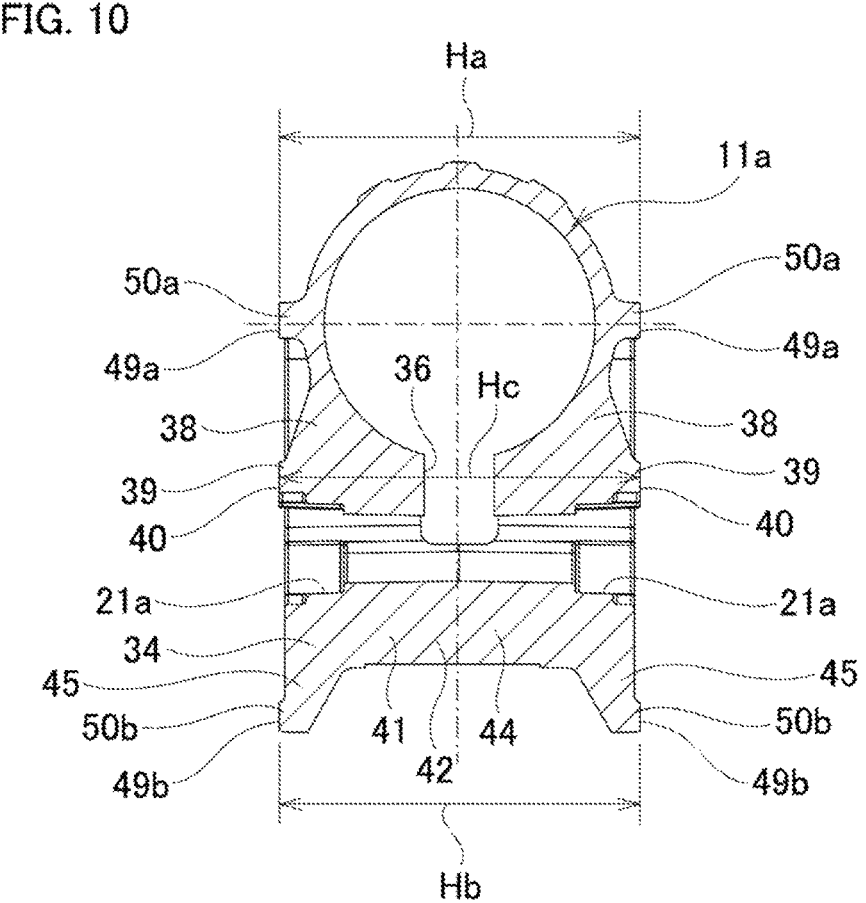
FIG. 10 is a cross-sectional view of section B-B in FIG. 8.
Figure 11:
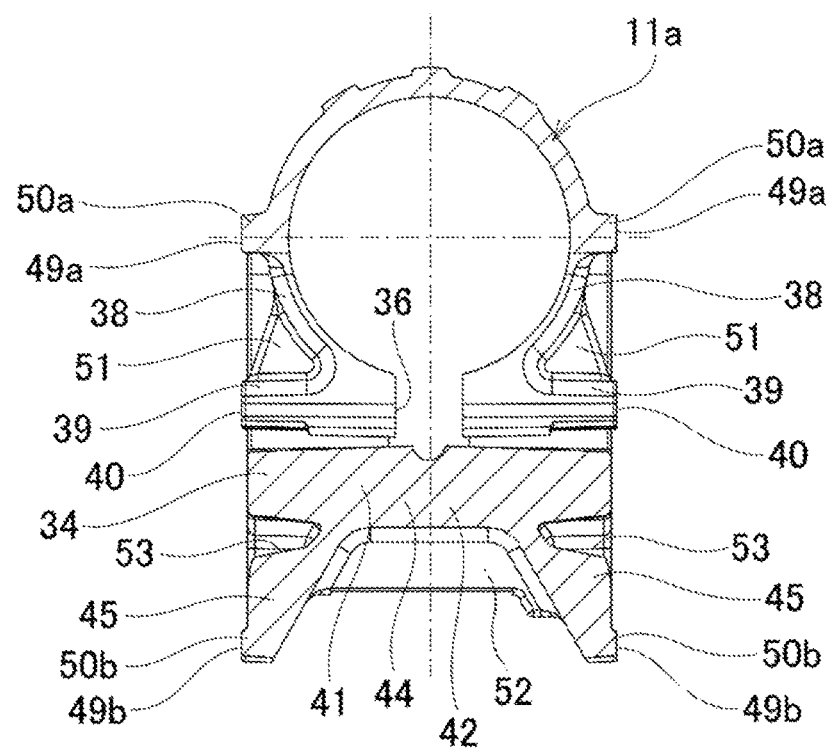
FIG. 11 is a cross-sectional view of section C-C in FIG. 8.
Figure 12:
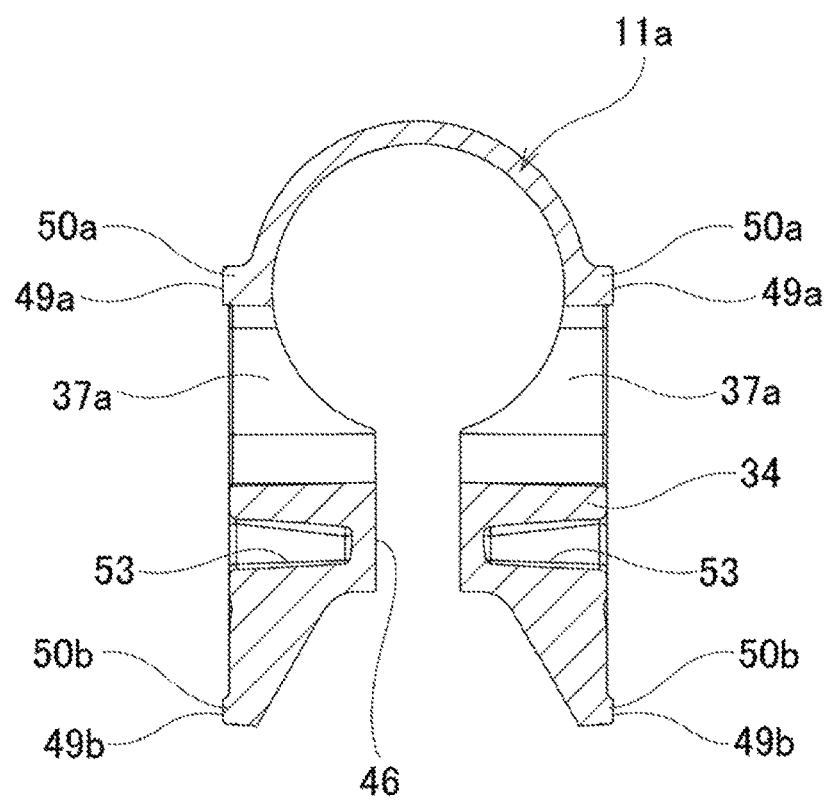
FIG. 12 is a cross-sectional view of section D-D in FIG. 8.
Figure 13:
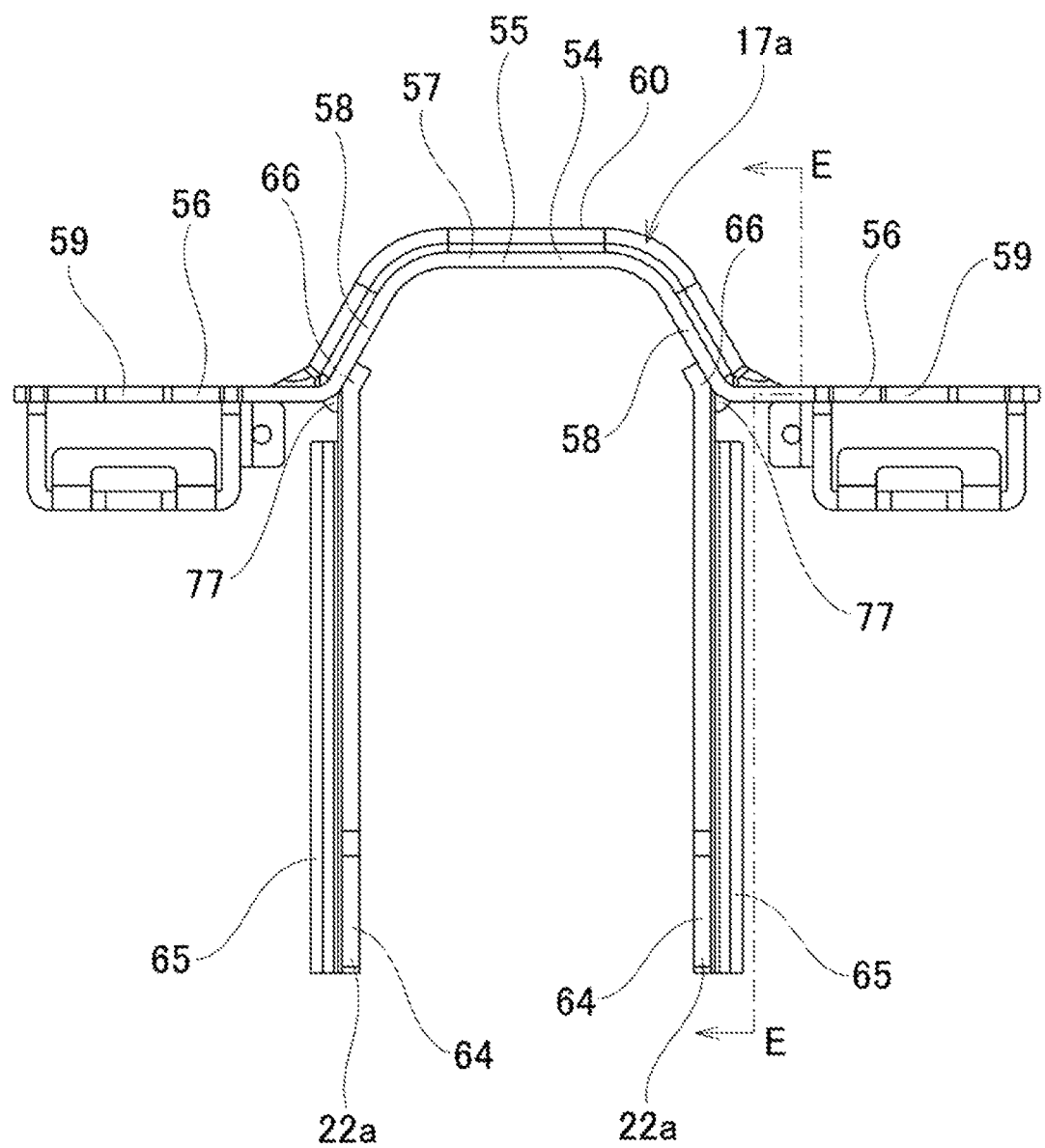
FIG. 13 is a rear view illustrating a support bracket taken out from the outer column and the support bracket illustrated in FIG. 3.
Figure 14:
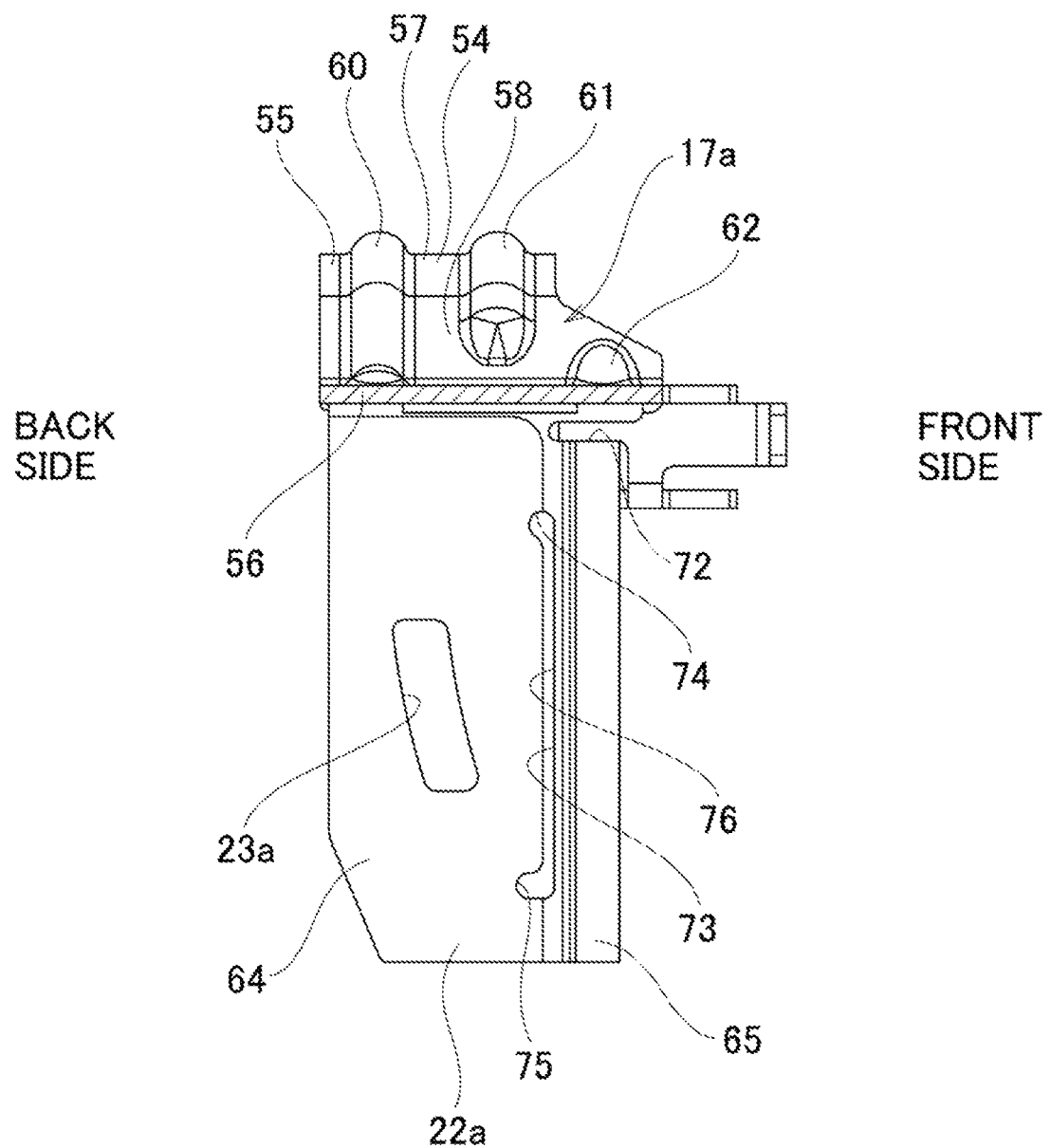
FIG. 14 is a cross-sectional view of section E-E of FIG. 13.
Figure 15:
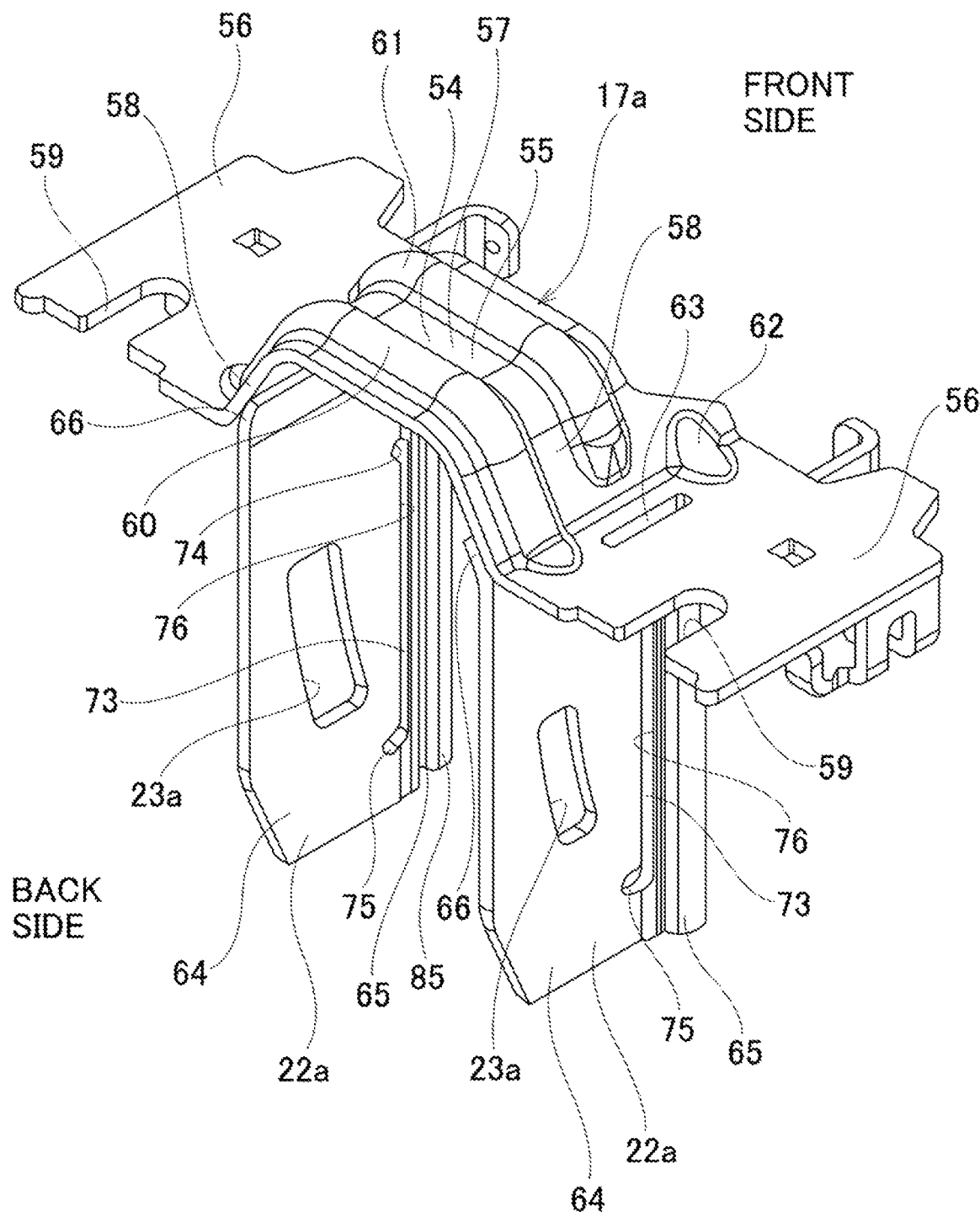
FIG. 15 is a perspective view illustrating the support bracket illustrated in FIG. 13 as viewed from the rear and upper side.
Figure 16:
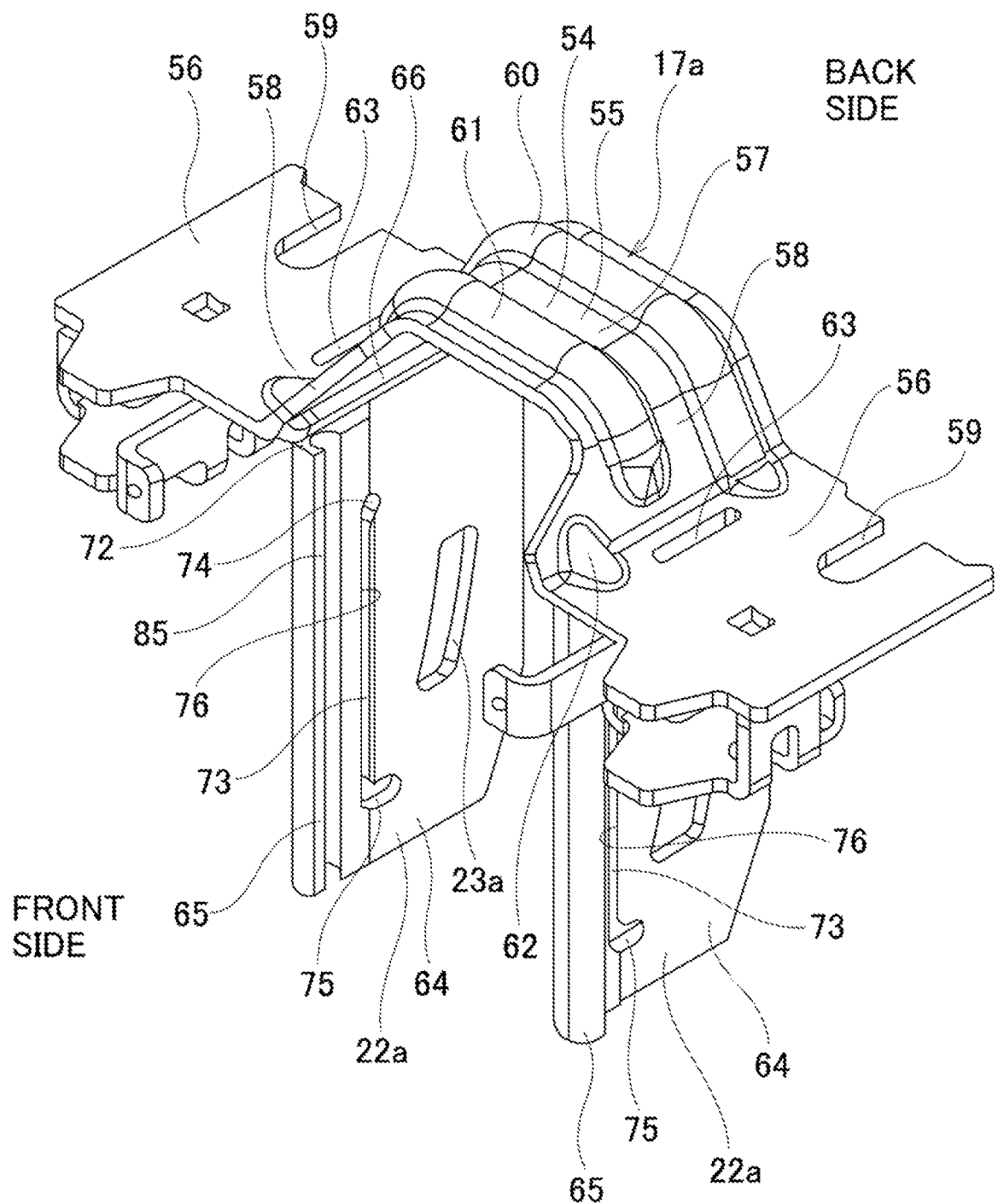
FIG. 16 is a perspective view illustrating the support bracket illustrated in FIG. 13 as viewed from the front and upper side.
Figure 17:
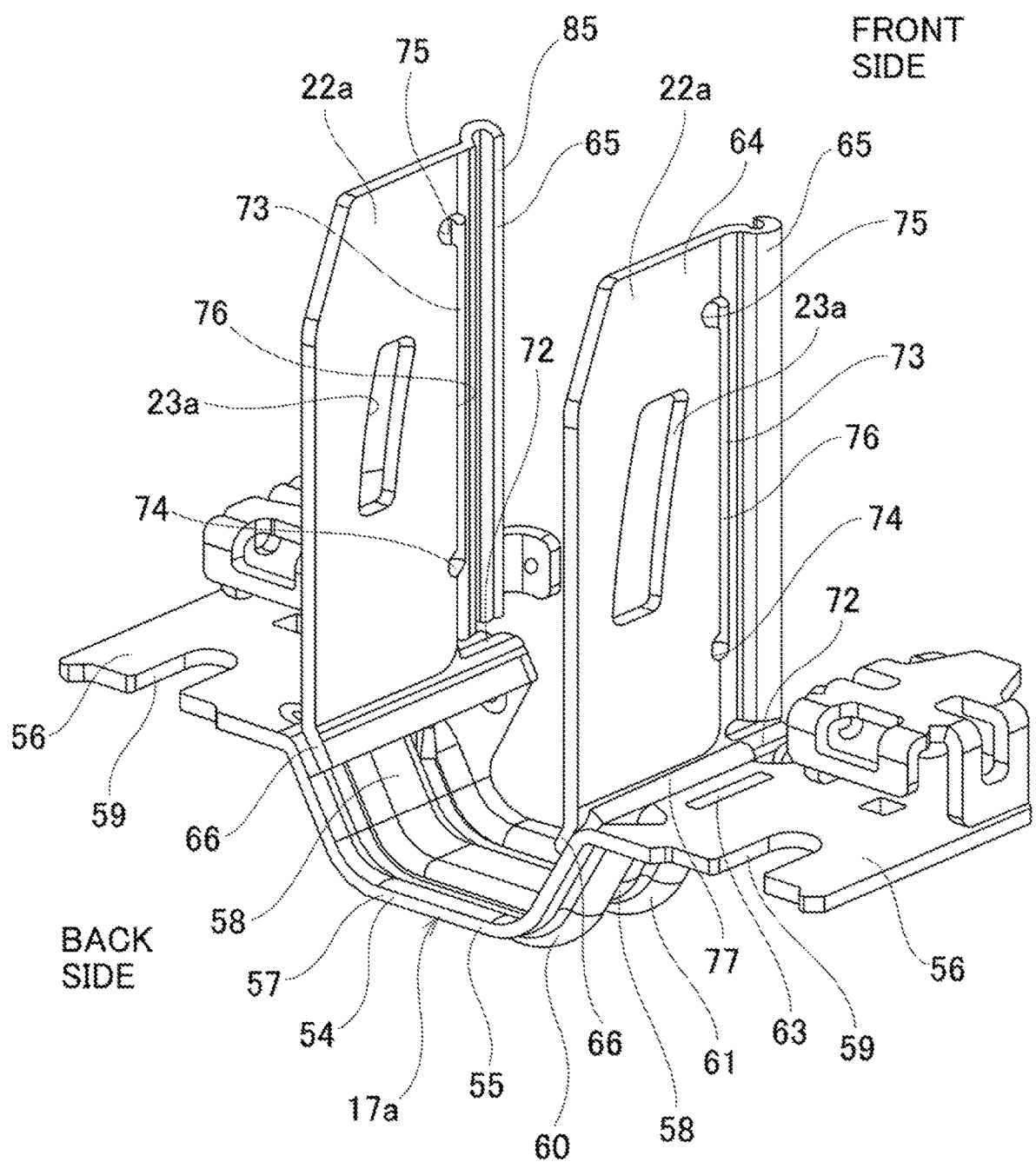
FIG. 17 is a perspective view illustrating the support bracket illustrated in FIG. 13 as viewed from the rear and lower side.
Figure 18:
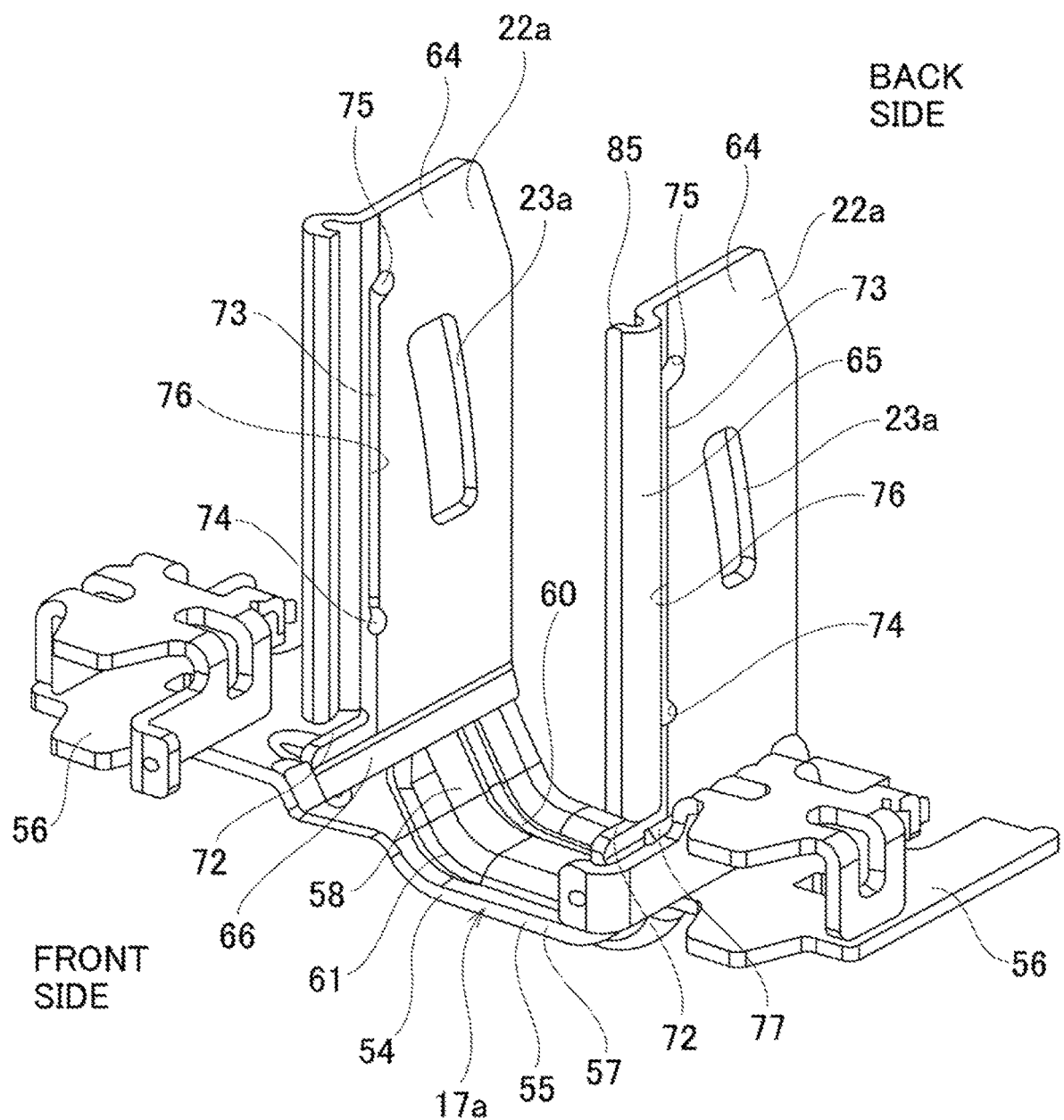
FIG. 18 is a perspective view illustrating the support bracket illustrated in FIG. 13 as viewed from the front and lower side.

As illustrated in FIG. 10, in a state where no external force is applied to the outer column 11a, the width dimension Ha between the pair of torque transmission surfaces 49a on the upper side, the width dimension Hb between the pair of torque transmission surfaces 49b on the lower side, the width dimension Hc between pressing surfaces 40 of the pair of clamp sections 38 are the same each other (Ha=Hb=Hc). Therefore, the torque transmission surfaces 49a, 49b on one side in the width direction and the pressing surfaces 40 that are located between these torque transmission surfaces 49a, 49b are arranged on the same virtual plane, and the torque transmission surfaces 49a, 49b of the other side in the width direction and the pressing surfaces 40 that are located between these torque transmission surfaces 49a, 49b are arranged on the same virtual plane. When it is required to increase clamp force by the pair of clamp sections 38, it is possible to make the width dimension Hc larger than the width dimensions Ha and Hb (Hc>Ha=Hb).

Figure 7:
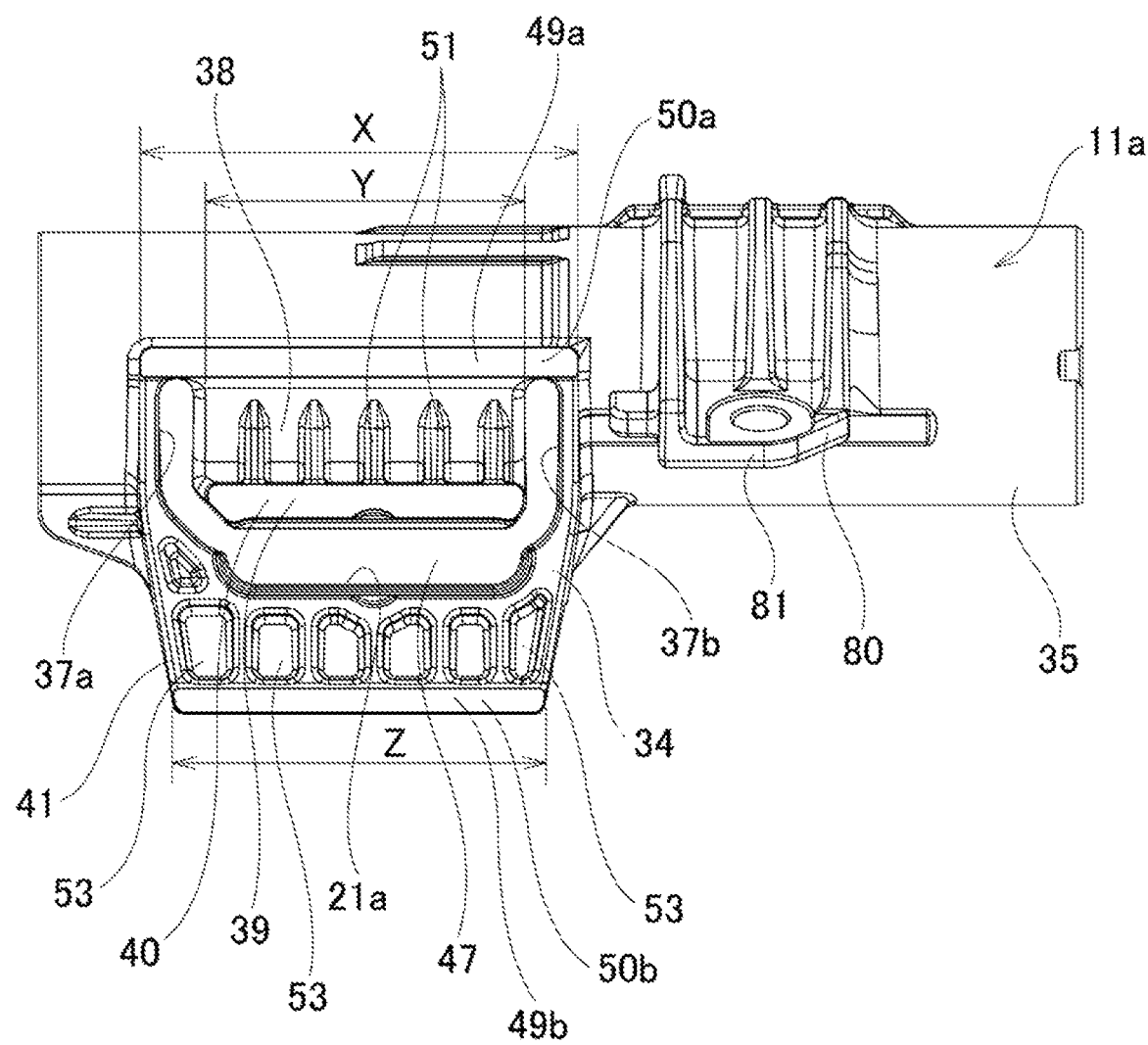
FIG. 7 is a side view illustrating the outer column illustrated in FIG. 6 as viewed from one side in the width direction.
Figure 8:
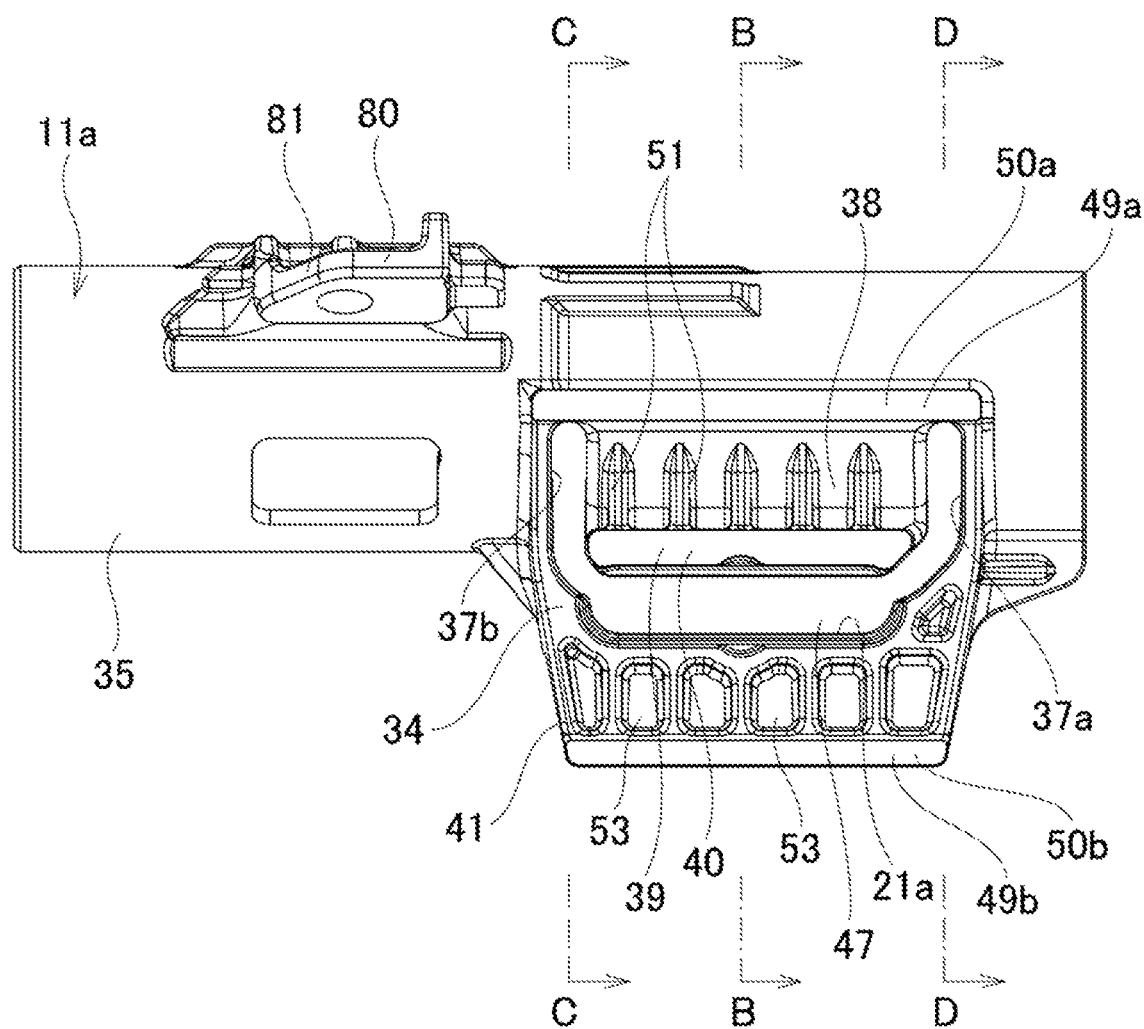
FIG. 8 is a side view illustrating the outer column illustrated in FIG. 6 as viewed from the other side in the width direction.
Figure 9:
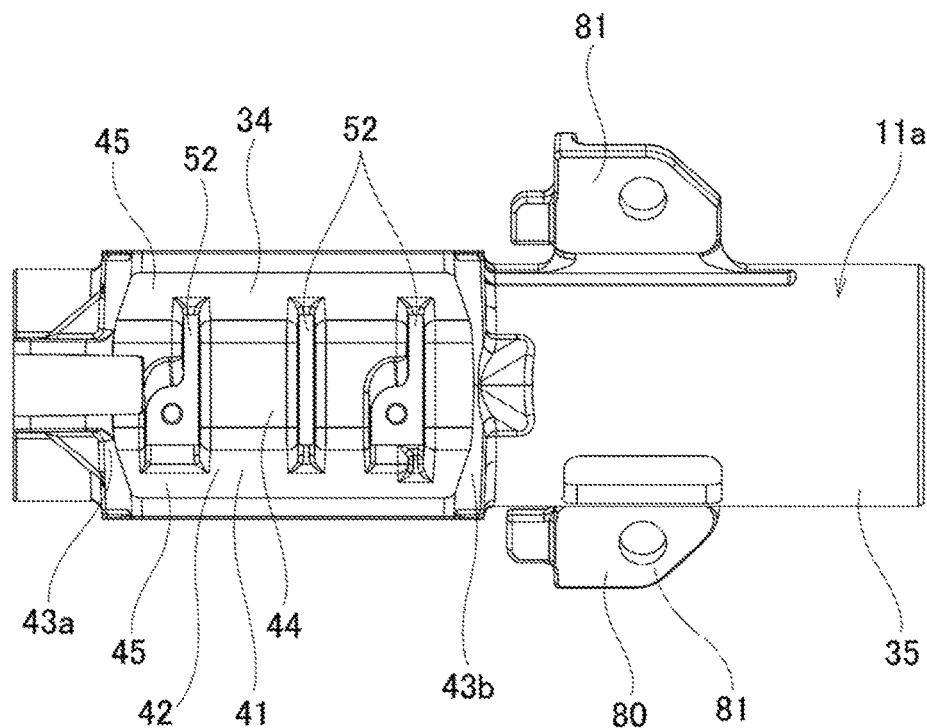
FIG. 9 is a bottom view illustrating the outer column illustrated in FIG. 6.

As illustrated in FIG. 7, the dimensions in the forward-backward direction (X, Z) of the pair of torque transmission surfaces 49a, 49b are larger than the dimension in the forward-backward direction (Y) of the pressing surfaces 40 of the pair of clamp sections 38 (X>Y, Z>Y). Further, the dimensions in the forward-backward direction (X, Z) of the pair of torque transmission surfaces 49a, 49b are approximately equal (X≈Z). Due to this, the distances from the center section in the forward-backward direction of the pair of telescopic adjustment long holes 21a to the respective front-end edge sections of the pair of torque transmission surfaces 49a, 49b and the pressing surfaces 40 and the distances from there to the respective rear-end edge sections thereof are, respectively, approximately equal.

However, when embodying the present example, by offsetting the position in the axial direction of the pressing surfaces 40, it is possible to make the operating force of the adjustment lever 26a hardly change even when the forward-backward position of the steering wheel 1 is changed. Specifically, when the steering wheel 1 is displaced to the rear side to the maximum, the fitting tolerance between the rear-end section of the inner column 10 and the front-end section of the outer column 11a becomes short. Therefore, although the pressing surfaces 40 tightens the rear-end side section of the inner column 10, the rigidity of this rear-end side section of the inner column 10 is lower than the middle section, so the tightening reaction force becomes low, and the operating force of the adjustment lever 26a becomes low. By offsetting the position of the pressing surfaces 40 forward, it becomes possible to press the middle section of the inner column 10 which has higher rigidity than the end side section, so as to increase the tightening reaction force. Further, when the steering wheel 1 is moved forward to increase the fitting tolerance between the inner column 10 and the outer column 11a as well, change in the rigidity of this inner column 10 becomes small, so the tightening reaction force cannot be easily changed. Due to this, it is possible to suppress change in the operating force of the adjustment lever 26a even when the forward-backward position of the steering wheel 1 is changed.

Further, in the illustrated example, the upper end sections and the bottom end sections of the pair of connecting sections 43a, 43b of the reinforcement bridge section 41 are respectively connected to both end sections in the forward-backward direction of the protrusion sections 50a, 50b. However, in the present example, outside surfaces in the width direction of the pair of connecting sections 43a, 43b are located (offset) on the inside in the width direction than the pair of torque transmission surfaces 49a, 49b and the pressing surfaces 40. By doing this, the inside surfaces of the pair of support plate sections 22a of the support bracket 17a are made not to come in contact with the outside surfaces in the width direction of the pair of connecting sections 43a, 43b.

Although the outer column 11a of the present example has a configuration as stated above, as the shape of this outer column 11a is complicated, following is an additional brief explanation of the basic configuration as seen from a different perspective. A pair of held plate sections are integrally provided with this outer column 11a with the slit 36 in the axial direction sandwiched from both sides in the width direction, and the tip end sections (lower end sections) of these held plate sections are connected in the width direction (by a section corresponding to the reinforcement plate section 42). Further, the outside surfaces in the width direction of these held plate sections are made as fastening surfaces having an approximately flat plane shape respectively. Approximately U-shaped gaps 47, which communicate with the inner peripheral surface of the outer column 11a, are provided approximately in the center of these fastening surfaces, and the sections surrounded by these gaps 47 are made as the pair of clamp sections 38. The upper edge and the lower edge of these fastening surfaces are made as torque transmission surfaces 49a, 49b respectively.

On the other hand, as illustrated in FIG. 1 to FIG. 5 and FIG. 13 to FIG. 18, the support bracket 17a is made of metal plate such as steel or aluminum alloy, and is composed of the installation plate section 54 and the pair of support plate sections 22a. When the support bracket 17a is made of steel, the thickness of the respective members of the support bracket 17a can be 1.3 mm to 2.6 mm.

In the present example, the installation section of the support bracket 17a is composed of an installation plate section 54. This installation plate section 54 is formed by performing press processing on one plate member, and comprises a bridge plate section 55 and a pair of side plate sections 56 that are provided on both sides in the width direction of the bridge plate section 55.

In the present example, the bridge plate section 55 has an approximately U-shape and opens downward and in the forward-backward direction. Specifically, the bridge plate section 55 comprises a center plate section 57 that is provided so as to be parallel with the width direction and a pair of side inclined plate sections 58 that are provided on both sides in the width direction of the center plate section 57. The pair of side inclined plate sections 58 are provided so as to incline downward as going toward outside in the width direction from both end edges in the width direction of the center plate section 57. The front-end section of the pair of side inclined plate sections 58 is located on the front side than the front-end section of the center plate section 57. On the other hand, the rear-end edge of the center plate section 57 and the rear-end edge of the pair of side inclined plate sections 58 exist on the same plane. Therefore, the dimension in the forward-backward direction of the center plate section 57 is smaller than the dimension in the forward-backward direction of the pair of side inclined plate sections 58.

The pair of side plate sections 56 is provided so as to extend outward in the width direction from the both end edges in the width direction of the bridge plate section 55 (outer end edge in the width direction of the pair of side inclined plate sections 58). In the present example, locking notches 59 are provided in the pair of side plate sections 56 so as to open in the rear-end edges. In an assembled state, a locking capsule 18 which is fixed to the vehicle body 15 via a fixing member such as a bolt or a stud is locked to the locking notches 59 respectively. By doing so, the support bracket 17a is normally supported by the vehicle body 15, however, during a collision accident, the support bracket 17a breaks away in the forward direction due to the impact of a secondary collision, which allows the outer column 11a to displace in the forward direction.

In the installation plate section 54 of the present example having a configuration as described above, the rigidity of the bridge plate section 55 is higher than the rigidity of the pair of side plate sections 56. To do this, a first rib 60 and a second rib 61 having a semicircular arc shaped cross section with a convex shape on the upper side and a concave shape on the lower side and extending in the width direction are provided in the section near the rear-end and the middle section in the forward-backward direction of the bridge plate section 55.

Specifically, the first rib 60 is arranged so that the both end edges in the width direction are located outside in the width direction than the both end edges in the width direction of the bridge plate section 55 (outer end edges in the width direction of the pair of side inclined plate sections 58). That is, the both end sections in the width direction of the first rib 60 are located in the inner end sections in the width direction of the pair of side plate sections 56. On the other hand, the second rib 61 are arranged so that the both end edges in the width direction are located inside in the width direction than the both end edges in the width direction of the installation plate section 54 (outer end edges in the width direction of the pair of side inclined plate sections 58). That is, the second rib 61 is arranged only in the bridge plate section 55. Due to the configuration as stated above, the rigidity of the bridge plate section 55 is made higher than the rigidity of the pair of side plate sections 56.

A pair of third ribs 62 with a concave shape on the lower side and a convex shape on the upper side is provided so as to bridge over the front-end sections (the front side sections than the second rib 61) of the outer end sections in the width direction of the pair of side inclined plate sections 58 of the bridge plate section 55 and the front-end sections of the inner end sections in the width direction of the pair of side plate sections 56.

Due to the pair of third ribs 62 and the both end sections in the width direction of the first rib 60 that are arranged separately in the forward-backward direction and have the configuration such as stated above, the rigidity of the connecting sections between the both end sections in the width direction of the bridge plate section 55 (outer end sections in the width direction of the pair of side inclined plate sections 58) and the inner end sections in the width direction of the pair of side plate sections 56.

In the present example, installation-side slits 63 that pass through in the up-down direction of the pair of side plate sections 56 are provided in sections near the inner end in the width direction of the pair of side plate sections 56 that are aligned with the second rib 61 in the forward-backward direction so as to extend in the forward-backward direction. In other words, a pair of installation-side slits 63 that passes through in the up-down direction of the pair of side plate sections 56 is provided in the sections near the inner end in the width direction of the pair of side plate sections 56 that are located between the both end sections in the width direction of the first rib 60 and the pair of third ribs 62 with respect to the forward-backward direction.

In the present example, the pair of support plate sections 22a is provided so as to hang down from the installation plate section 54 and sandwich the front-end section of the outer column 11a (the held section body 34 and the reinforcement bridge section 41) from both sides in the width direction. In other words, the pair of support plate sections 22a is arranged separately and oppositely in the width direction of the vehicle body 15, and the upper end sections thereof are respectively connected to the bottom surface of the installation plate section 54.

Specifically, in the present example, each one of the pair of support plate sections 22a is composed of one plate member that extends in the up-down direction, and comprises a supporting plate body 64, a reinforcing member 65, and a lug sections 66 for welding. The supporting plate bodies 64 are composed of plate members that are parallel in the up-down direction and have a pair of tilt adjustment long holes 23a that extend in the up-down direction in sections that are oppositely located to each other with respect to the width direction (mutually match) and that are aligned with a part in the forward-backward direction of the pair of telescopic adjustment long holes 21a. In the present example, a tilt mechanism is provided, so the pair of tilt adjustment long holes 23a corresponds to the fixed-side through holes. However, in a steering apparatus that does not comprise a tilt mechanism, the fixed-side through holes are respectively composed of a circular hole.

The reinforcing members 65 are composed of protrusions that extend in the up-down direction with a convex shape on the outside in the width direction and a concave shape on the inside in the width direction. These reinforcing members 65 are formed, for example, by press processing. Further, the rear-end edges of these reinforcing members 65 are connected to the front-end edges of the supporting plate bodies 64. On the other hand, the front-end edge 85 (see FIG. 19(a)) of the respective reinforcing members 65 is a free end that does not connect to other members, and faces inward in the width direction. Therefore, The reinforcing members 65 respectively have a double flange structure having a rear-side flange section that is bent toward outside in the width direction from the front-end edge of the respective supporting plate bodies 64 and a front-side flange section that is bent toward inside in the width direction from the front-end edge of the rear-side flange section. The outside surfaces in the width direction of the reinforcing members 65 are located outside in the width direction than the outside surfaces in the width direction of the supporting plate bodies 64, and the inside surfaces in the width direction of the reinforcing members 65 (excluding the inside surfaces in the width direction of the connecting sections with the supporting plate bodies 64) are located on the outside in the width direction than the inside surfaces in the width direction of the supporting plate bodies 64. Further, the front-end edges 85 of the reinforcing members 65 are located on the outside in the width direction than the inside surfaces in the width direction of the supporting plate bodies 64. Therefore, the front-end edges 85 of the reinforcing members 65 are made not to come in contact with the pressing surfaces 40 and the pair of torque transmission surfaces 49a, 49b of the outer column 11a in a state where the position of the steering wheel 1 is adjustable (unlocked state) as well as in a state where the position of the steering wheel 1 is maintained after adjustment (locked state).

The upper end edges of the reinforcing members 65 are located lower than the upper end edges of the supporting plate bodies 64 since slits 72 in the forward-backward direction exist, and they are free ends respectively. By providing the reinforcing members 65, the section modulus of the sections where the reinforcing members 65 are provided become higher than in a case where they are formed planar as similar to the supporting plate bodies 64. Due to this, the flexural rigidity (torsional strength) of the support plate sections 22a is made higher than in a case where the reinforcing members 65 are not provided.

In the present example, the reinforcing members 65 are provided in the front-end section of the support bracket 17a, however, it is also possible to provide them in the rear-end section of the support bracket 17a. Further, the reinforcing members 65 may be provided not only in the front-end section or the rear-end section of the support bracket 17a, but also in the middle section in the forward-backward direction of the support bracket 17a. Further, the reinforcing member 65 can be provided not only one with respect to each support plate sections 22a of the support bracket 17a but multiple can be provided.

Figure 19A:
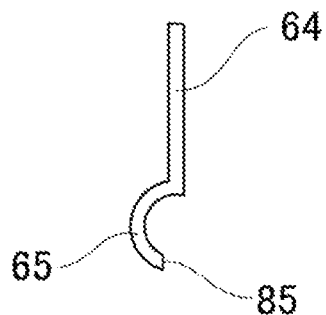
FIG. 19A is a schematic view illustrating a reinforcing member of the first example of an embodiment.

The reinforcing member 65 is not limited to the shape illustrated in FIG. 19(a). For example, it is also possible to employ reinforcing members 65a to 65e having shapes that are schematically illustrated in FIG. 19(b) to FIG. 19(f). Specifically, the cross-sectional shape of the reinforcing member 65a of FIG. 19(b) on the virtual plane that passes through the axis of the outer column 11a in an assembled state and is orthogonal to the supporting plate body 64 is approximately doglegged where the outside in the width direction is convex and the inside in the width direction is concave. Specifically, the reinforcing member 65a comprises a first reinforcing element (rear-side flange section) 67 that is inclined in a direction toward outside in the width direction (left side in FIG. 19(b)) as going toward the front side (lower side in the FIG. 19(b)) and a second reinforcing element (front-side flange section) 68 that extends (bends) from the front-end edge of the first reinforcing element 67 to the inside in the width direction. The rear-end edge of the first reinforcing element 67 of the reinforcing member 65a is connected to the front-end edge of the supporting plate body 64. Further, in the configuration illustrated in FIG. 19(b), the inner end edge in the width direction of the second reinforcing element 68 (right end edge of FIG. 19(b)) is located on the outside in the width direction than the inside surface in the width direction of the supporting plate body 64.

Figure 19E:
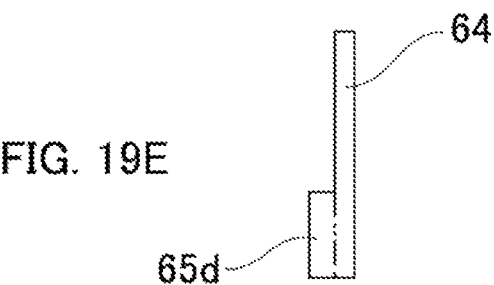
FIGS. 19B to 19F are schematic views illustrating another examples of the reinforcing member respectively.
Figure 19B:
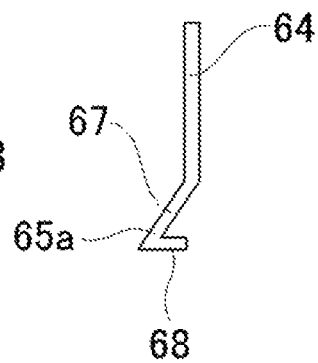
Figure 19F:
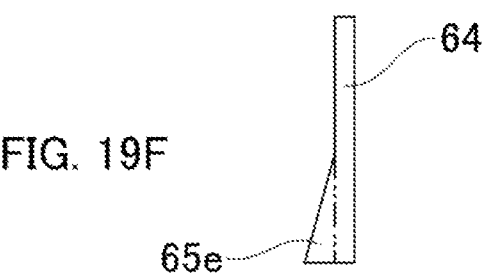
Figure 19C:
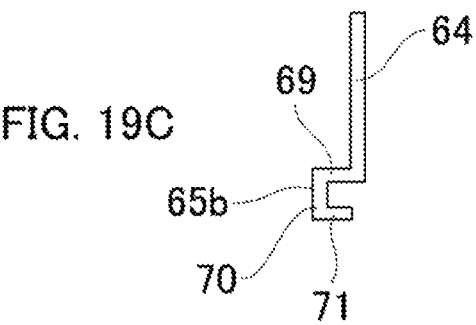

The cross-sectional shape of the reinforcing member 65b of FIG. 19(c) on the virtual plane that is orthogonal to the supporting plate body 64 is approximately U-shaped where it is convex on the outside in the width direction and concave on the inside in the width direction. Specifically, the reinforcing member 65b comprises a first reinforcing element (rear-side flange section) 69 that extends (bends) from the front-end edge of the supporting plate body 64 to the outside in the width direction, a second reinforcing element (intermediate flange section) 70 that extends (bends) forward at a right angle from the first reinforcing element 69, and a third reinforcing element (front-side flange section) 71 that extends (bends) to the inside in the width direction at a right angle from the front-end edge of the second reinforcing element 70. In the configuration illustrated in FIG. 19(c), the inner end edge in the width direction of the third reinforcing element 71 (right end edge of FIG. 19(c)) is located on the outside in the width direction than the inside surface in the width direction of the supporting plate body 64.

Figure 19D:
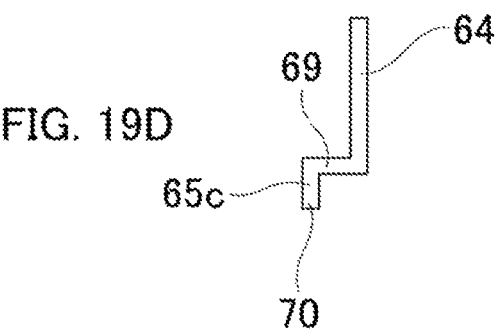

The cross-sectional shape of the reinforcing members 65c of FIG. 19(d) on the virtual plane that is orthogonal to the supporting plate body 64 is approximately L-shaped. Specifically, the reinforcing members 65c comprises a first reinforcing element (rear-side flange section) 69 that extends (bends) outward in the width direction from the front-end edge of the supporting plate body 64 and a second reinforcing element (front-side flange section) 70 that extends (bends) forward at a right angle from the first reinforcing element 69.

As illustrated in FIG. 19(e) and FIG. 19(f), it is also possible to form reinforcing members 65d, 65e with plate sections that have thicker dimension in the width direction than the supporting plate body 64. The reinforcing member 65d as illustrated in FIG. 19(e) does not change in the thickness dimension in the up-down direction and the forward-backward direction. Further, the inside surface in the width direction of the supporting plate body 64 and the inside surface in the width direction of the reinforcing member 65d exist on the same plane. On the other hand, the reinforcing member 65e as illustrated in FIG. 19(f) has a thickness dimension that becomes larger as going forward over the whole length in the up-down direction. In this case, the inside surface in the width direction of the supporting plate body 64 and the inside surface in the width direction of the reinforcing member 65e exist on the same plane and the outside surface in the width direction of this reinforcing member 65e is inclined in a direction toward outside in the width direction as going toward the front side. Here, in the illustrated example, although the reinforcing members 65d, 65e are provided so as to be integral with the supporting plate body 64, they can be also configured by connecting a rod member (or plate member) having an approximately rectangular shaped cross section or a rod member (or plate member) having an approximately triangular shaped cross section with respect to the virtual place that is orthogonal to the supporting plate body 64, that is provided separately from the supporting plate body 64, to the front-end section of the outside surface in the width direction of the supporting plate body 64 (sections indicated by two-dot chain lines in FIG. 19(e) and FIG. 19(f)) by welding. Further, by folding back the front-end section of the supporting plate body 64 backward by 180 degrees, it is also possible to make this folded back section as a reinforcing member.

As stated above, as for the configuration of the reinforcing member, it is possible to employ various configurations where the section modulus in the width direction can be higher compared to a case where the reinforcing member is not provided (or compared to the front-end section of the supporting plate body 64).

The lug sections 66 for welding are provided on the upper sides of the support plate sections 22a (the supporting plate bodies 64 and the reinforcing members 65) so as to incline in a direction toward inside in the width direction as going upward. Sections of the lower edges of the lug sections 66 for welding that are aligned with the supporting plate bodies 64 in the forward-backward direction are connected to the upper end edges of the supporting plate bodies 64. On the other hand, the slits 72 in the forward-backward direction that are open on both ends in the width direction and on the front side are provided between sections of the lower end edges of the lug sections 66 for welding that are aligned with the reinforcing members 65 in the forward-backward direction and the upper end edges of the reinforcing members 65. Therefore, the lower end edges of the lug sections 66 for welding and the upper end edges of the reinforcing members 65 are separated and are not continuous. Due to this, as will be explained later, even when the lug sections 66 for welding are welded and fastened to the bottom surface of the bridge plate section 55, the upper end edges of the reinforcing members 65 are not connected to the bottom surface of the bridge plate section 55 and are free ends.

In the present example, slits in the up-down direction 73 that pass through the pair of support plate sections 22a in the width direction and extend in the up-down direction are provided in sections of the pair of support plate sections 22a that are adjacent to the reinforcing members 65 (boundary locations between the supporting plate bodies 64 and the reinforcing members 65).

Specifically, the slits 73 in the up-down direction are provided from the sections near the upper end to the sections near the lower end of the reinforcing members 65. In other words, the slits 73 in the up-down direction are provided in sections of the boundary locations between the supporting plate bodies 64 and the reinforcing members 65 that are located from the position above than the pair of tilt adjustment long holes 23a to the position lower than these with regard to the up-down direction. Therefore, the slits 73 in the up-down direction are formed in wide ranges that are above and lower than the sections where the positions in the up-down direction overlap with the tilt adjustment long holes 23a. However, in the present example, the up-down positions of the upper end section and the lower end section of the respective slits 73 in the up-down direction are controlled so that the upper end section and the lower end section of the respective slits 73 in the up-down direction do not reach the upper end section and the lower end section of the respective supporting plate bodies 64. Preferably, although it is different from the configuration illustrated in FIG. 3, the upper end sections and the lower end sections of the slits 73 in the up-down direction are made to be positioned in sections between the torque transmission surfaces 49a, 49b with respect to the up-down direction in the assembled state.

The slits 73 in the up-down direction respectively comprise an upper slit 74 having an approximately circular shape as seen from the width direction, a lower side slit 75 having a long circular shape that extends in the forward-backward direction as seen from the width direction, and an intermediate slit 76 having a linear shape as seen from the width direction and connects the upper side slit 74 and the lower side slit 75 in the up-down direction. The slits 73 in the up-down direction are provided to moderately lower the rigidity of the surroundings of the pair of tilt adjustment long holes 23a. Further, the upper side slits 74 and the lower side slits 75 are provided to prevent concentration of stress in the surroundings of the upper end sections and the lower end sections of the slits 73 in the up-down direction (sections where the upper side slits 74 and the lower side slits 75 are provided).

Figure 56:
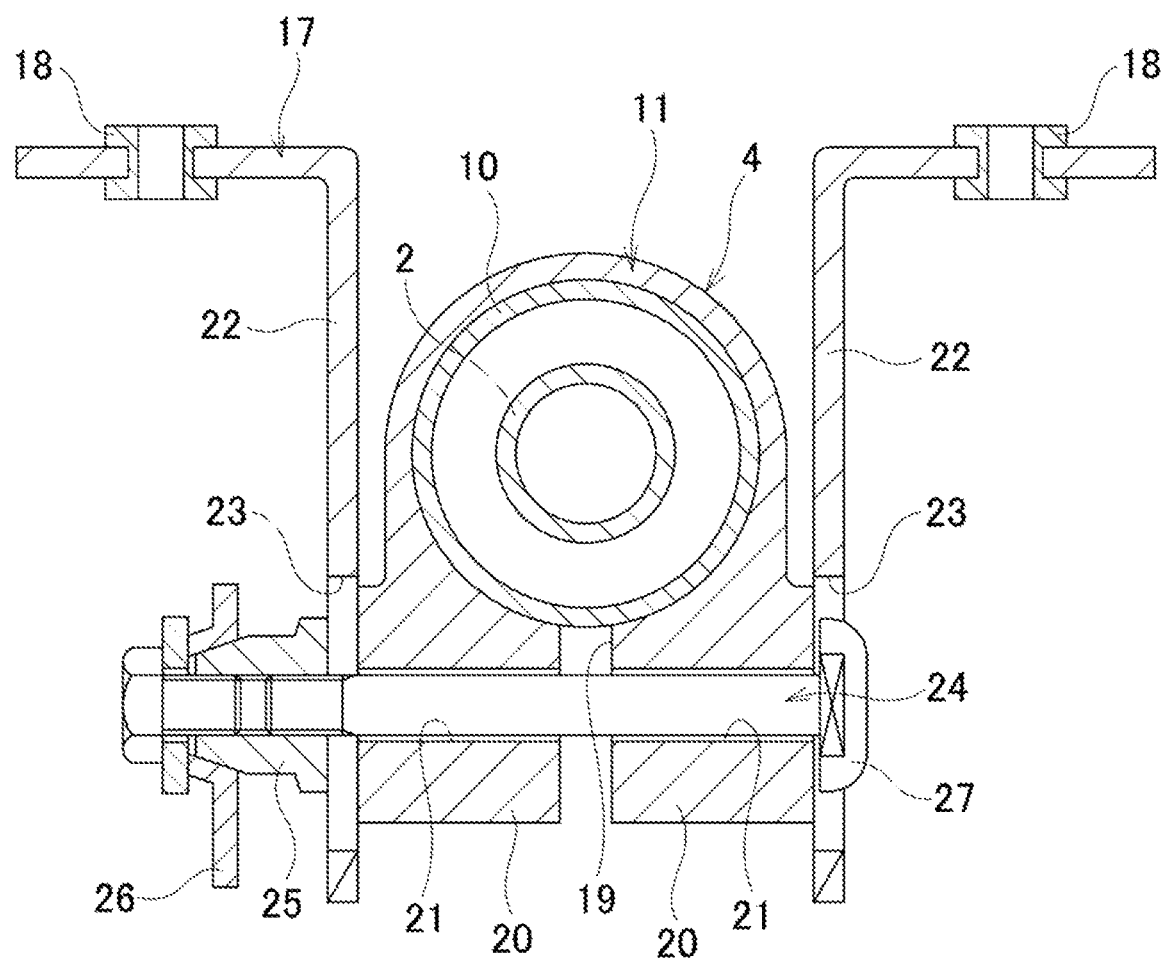
FIG. 56 is a cross-sectional view of section F-F of an example of the steering apparatus illustrated in FIG. 55.
Figure 57:
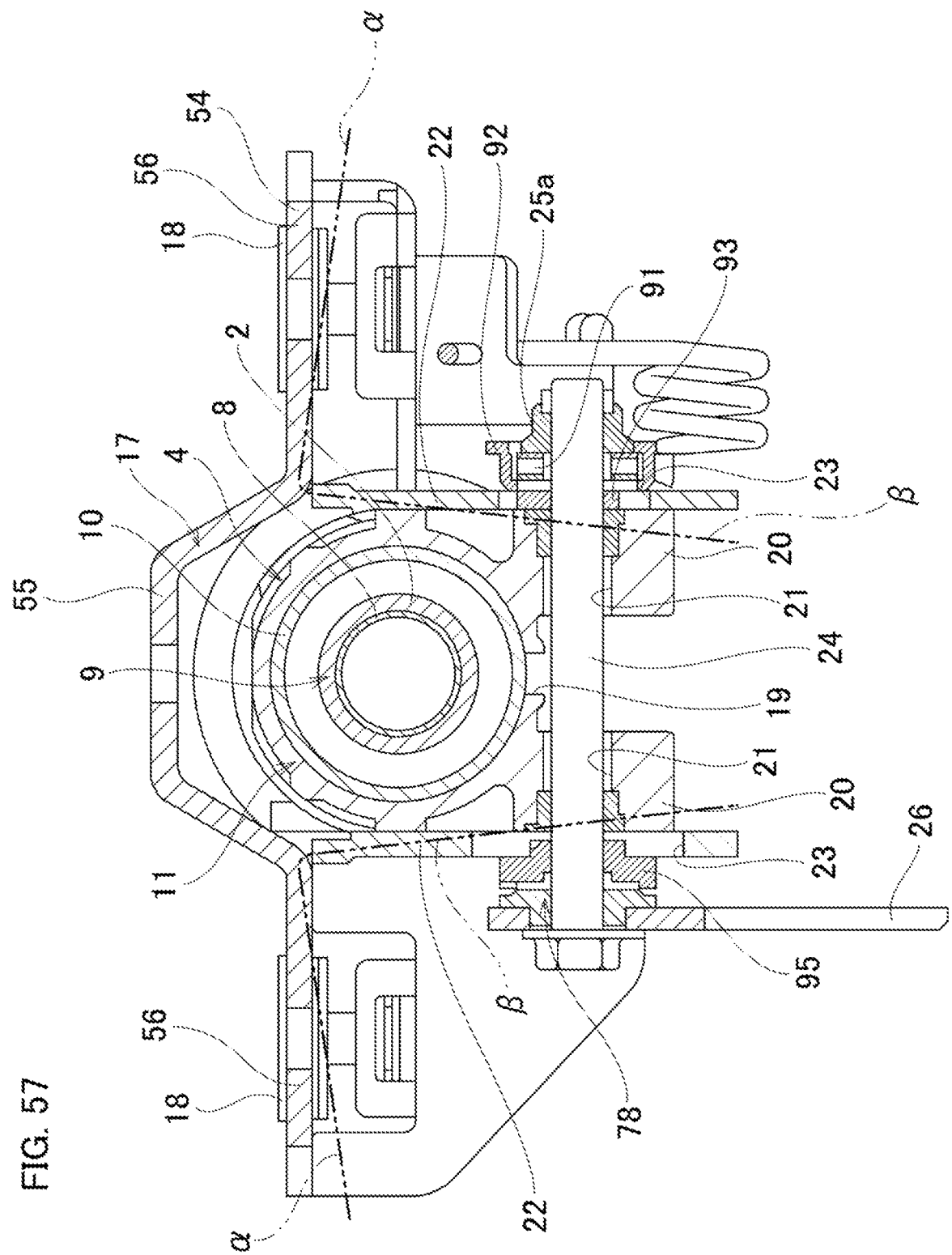
FIG. 57 is a view similar to FIG. 56 and illustrates another example of a steering apparatus of the conventional construction.

The positions with respect to the forward-backward direction of the slits 73 in the up-down direction are not limited to the present example. For example, when the distance in the forward-backward direction between the reinforcing members 65 and the pair of tilt adjustment long holes 23a is large, the slits 73 in the up-down direction can be provided in sections near the pair of tilt adjustment long holes 23a. In this case, preferably, the slits 73 in the up-down direction are provided in positions that do not superimpose with a pair of pressing sections in the width direction (the adjustment nut 25 and the anchor section 27 (see FIG. 56), or, the driven-side cam 95 and the nut 25a (see FIG. 57)).

The upper end edges of the pair of support plate sections 22a having such configurations as stated above are fixed to the outer end sections in the width direction of the lower side surface of the bridge plate section 55 of the installation plate section 54. That is, the upper end edges of the pair of support plate sections 22a are connected and fixed to the pair of side inclined plate sections 58 of the bridge plate section 55 of the installation plate section 54 having a relatively high rigidity compared to the pair of side plate sections 56 of the installation plate section 54.

Specifically, in the present example, the pair of support plate sections 22a are fixed by welding the lower end sections of the outside surfaces in the width direction of the lug sections 66 for welding to the outer end edges in the width direction of the pair of side inclined plate sections 58 in a state where the outside surfaces in the width direction of the lug sections 66 for welding come in contact with the lower end sections of the inside surfaces in the width direction of the pair of side inclined plate sections 58 of the bridge plate section 55. In other words, the lower end sections of the outside surfaces in the width direction of the lug sections 66 for welding and the outer end edges in the width direction (lower end edges) of the pair of side inclined plate sections 58 are connected via welded sections 77. It is also possible to connect the upper end edges of the lug sections 66 for welding to the inside surfaces in the width direction of the pair of side inclined plate sections 58.

An adjustment rod 24a is inserted in the width direction of the pair of telescopic adjustment long holes 21a and the pair of tilt adjustment long holes 23a. This adjustment rod 24a comprises an anchor section 27 (see FIG. 56) that is located on one end section in the width direction (axial direction), a male screw section that is formed on the other end in the width direction, and a shaft section that is formed in the middle section in the width direction. The adjustment rod 24a having such configuration is inserted through the pair of telescopic adjustment long holes 21a and the pair of tilt adjustment long holes 23a. Further, the anchor section 27 that is provided on the one end side in the width direction of the adjustment rod 24a is engaged with the tilt adjustment long holes 23a that is formed in one support plate section 22a of the pair of support plate sections 22a (right side in FIG. 2) so as not to be able to relatively rotate. Further, a cam apparatus 78 (see FIG. 57) which comprises a drive-side cam and a driven-side cam or an adjustment nut 25 (see FIG. 56) and an adjustment lever 26 are provided in the surroundings of a section of the shaft section of the adjustment rod 24a that protrudes in the width direction from the outside surface of the other support plate section 22a of the pair of support plate sections 22a (left side in FIG. 2) by screwing the nut (not shown) onto the male screw section. Accordingly, by relatively rotating the drive-side cam 94 (see FIG. 57) against the driven-side cam 95 (see FIG. 57) based on the swing operation of this adjustment lever 26a, the width dimension (dimension in the axial direction) of this cam apparatus 78 is expanded and contracted.

In the illustrated steering apparatus, a steering lock apparatus which is a kind of anti-theft device for vehicles is provided. For this reason, a lock through hole 33a that penetrates in the radial direction is provided in the cylindrical section 35 of the rear half section of the outer column 11a. Further, a fixing section 80 for supporting and fastening a lock unit (not shown) is provided in a section on the outer circumferential surface of this cylindrical section 35 that is deviated from this lock through hole 33a in the circumferential direction. By using a pair of mounting flange 81 of this fixing section 80, the lock unit is supported by and fastened to around the lock through hole 33, and a key-lock collar (not shown) is fitted and fastened onto a part of the steering shaft 2 where the phase in the axial direction matches with the lock unit. When an ignition key is turned off, the tip end section of the lock pin of the lock unit is displaced toward the inner diameter side of the outer column 11a and engaged with the key-lock recessed section that is provided on the outer circumferential surface of the key-lock collar. By doing so, rotation of the steering shaft 2 is made substantially impossible. Here, "substantially impossible" means that, when the steering wheel 1 (see FIG. 54 and FIG. 55) is rotated with force that exceeds a certain level (force that exceeds the value that is prescribed by the key-lock regulation) in a state where the key-lock recessed section and the tip end section of the lock pin are engaged when the key is locked, the steering shaft 2 is allowed to rotate with respect to the key-lock collar and the steering column 4. However, the steering shaft 2 does not rotate with power to operate the steering wheel 1 with normal driving posture in order to apply desired steering angles to the steered wheels.

In the present example having such configurations as stated above, in order to maintain the steering wheel 1 in a desired position (when switching from an unlocked state to a locked state), after moving the steering wheel 1 to a desired position, the adjustment lever 26a is rotated in a certain direction (generally upward) around the adjustment rod 24a. Then, by expanding the width dimension of the cam apparatus 78, the distance between the inside surfaces of the pair of support plate sections 22a is contracted. When doing this, in the present example, the inside surfaces of the pair of support plate sections 22a press the torque transmission surfaces 49a, 49b and the pressing surfaces 40 provided in the lower end sections (tip end sections) of the pair of clamp sections 38. Then, the middle sections in the up-down direction of the pair of support plate sections 22a and the pair of clamp sections 38 are bent (plastically deformed) inward in the width direction so as to elastically hold the outer circumferential surface of the inner column 10. As a result, the steering wheel 1 can be maintained at a position after adjustment. When doing this, regardless of the position of the steering wheel 1 in the forward-backward direction, the front-end edges 85 of the reinforcing members 65 do not come in contact with the torque transmission surfaces 49a, 49b and the pressing surfaces 40.

On the other hand, when adjusting the position of the steering wheel 1 (when switching the state from a locked state to an unlocked state), the adjustment lever 26a is swung in a direction that is opposite to the certain direction (generally downward). Then, by contracting the width dimension of the cam apparatus 78, the distance between the inside surfaces of the pair of support plate sections 22a is expanded. As a result, pressing force by the pair of support plate sections 22a lowers and the width dimension of the pair of clamp sections 38 elastically expands, so that the force for maintaining the outer circumferential surface of the inner column 10 lowers. In this state, in a range where the adjustment rod 24a can move within the pair of telescopic adjustment long holes 21a and the pair of tilt adjustment long holes 23a, it is possible to adjust the forward-backward position and the up-down position of the steering wheel 1.

Especially, with the steering apparatus of the present example, it is possible to ensure both the strength of the outer column 11a and the retentivity of the inner column 10. That is, in the present example, on both sides in the width direction of the outer column 11a, a pair of clamp sections 38 for elastically holding the outer circumferential surface of the inner column 10 and torque transmission surfaces 49a, 49b for transmitting torque, which acts on the outer column 11a when, for example, the steering wheel 1 is operated with a large force in a state where the steering lock apparatus is turned on, to the inside surfaces of the pair of support plate sections 22a of the support bracket 17a are provided separately and independently. Therefore, the pair of clamp sections 38 is only required to demonstrate the function to hold the inner column 10 and it is not required to ensure strength more than required, so it becomes possible to greatly bend in the width direction. On the other hand, the torque transmission surfaces 49a, 49b are only required to demonstrate the function to transmit torque, so it is not required to greatly bend in the width direction. As a result, with the steering apparatus of the present example, it is possible to ensure both the strength of the outer column 11a and the retentivity of the inner column 10.

Further, in the present example, in order to maintain the steering wheel 1 in a desired position, in a state where the pair of clamp sections 38 are bent by the inside surfaces of the pair of support plate sections 22a, these inside surfaces of the pair of support plate sections 22a come in contact with the torque transmission surfaces 49a, 49b that are provided in sections where the rigidity in the width direction is higher than the pair of clamp sections 38. Therefore, it is also possible to increase the support rigidity of the outer column 11a. Further, the torque transmission surfaces 49a, 49b that support torque acting on the outer column 11a are provided in sections that have large distances from the center axis of the outer column 11a. As such, it becomes possible to suppress force that acts on the torque transmission surfaces 49a, 49b at low level so as to ensure sufficient strength for these torque transmission surfaces 49a, 49b.

In the present example, the reinforcing members 65 are provided in the pair of support plate sections 22a. Therefore, it is possible to increase the flexural rigidity of the pair of support plate sections 22a with respect to the torque that acts from the outer column 11a (torque transmission surfaces 49a, 49b). As a result, it is possible to prevent the pair of support plate sections 22a from plastically deforming based on the torque (greatly bending in a doglegged shape with torque transmission surfaces 49a, 49b as fulcrums), and the vibration rigidity of the pair of support plate sections 22a during maintaining the outer column 11a becomes high so that it is possible to stably maintain the outer column 11a. Especially, even when the thickness dimension of the support bracket 17a is made thin, as it is possible to ensure the rigidity of the pair of support plate sections 22a by providing the reinforcing members 65, it is possible to achieve both weight reduction and high rigidity (improvement in durability).

Further, with the present example, even when the accuracy of the pair of side plate sections 56 or the installation surface (not shown) on the vehicle body side is deteriorated, it is prevented that the accuracy influences on the pair of support plate sections 22a.

Figure 1:
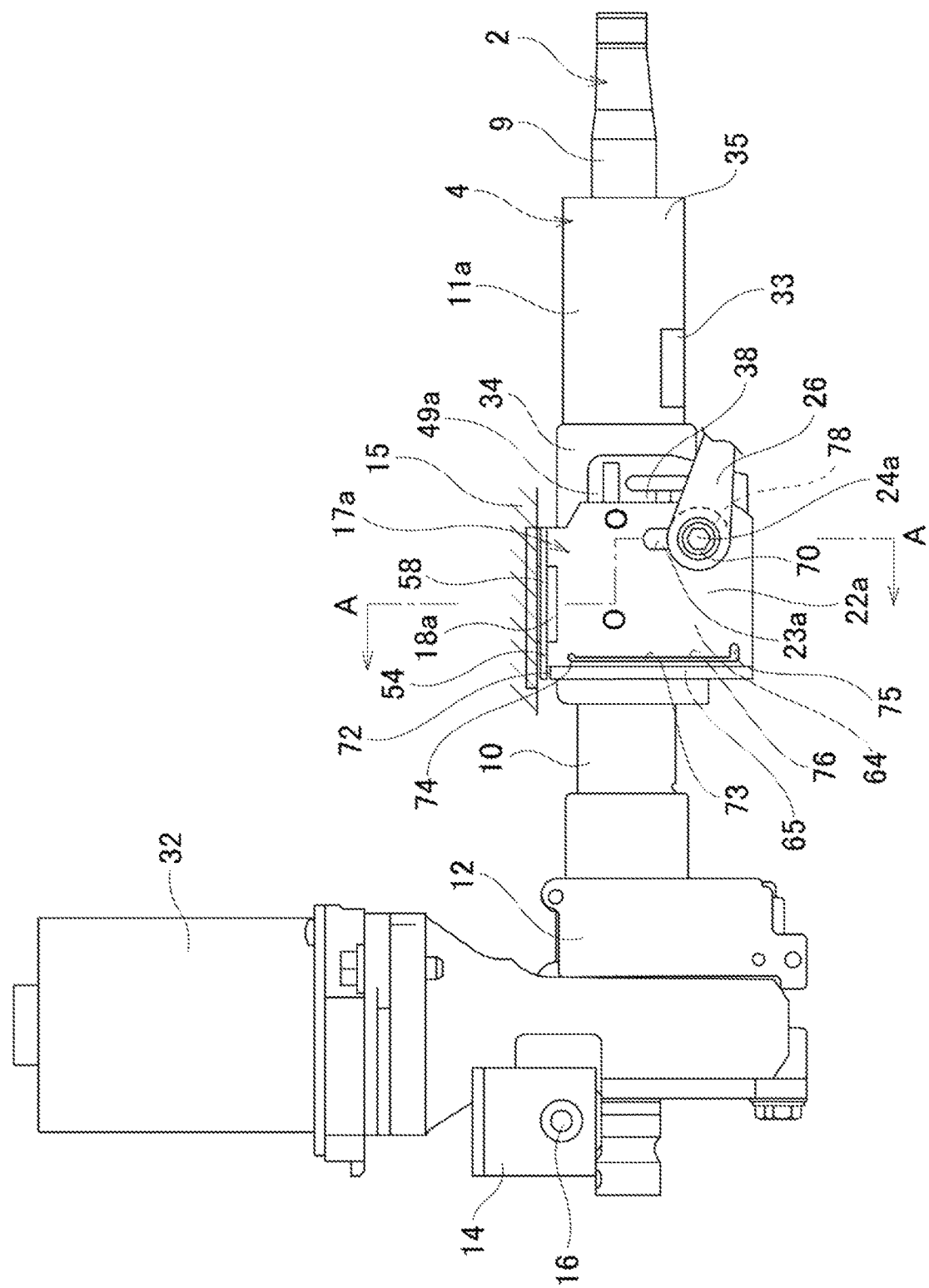
FIG. 1 is a side view illustrating a steering apparatus of a first example of an embodiment viewed from one side in the width direction.
Figure 2:
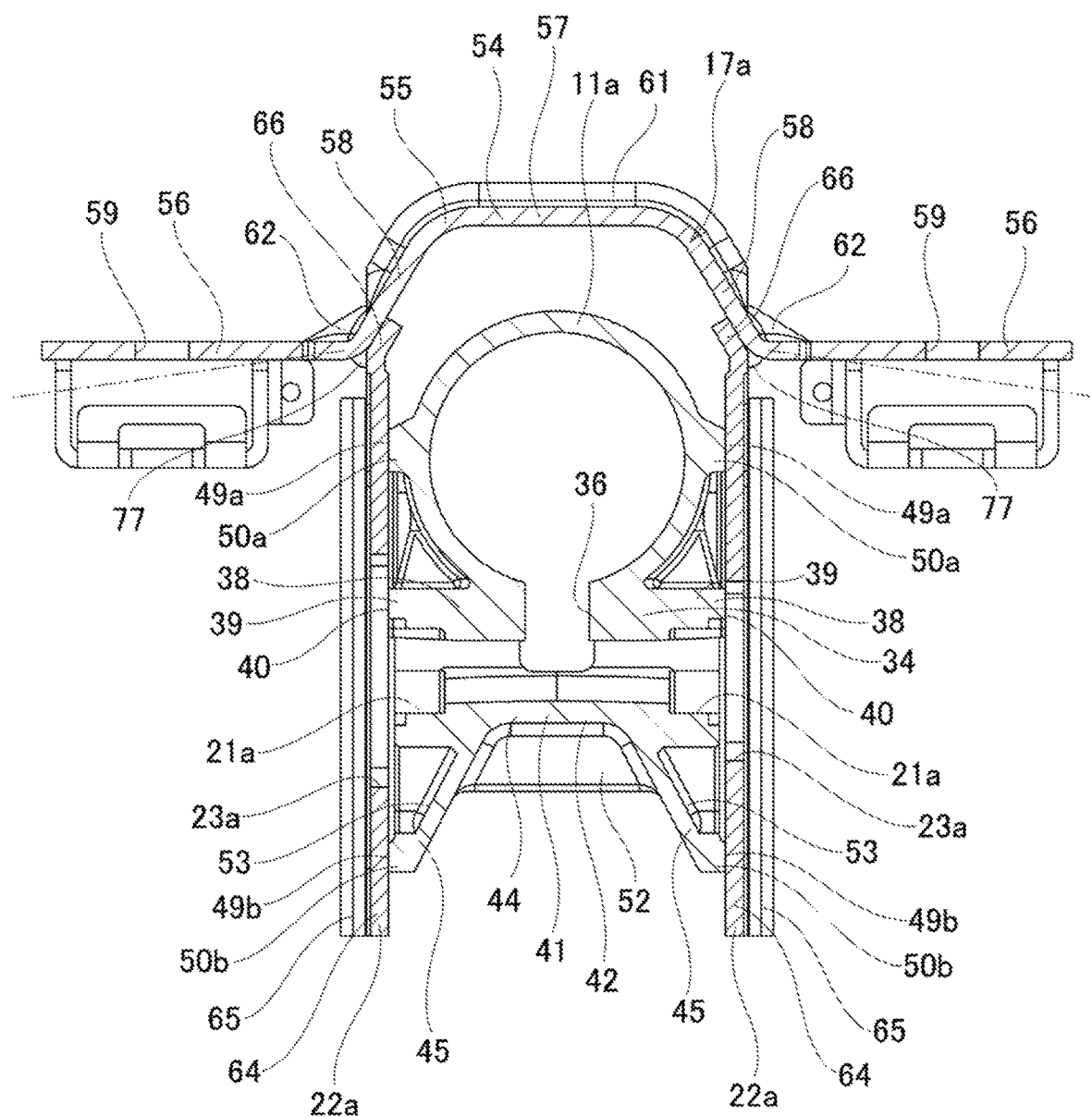
FIG. 2 is an enlarged cross-sectional view of section A-O-O-A in FIG. 1 with part omitted.
Figure 3:
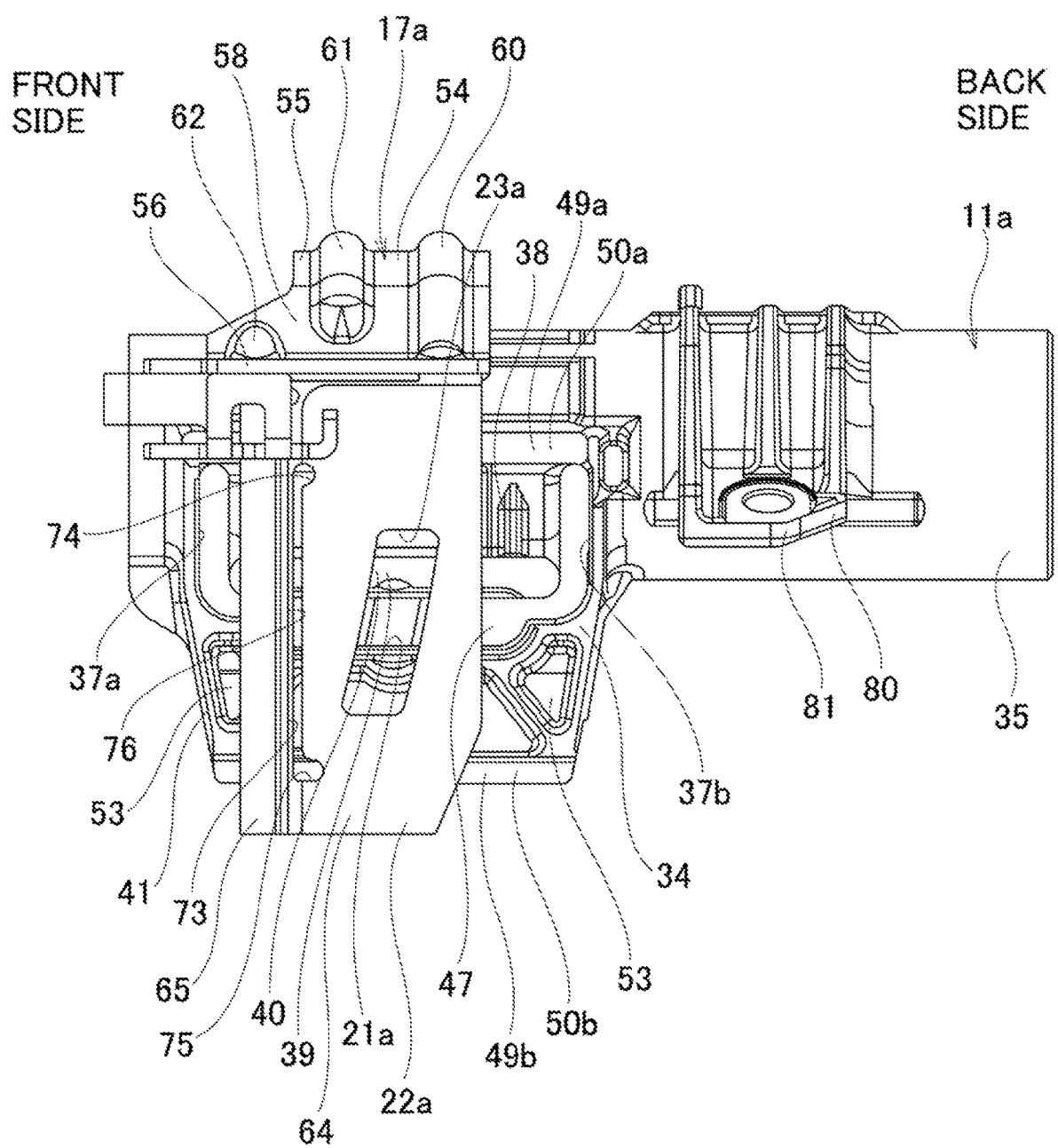
FIG. 3 is a side view illustrating an outer column and a support bracket which are taken out from the apparatus illustrated in FIG. 1 and viewed from one side in the width direction.
Figure 4:
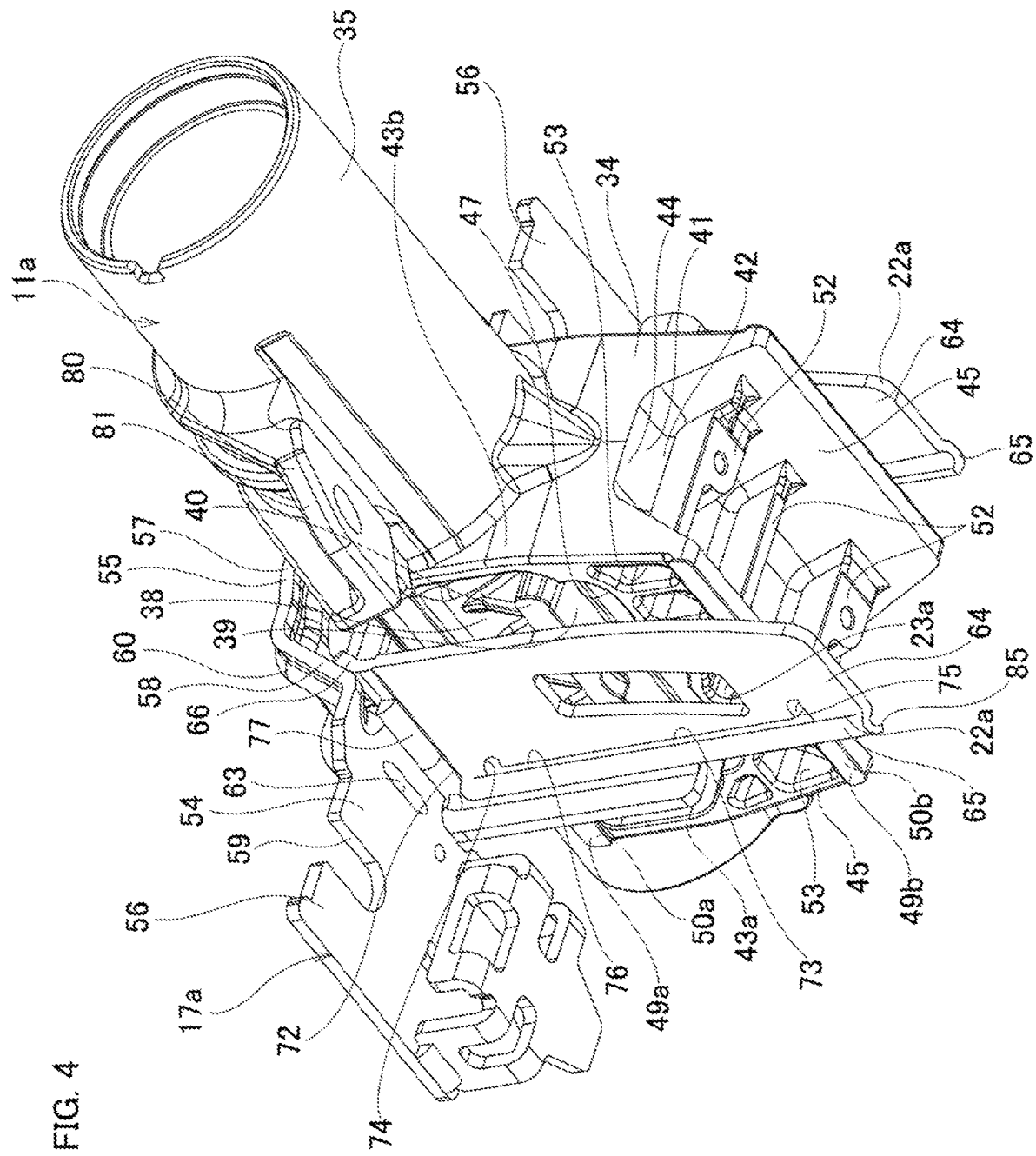
FIG. 4 is a perspective view illustrating the outer column and the support bracket illustrated in FIG. 3 as viewed from the rear and lower side.
Figure 5:
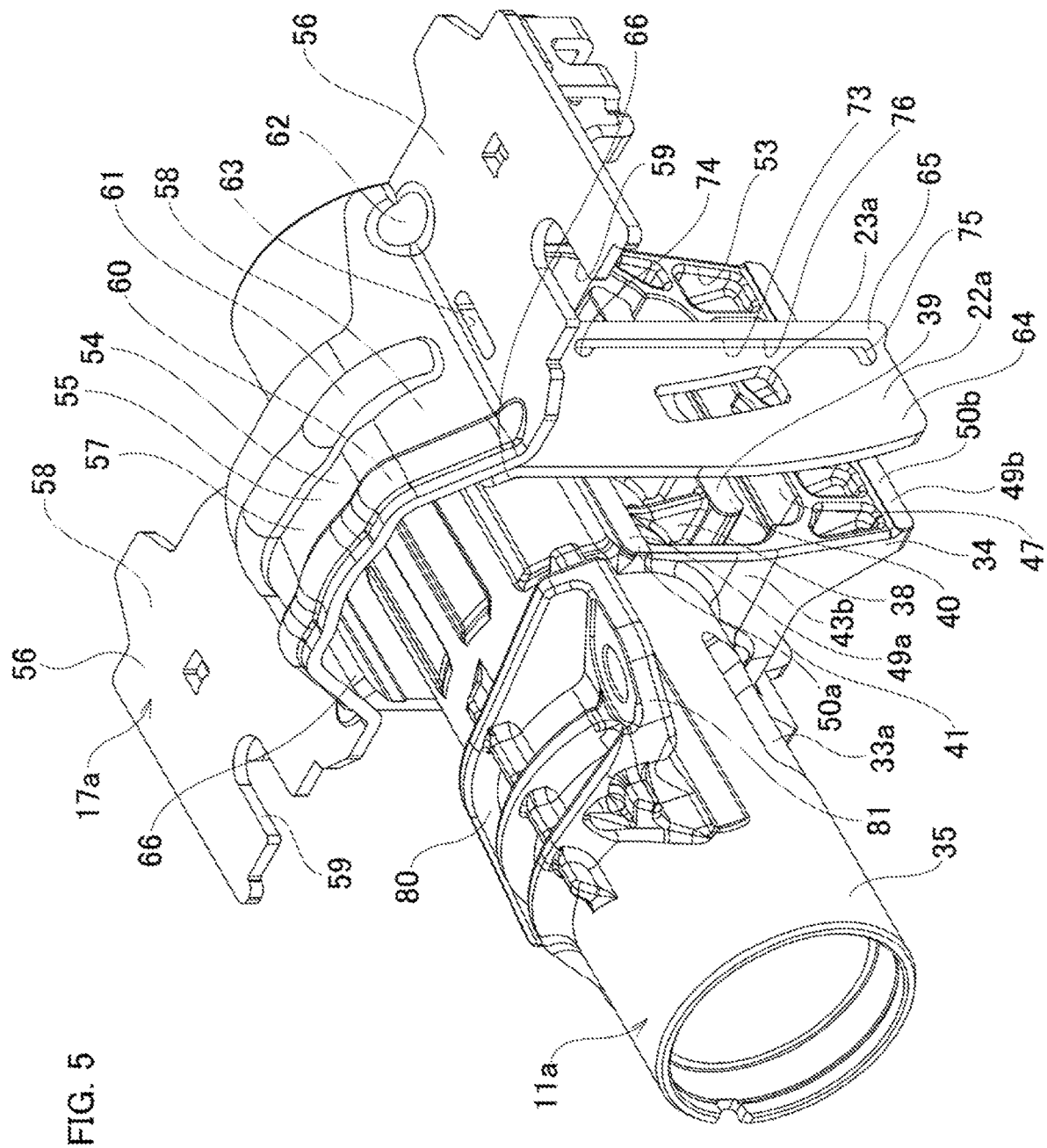
FIG. 5 is a perspective view illustrating the outer column and the support bracket illustrated in FIG. 3 as viewed from the rear and upper side.
Figure 6:
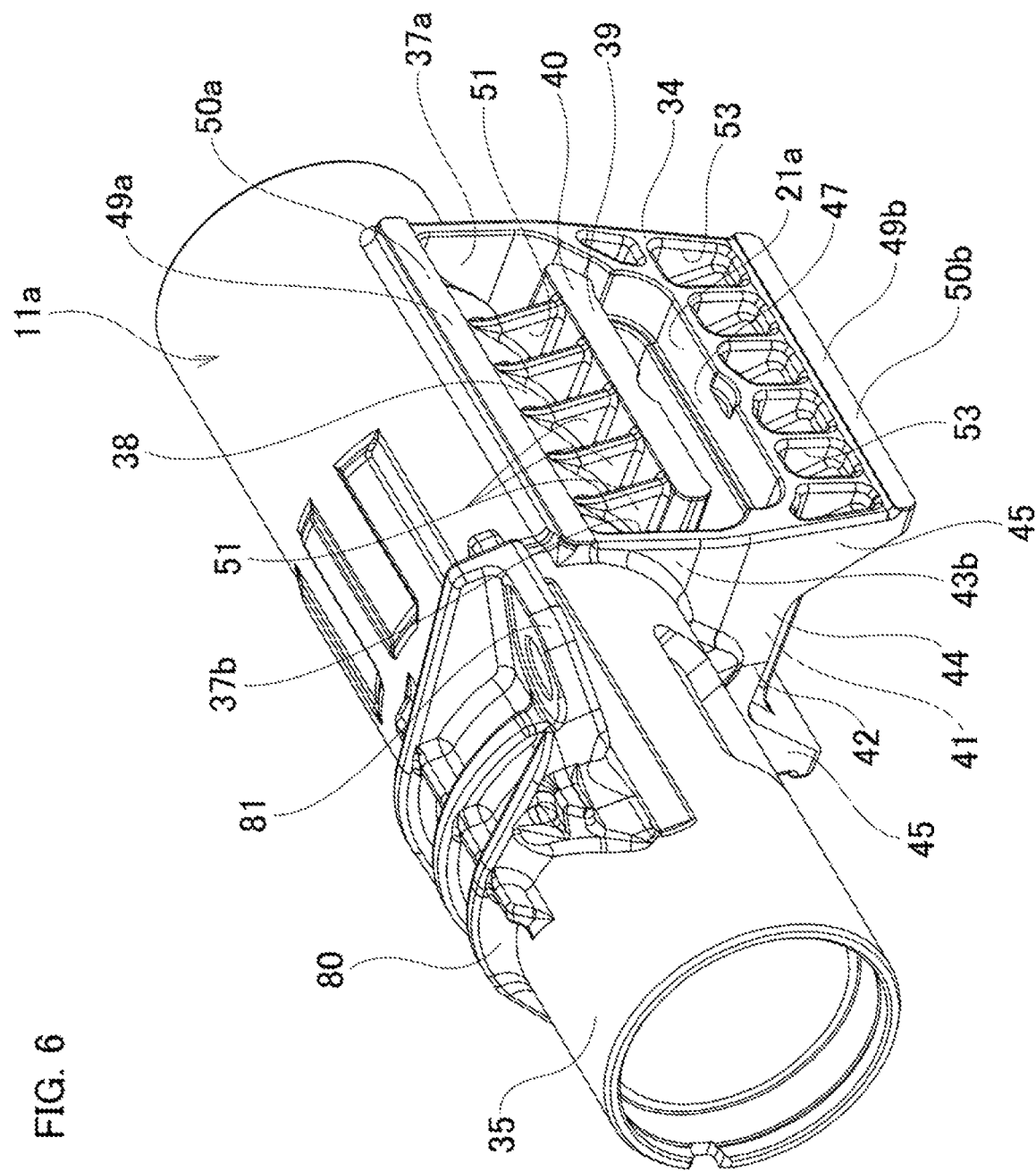
FIG. 6 is a perspective view illustrating the outer column taken out from the outer column and the support bracket illustrated in FIG. 3 and viewed from the rear and upper side.

For example, when the installation surface on the vehicle body side is inclined (slant downwards) in the width direction (left and right direction of FIG. 2) as illustrated with two-dot chain lines in FIG. 2, in an assembled state, the pair of side plate sections 56 as well incline in the width direction as illustrated with two-dot chain lines in FIG. 2. If such influence of inclination of the pair of side plate sections 56 affects on the pair of support plate sections 22a, the pair of support plate sections 22a incline (deform) in a direction in which the lower end sections approach each other. As a result, the pair of support plate sections 22a comes in contact with the outer column 11a in sections that are different from where it should come into contact so that there is a possibility that the operability may deteriorate when adjusting the position of the steering wheel 1.

In the present example, by providing the first rib 60 and the second rib 61 in the bridge plate section 55, the rigidity of the bridge plate section 55 of the installation plate section 54 is made higher than the rigidity of the pair of side plate sections 56 of the installation plate section 54, and even when the pair of side plate sections 56 are inclined or deformed, it is made that the bridge plate section 55 is not or hardly affected by this inclination or deformation. Further, installation-side slits 63 are provided in the inner end sections in the width direction (near the connecting sections with the bridge plate section 55) of the pair of side plate sections 56. Due to the existence of this installation-side slits 63 as well, the pair of side plate sections 56 incline or deform using the sections where the installation-side slits 63 are provided as fulcrums, and the influence of this inclination (deformation so that the outer end side section in the width direction displaces in the up-down direction) is less affected to the bridge plate section 55. Here, besides the pair of installation-side slits 63 are through-holes that pass through the pair of side plate sections 56 in the thickness direction like in this example, it is also possible to make the pair of installation-side slits 63 as configurations such as recessed sections, grooves, and openings that do not pass through the pair of side plate sections 56 in the thickness direction and extend in the forward-backward direction. Further, it is also possible to form the pair of installation-side slits 63 by through-holes or recessed sections that are arranged separately in the forward-backward direction instead of the through-holes or recessed sections that extend in the forward-backward direction.

Further, as the first rib 60 is extended to the connecting sections between the bridge plate section 55 and the pair of side plate sections 56 and the pair of third ribs 62 are provided in the connecting sections and arranged separately from the first rib 60 in the forward-backward direction, to increase the rigidity of the connecting sections, even when the pair of the side plate sections are inclined or deformed, the influence due to this inclination or deformation of the pair of side plate sections 56 is not or hardly affected to the bridge plate section 55.

Here, in the present example, an installation-side slit 63 is provided in both of the pair of side plate sections 56 respectively, however, in the present invention, by providing an installation-side slit 63 only in one of the pair of side plate sections 56, it is possible for the bridge plate section 55 to be less affected by the inclination or deformation even when the pair of side plate sections 56 are inclined or deformed. In this case, only in one side plate section 56 where the one installation-side slit 63 is provided, the first rib 60 may extend until the connecting section between the bridge plate section 55 and this side plate section 56 and the third rib is provided in this connecting section and arranged separately from the first rib in the forward-backward direction.

Further, a construction may be employed in which the first rib 60 does not extend in the width direction of the vehicle body in the bridge plate section 55, and instead of that, as similar to the third rib 62, the first rib is respectively provided only in the connecting sections between the bridge plate section 55 and the pair of side plate sections 56.

In the present example, optionally, the slits 73 in the up-down direction are provided in the connecting sections between the supporting plate bodies 64 and the reinforcing members 65 of the pair of support plate sections 22a. Therefore, it is possible to moderately reduce the rigidity of the sections of the pair of support plate sections 22a that are located between the slits 73 in the up-down direction and the pair of tilt adjustment long holes 23a (around the pair of tilt adjustment long holes 23a). That is, when the slits 73 in the up-down direction are not provided, the rigidity of the sections that are located between the reinforcing members 65 and the pair of tilt adjustment long holes 23a of the pair of support plate sections 22a becomes higher due to the existence of the reinforcing members 65, and the sections that are located around the pair of tilt adjustment long holes 23a of the pair of support plate sections 22a become difficult to plastically deform when switching from the unlocked state to the locked state, and there is a possibility that the force that presses the pressing surfaces 40 by the pair of support plate sections 22a, may be lowered. In the present example, the rigidity of the sections around the pair of tilt adjustment long holes 23a is made to be moderately small by providing the slits 73 in the up-down direction so as to prevent reduction in force that presses the pressing surfaces 40. However, it is possible to omit the slits 73 in the up-down direction in the present example as well.

When the sections having a high rigidity of the pair of support plate sections 22a that is off in upwards and downwards from the slits 73 in the up-down direction with respect to the up-down direction are made to come into contact with the torque transmission surfaces 49a, 49b, the support rigidity of the outer column 11a can be high regardless of the existence of the slits 73 in the up-down direction.

Further, the pair of support plate sections 22a is connected to the bridge plate section 55 via the lug sections 66 for welding by welding. That is, the pair of support plate sections 22a is connected not to the pair of side plate sections 56, but it is directly connected to and fastened to the bridge plate section 55 having a high rigidity and is not easily affected by the influence of inclination or deformation of the pair of side plate sections 56. Due to such configuration, it is made that the influence of the inclination or deformation of the pair of side plate sections 56 does not affect or does not easily affect the pair of support plate sections 22a.

Further, as the upper end edges of the reinforcing members 65 having a high rigidity of the pair of support plate sections 22a are not connected to the bridge plate section 55 of the installation plate section 54, the pair of support plate sections 22a becomes easy to bend to the bridge plate section 55. Therefore, even when the bridge plate section 55 is deformed based on the inclination or deformation of the pair of side plate sections 56, it becomes possible for the pair of support plate sections 22a not to be easily affected by the influence of deformation of the bridge plate section 55.

Second Example

Figure 20:
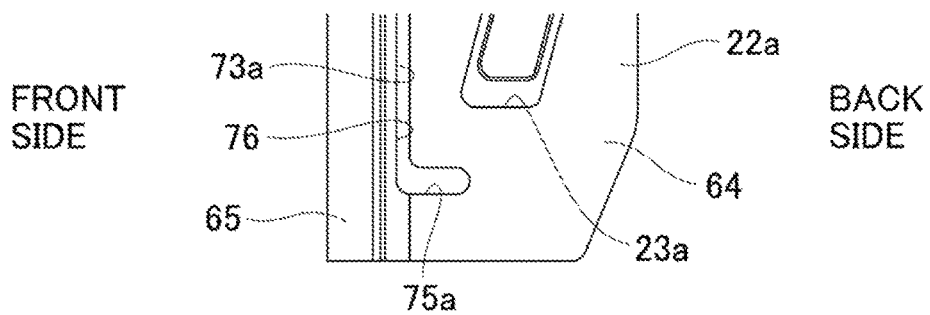
FIG. 20 is a side view illustrating the lower half of a support bracket of a second example of an embodiment as viewed from one side in the width direction.

FIG. 20 illustrates a second example of an embodiment of the present invention. In the present example, the shape of the lower side slits 75a of the slits 73 in the up-down direction is made to be different from the lower side slits 75 of the first example. Specifically, in the present example, the lower side slits 75a are constructed by long holes that extend in the forward-backward direction of which the shape as seen from the width direction. Further, the rear-end edges of the lower side slits 75a are located on the rear side (in the present example, slightly back) than the front-end edges of the lower side edges of the pair of tilt adjustment long holes 23a. When carrying out the configuration of the present example, the position of the rear-end edges of the lower side slits 75a is, for example, determined in a range that is aligned with the pair of tilt adjustment long holes 23a with respect to the forward-backward direction while considering the rigidity of the sections that are located between the reinforcing members 65 and the pair of tilt adjustment long holes 23a of the pair of support plate sections 22a (around the pair of tilt adjustment long holes 23a). Here, it is also possible to make the position of the rear-end edges of the lower side slits 75a to be located on the rear side than the rear-end edges of the lower side edges of the pair of tilt adjustment long holes 23a.

In the present example, it is possible to make the rigidity of the sections around the pair of tilt adjustment long holes 23a of the supporting plate bodies 64 of the pair of support plate sections 22a to be smaller than in the case of the first example. Here, although it is not shown, the upper side slits of the slits 73a in the up-down direction have the same shape as of the first example. However, it is also possible to make the shape of these upper side slits to be symmetrical with the lower side slits 75*a* with respect to the up-down direction. The construction and functions of the other parts are the same as in the first example.

Third Example

Figure 21:
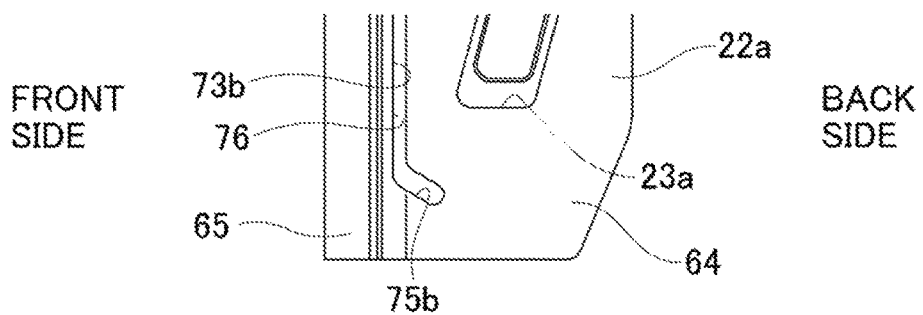
FIG. 21 corresponds to FIG. 20 and illustrates the lower half of a support plate section of a support bracket of a third example of an embodiment.

FIG. 21 illustrates a third example of an embodiment of the present invention. In the present example, the lower side slits 75*b* are made as long holes that incline downward as going toward the rear. Further, the rear-end edges of the lower side slits 75*b* are located on the front side (in the present example, slightly forward) than the front-end edges of the lower side edges of the pair of tilt adjustment long holes 23*a*. When carrying out the configuration of the present example, the position of the rear-end edges of the lower side slits 75*b* is determined while considering the rigidity of the sections around the pair of tilt adjustment long holes 23*a* of the supporting plate bodies 64 of the pair of support plate sections 22*a*. Here, in the present example as well, the shape of the upper side slits of the slits 73*b* in the up-down direction can be symmetrical with the lower side slits 75*b* with respect to the up-down direction. The construction and functions of the other parts are the same as in the first example and the second example.

Fourth Example

Figure 22:
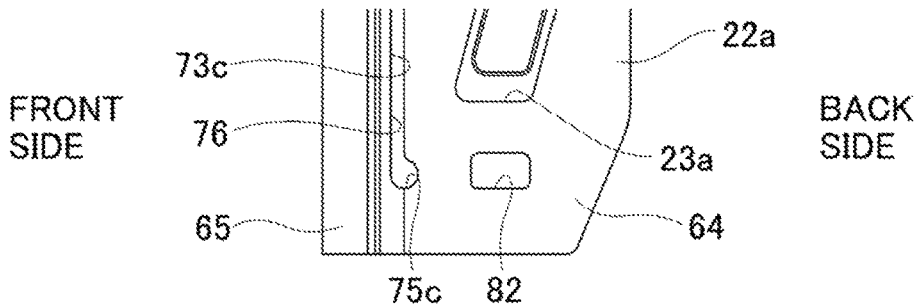
FIG. 22 corresponds to FIG. 20 and illustrates the lower half of a support plate section of a support bracket of a fourth example of an embodiment.

FIG. 22 illustrates a fourth example of an embodiment of the present invention. In the present example, the shape of the lower side slits 75*c* as seen from the width direction is made to be a circular hole having an approximately circular shape. Here, in the present example as well, the upper side slits of the slits 73*c* in the up-down direction can be symmetrical with the lower side slits 75*c* with respect to the up-down direction.

Further, second slits 82 in the forward-backward direction which respectively have a rectangular shape that extends in the forward-backward direction as seen from the width direction is provided in sections located under the pair of tilt adjustment long holes 23*a* of the supporting plate bodies 64 of the pair of support plate sections 22*a*. The front-end edges of the second slits 82 in the forward-backward direction are located on the rear side than the front-end edges of the lower side edges of the pair of tilt adjustment long holes 23*a*, and the rear-end edges match with the rear-end edges of the lower side edges of the pair of tilt adjustment long holes 23*a*. Further, the second slits 82 in the forward-backward direction are aligned with the lower side slits 75*c* of the slits 73*c* in the up-down direction with respect to the up-down direction.

In the present example as well, the rigidity of the sections around the pair of tilt adjustment long holes 23*a* of the pair of support plate sections 22*a* can be moderately small. Here, the position in the up-down direction of the second slits 82 in the forward-backward direction and the positions of the front-end edges and the rear-end edges of the second slits 82 in the forward-backward direction are determined while considering the rigidity of the sections around the pair of tilt adjustment long holes 23*a* of the supporting plate bodies 64 of the pair of support plate sections 22*a*.

In the present example, it is also possible to provide a third slit in the forward-backward direction having the same shape as the second slit 82 in the forward-backward direction respectively on the upper side of the pair of tilt adjustment long holes 23*a*. Alternatively, it is also possible to make the lower side slits 75*c* of the slits 73*c* in the up-down direction and the second slits 82 in the forward-backward direction to be continuous. The construction and functions of the other parts are the same as in the first example and the second example.

Fifth Example

Figure 23:
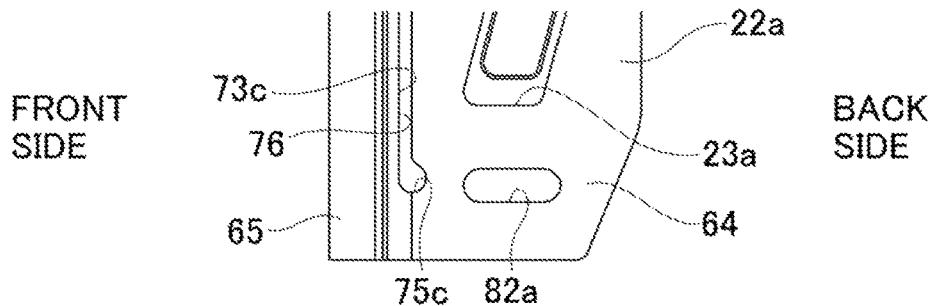
FIG. 23 corresponds to FIG. 20 and illustrates the lower half of a support plate section of a support bracket of a fifth example of an embodiment.

FIG. 23 illustrates a fifth example of an embodiment of the present invention. In the present example, a second slit 82*a* in the forward-backward direction which has a long circular shape as seen from the width direction and extends in the forward-backward direction is respectively provided in the lower side sections of the pair of tilt adjustment long holes 23*a* of the supporting plate bodies 64 of the pair of support plate sections 22*a*. The front-end edges of the second slits 82*a* in the forward-backward direction are located on the rear side than the front-end edges of the lower side edges of the pair of tilt adjustment long holes 23*a*, and the rear-end edges match with the rear-end edges of the lower side edges of the pair of tilt adjustment long holes 23*a*. In the present example as well, the second slits 82*a* in the forward-backward direction are aligned with the lower side slits 75*c* of the slits 73*c* in the up-down direction with respect to the up-down direction. Here, in the present example as well, it is also possible to provide a third slit in the forward-backward direction having the same shape as the second slit 82*a* in the forward-backward direction respectively on the upper side of the pair of tilt adjustment long holes 23*a*. The construction and functions of the other parts are the same as in the first example and the fourth example.

Sixth Example

Figure 24:
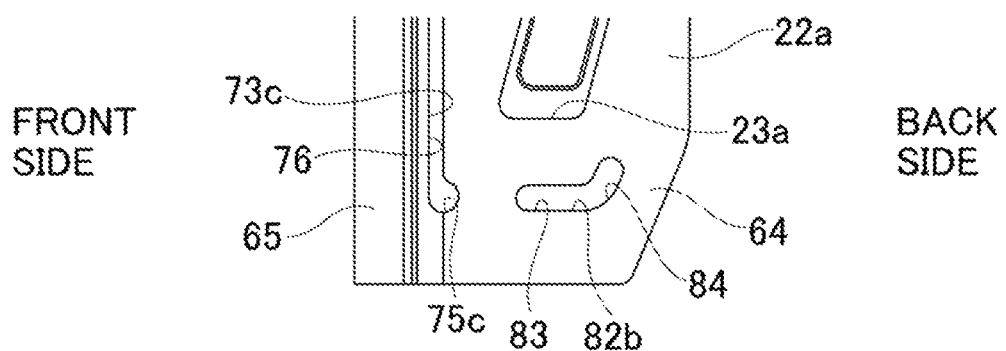
FIG. 24 corresponds to FIG. 20 and illustrates the lower half of a support plate section of a support bracket of a sixth example of an embodiment.
Figure 25:
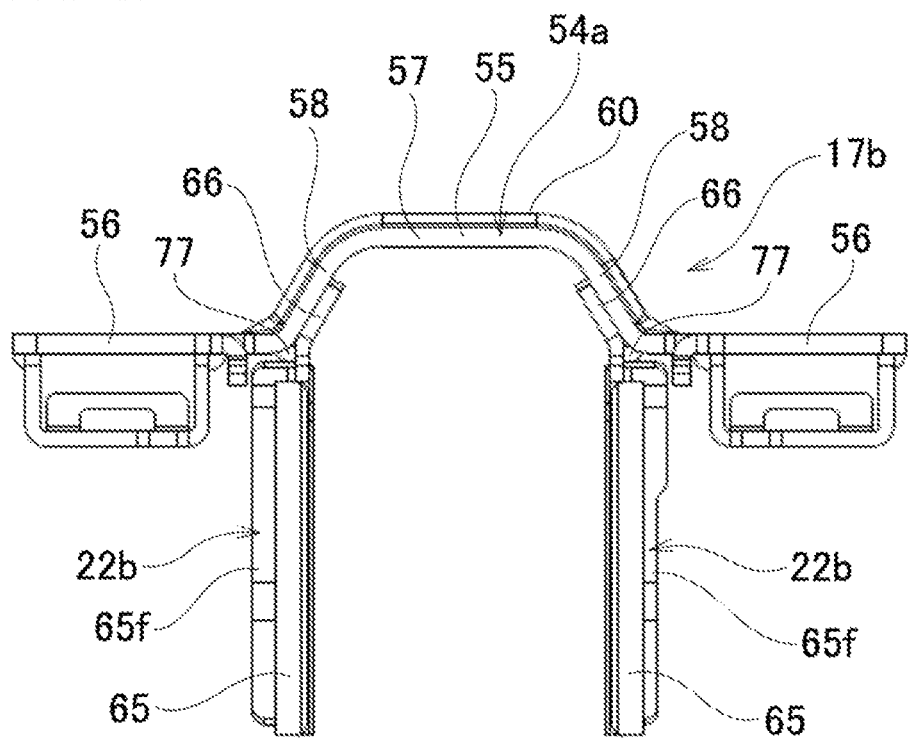
FIG. 25 is a front view illustrating a support bracket of a seventh example of an embodiment.
Figure 26:
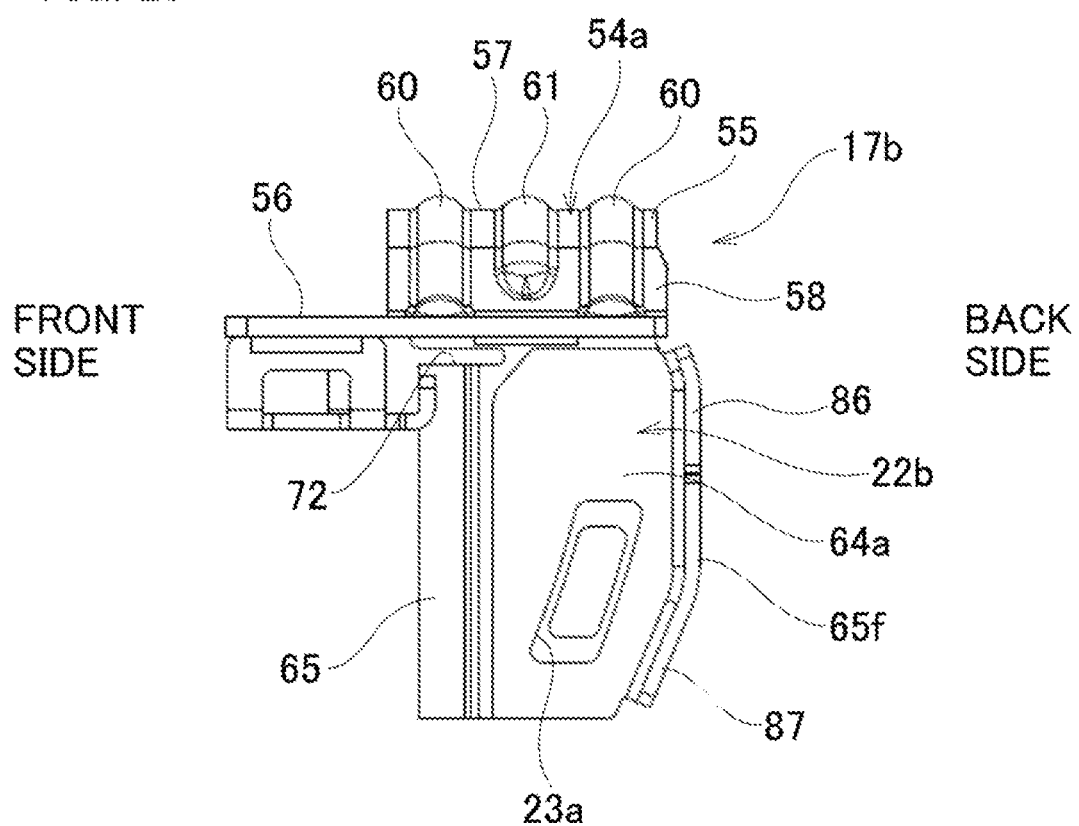
FIG. 26 is a side view of the support bracket of the seventh example of an embodiment as viewed from the right in FIG. 25.
Figure 27:
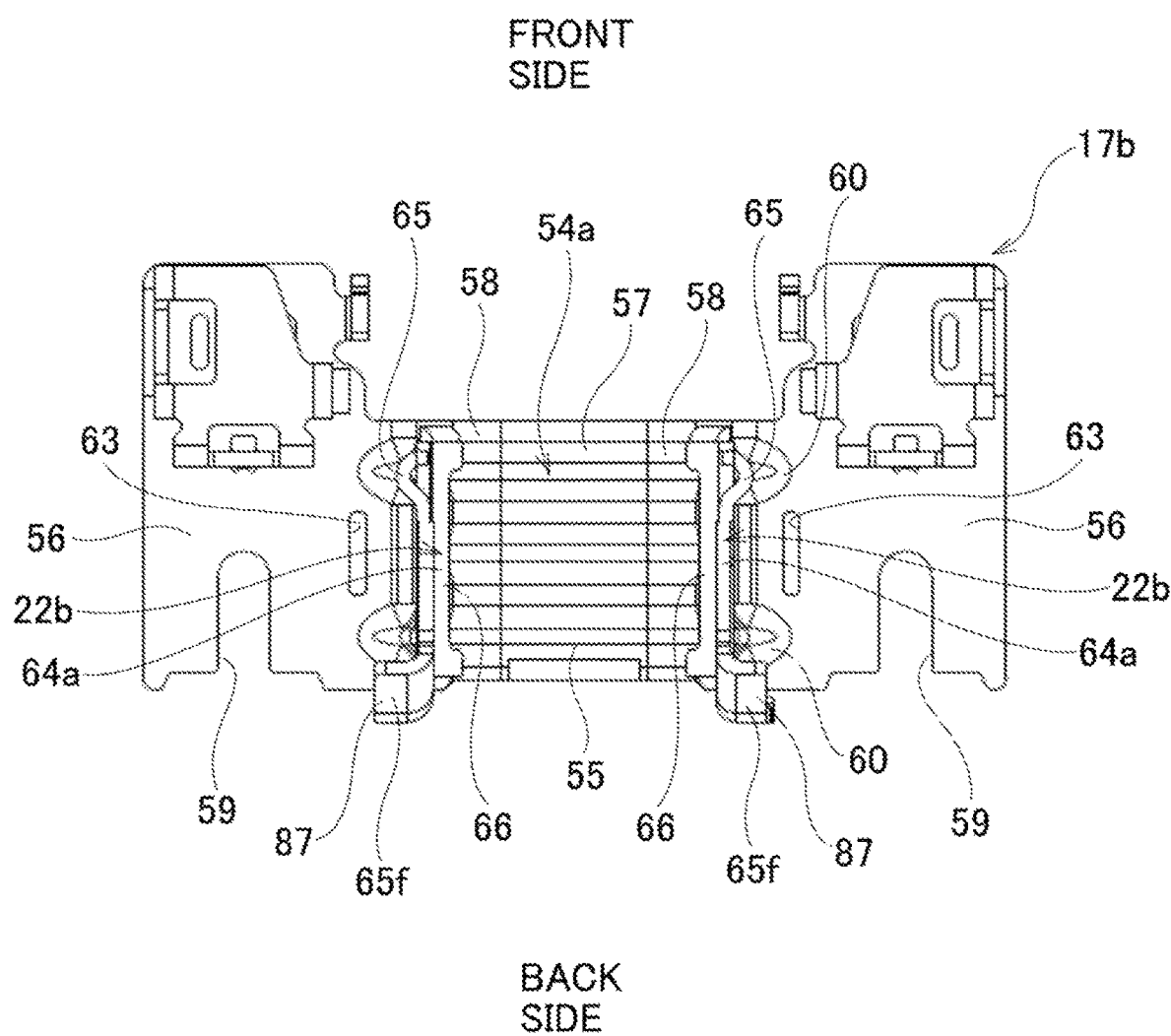
FIG. 27 is a bottom view of the support bracket of the seventh example of an embodiment.
Figure 28:
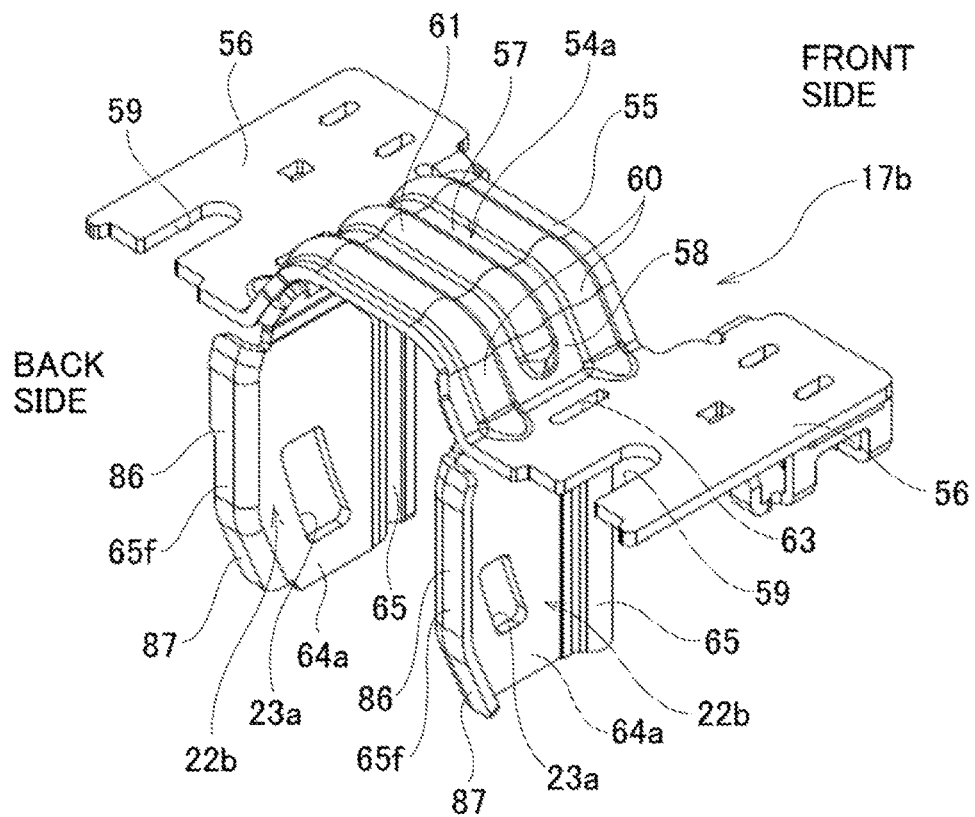
FIG. 28 is a perspective view of the support bracket of the seventh example of an embodiment as viewed from the rear and upper side.
Figure 29:
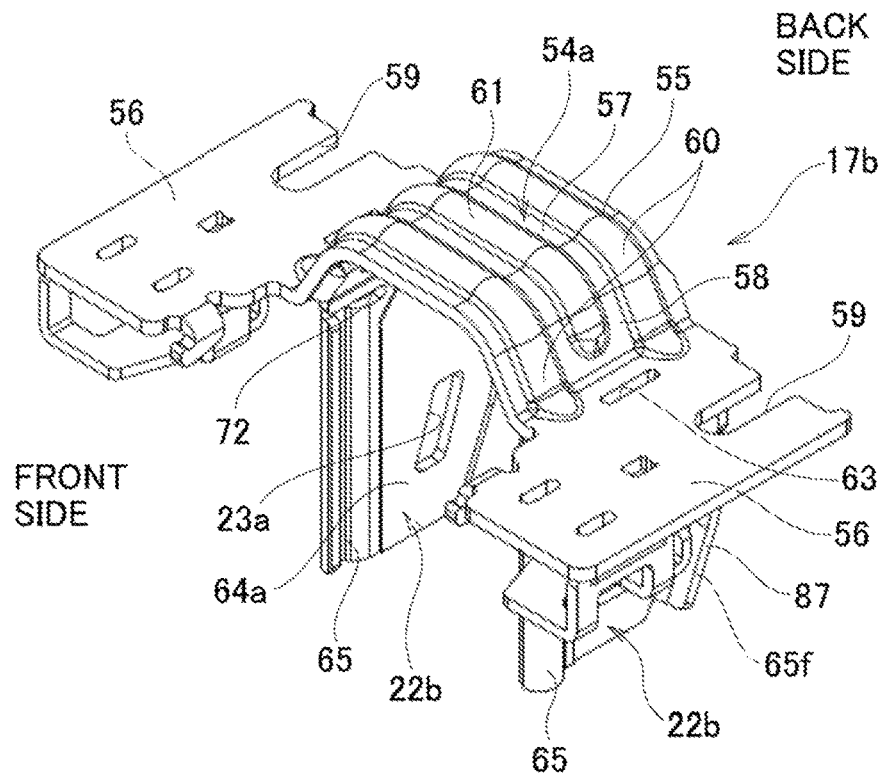
FIG. 29 is a perspective view of the support bracket of the seventh example of an embodiment as viewed from the front and upper side.
Figure 30:
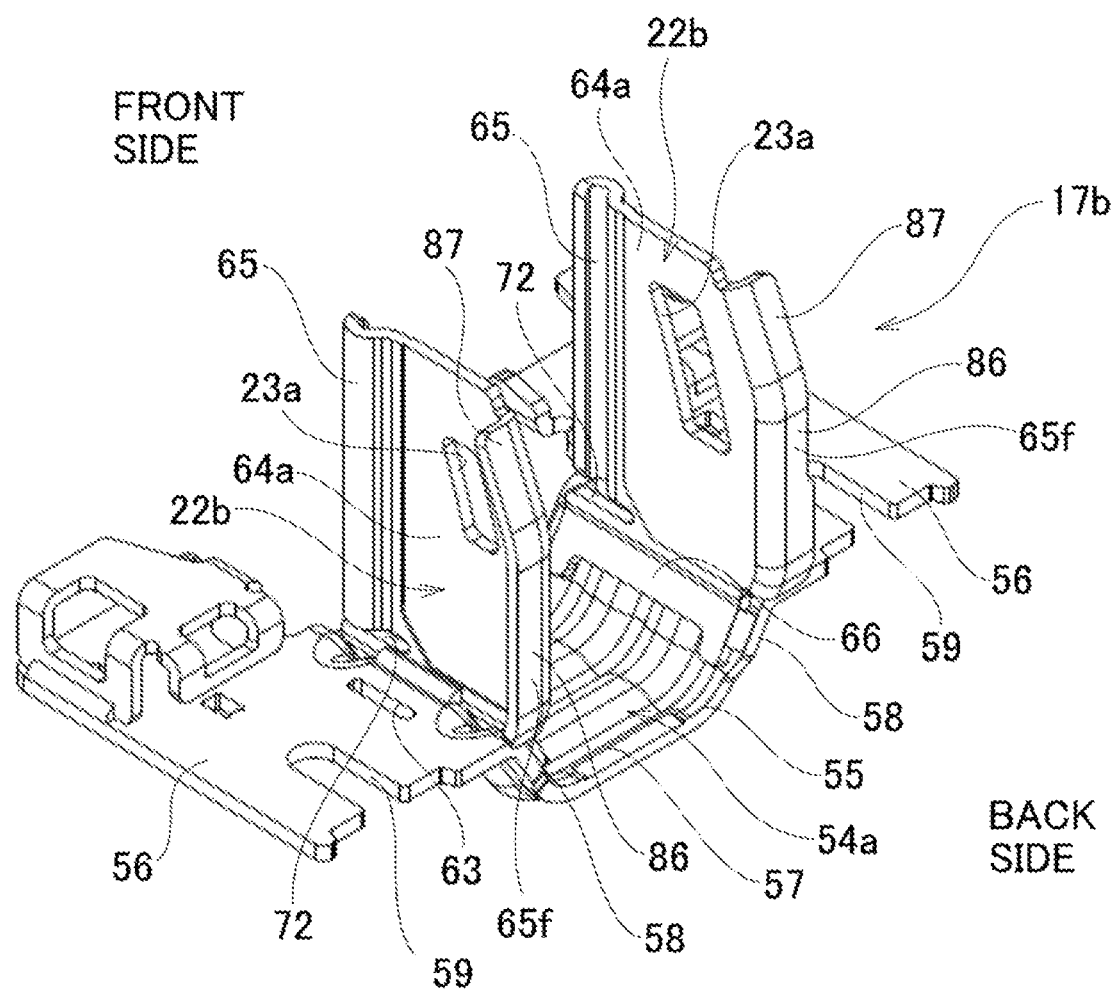
FIG. 30 is a perspective view of the support bracket of the seventh example of an embodiment as viewed from the rear and lower side.
Figure 31:
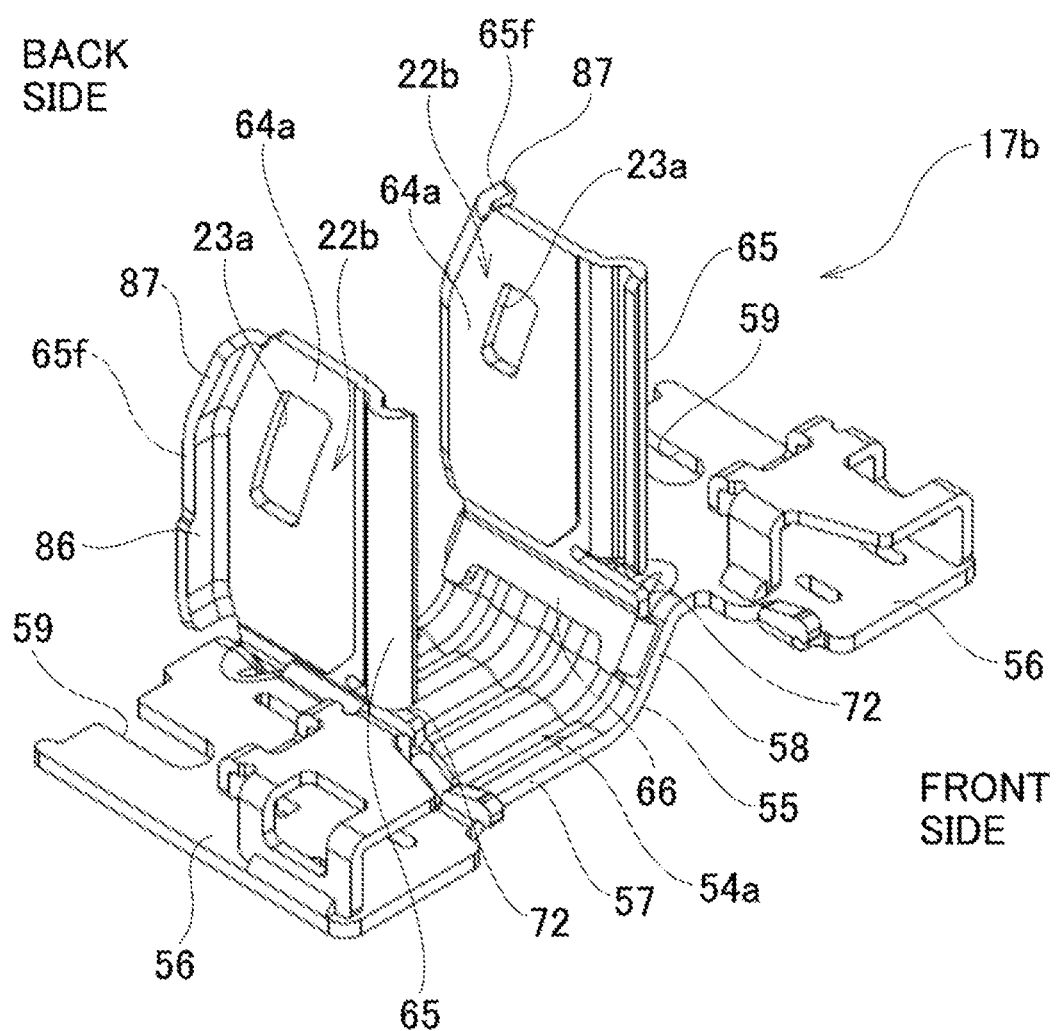
FIG. 31 is a perspective view of the support bracket of the seventh example of an embodiment as viewed from the front and lower side.

FIG. 24 illustrates a sixth example of an embodiment of the present invention. In the present example, a second slit 82*b* in the forward-backward direction having an approximately doglegged shape as seen from the width direction is respectively provided in the lower side sections of the pair of tilt adjustment long holes 23*a* of the supporting plate bodies 64 of the pair of support plate sections 22*a*. The second slits 82*b* in the forward-backward direction respectively comprise a straight front side slit 83 that extends in the forward-backward direction and a straight rear side slit 84 that is inclined in the upward direction as going toward the rear. The second slits 82*b* in the forward-backward direction are located on the rear side than the front-end edges of the lower side edges of the pair of tilt adjustment long holes 23*a*. On the other hand, the rear-end edges of the second slits 82*b* in the forward-backward direction are located on the rear side than the rear-end edges of the lower side edges of the pair of tilt adjustment long holes 23*a*.

In the present example, the front side slits 83 are aligned with the lower side slits 75*c* of the slits 73*c* in the up-down direction with respect to the up-down direction, and the rear side slits 84 are aligned with the lower end sections of the intermediate slits 76 of the slits 73*c* in the up-down direction. Here, it is also possible to provide a third slit in the forward-backward direction having the same shape as the second slit 82*b* in the forward-backward direction respectively on the upper side of the pair of tilt adjustment long holes 23*a*. With the present example, the rigidity of the sections around the pair of tilt adjustment long holes 23*a* of the pair of support plate sections 22*a* can be smaller than that of the fourth example and the fifth example. The construction and functions of the other parts are the same as in the first example and the second example.

Seventh Example

Figure 32:
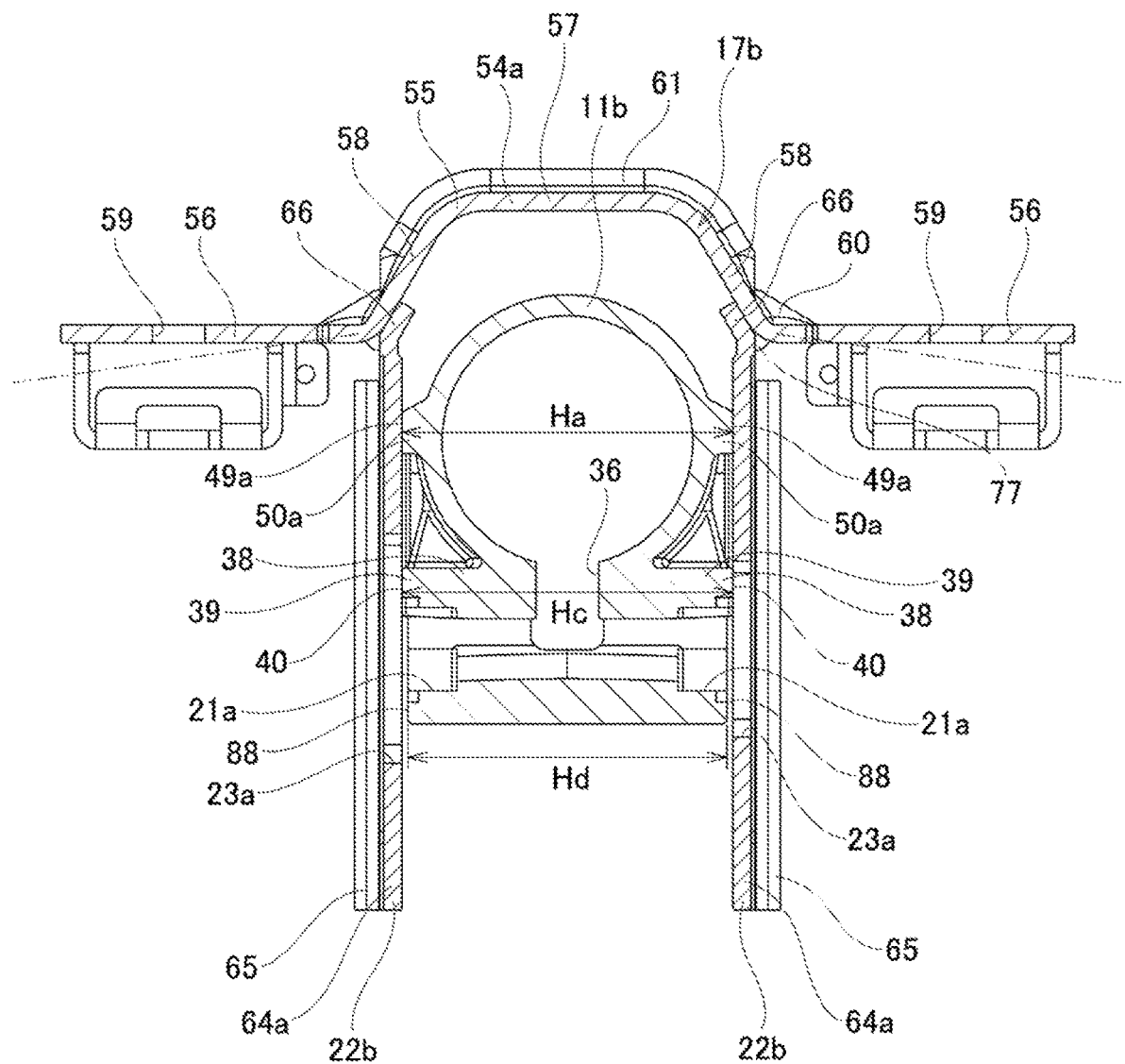
FIG. 32 corresponds to FIG. 2 and is a cross-sectional view illustrating the steering apparatus of the seventh example of an embodiment.
Figure 33:
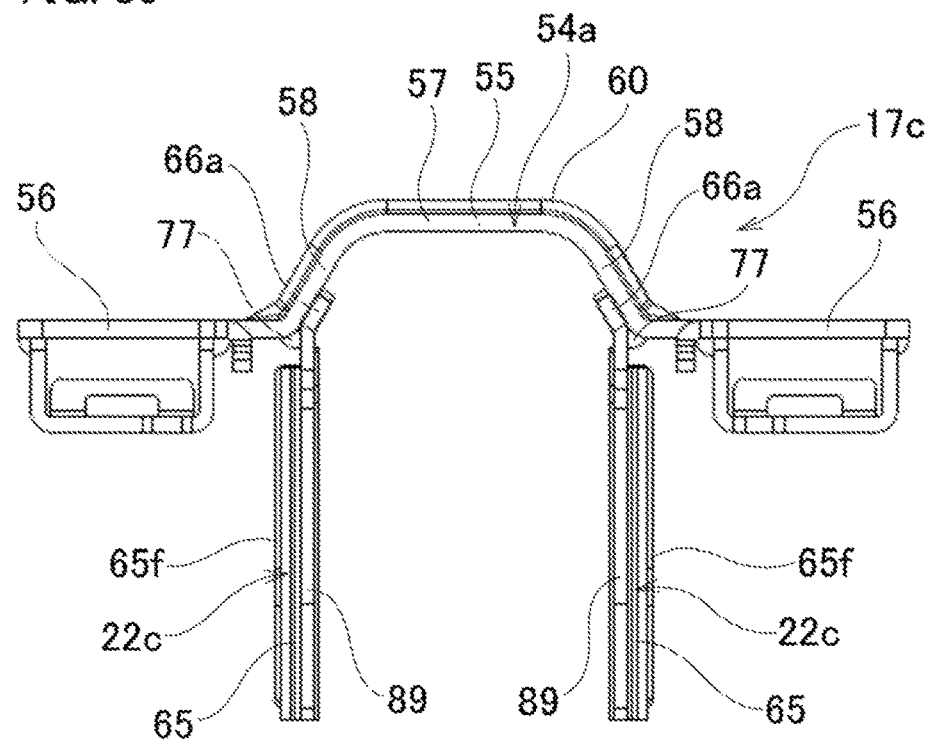
FIG. 33 corresponds to FIG. 25 and illustrates a support bracket of an eighth example of an embodiment.

FIG. 32 illustrates a seventh example of an embodiment of the present invention. In the present example, reinforcing members 65, 65f are provided in the positions on the front and rear side positions of the pair of support plate sections 22b of the support bracket 17b respectively. That is, reinforcing members 65 are provided in the positions that are shifted to the front side than the tilt adjustment long holes 23a of the support plate sections 22b, and the reinforcing members 65f are provided in the positions that are shifted to the rear side than the tilt adjustment long holes 23a.

The reinforcing members 65 that are located on the front side have the same structure as illustrated in the first example, have a double flange structure and an arc-shaped cross section, and are provided in the front-end edge sections of the planar supporting plate bodies 64a of the support plate sections 22b. In the present example, as the front-end edges of the supporting plate bodies 64a are respectively made straight that extends in the up-down direction, the reinforcing members 65 that are provided along the front-end edges of the supporting plate bodies 64a also have a straight shape that extends in the up-down direction respectively.

On the other hand, the reinforcing members 65f that are located on the rear side have a straight shaped cross section respectively and are provided in the rear-end edges of the supporting plate bodies 64a. Specifically, the reinforcing members 65f respectively have a planar shape, bend almost at a right angle from the rear-end edges of the supporting plate bodies 64a, and extend outward in the width direction. Therefore, the reinforcing members 65f have a single flange structure. Further, in the present example, the rear-end edges of the supporting plate bodies 64a respectively comprise a straight section provided in the upper half section and extending in the up-down direction, and an inclined section provided in the lower half section and inclining toward the front as going downward. Therefore, the reinforcing members 65f that are provided along the rear-end edges of the supporting plate bodies 64a respectively comprise a straight upper plate section 86 extending in the up-down direction and an inclined plate section 87 inclining toward the front as going downward. Further, in the present example, the upper end sections of the reinforcing members 65f (upper plate sections 86) slightly bend in a direction going forward as it goes upward.

Each of the upper end edges of the reinforcing members 65, 65f is a free end and is not connected to the bottom surface of the installation plate section 54a of the support bracket 17b. That is, although the lug sections 66 for welding and fixing the pair of the support plate sections 22b to the bottom surface of the installation plate section 54a and the reinforcing members 65 on the front side overlap in the up-down direction, slits 72 in the forward-backward direction with both sides in the width direction and the front side open are provided between the lower end edges of the lug sections 66 for welding and the upper end edges of the reinforcing members 65. Therefore, the upper end edges of the reinforcing members 65 are free ends and therefore are not directly connected to the bottom surface of the installation plate section 54a even when the lug sections 66 for welding are fixed to the bottom surface of the installation plate section 54a by welding.

On the other hand, the reinforcing members 65f on the rear side are located backward than the rear-end edges of the lug sections 66 for welding. Due to this, the upper end edges of the reinforcing members 65f are free ends and therefore are not directly connected to the bottom surface of the installation plate section 54a even when the lug sections 66 for welding are fixed to the bottom surface of the installation plate section 54a by welding.

Further, the supporting plate bodies 64a do not have slits in the up-down direction that are provided in the first example. Only tilt adjustment long holes 23a are provided in the supporting plate bodies 64a so as to pass through in the width direction.

In the present example, the structure of the outer column 11b that is used in combination of the support bracket 17b as described above is made as follows. That is, as illustrated in FIG. 32, flat pressing surfaces 40 are provided in the middle section in the up-down direction of both outside surfaces in the width direction of the outer column 11b, and torque transmission surfaces 49a are provided above the pressing surfaces 40, however, the outer column 11b does not have the torque transmission surfaces 49b that are provided in the first example in sections lower than the pressing surfaces 40. In the present example, seating surfaces 88 that are offset inward in the width direction than the torque transmission surfaces 49a are provided below the pressing surfaces 40 of the outside surfaces in the width direction. In a state where no external force is applied to the outer column 11b, among the width dimension Ha between the torque transmission surfaces 49a, the width dimension Hc between the pressing surfaces 40, and the width dimension Hd between the seating surfaces 88, a relationship of Ha=Hc>Hd is established.

In the present example having a configuration as described above, reinforcing members 65, 65f are provided in the front and rear side positions of the support plate sections 22b respectively, and the supporting plate bodies 64a do not have slits in the up-down direction that pass through in the width direction. Therefore, it is possible to increase flexural rigidity with respect to the width direction of the support plate sections 22b. Further, in the present example, as the upper end sections of the reinforcing members 65f bend in a direction going forward as it goes upward, it is possible to further improve the flexural rigidity with respect to the width direction of the support plate sections 22b.

Further, as each of the upper end edges of the reinforcing members 65, 65f is a free end and therefore is not directly connected to the bottom surface of the installation plate section 54a, it can be prevented that the support plate sections 22b, 22b become difficult to bend inward in the width direction based on the existence of the reinforcing members 65, 65f when clamping the steering wheel 1 to a desired position. Furthermore, seating surfaces 88 that are offset inward in the width direction than the pressing surfaces 40 are provided in the lower end sections of the outside surface in the width direction of the outer column 11b. Therefore, when clamping, the support plate sections 22b can be bent and deformed so as to bring each of the lower end sections closer, and it is possible to prevent the middle sections in the up-down direction of the support plate sections 22b from bending in a doglegged shape inward in the width direction. The construction and functions of the other parts are the same as in the first example.

Eighth Example

FIG. 33 to FIG. 39 illustrate an eighth example of an embodiment of the present invention. In the present example, planar extension plate sections 89 are provided even more forward than the reinforcing members 65 that are provided on the front side of the pair of support plate sections 22c of the support bracket 17c. In other words, in the present example, the reinforcing members 65 are provided not in the front-end edge sections of the supporting plate bodies 64b but in the middle section in the forward-backward direction thereof.

Further, upper slits 90 that extend in the forward-backward direction and open only to both sides in the width direction are provided in sections of the upper end sections of the supporting plate bodies 64b that are located between the upper end edges of the reinforcing members 65 and the lower end edge sections of the lug sections 66a for welding. Due to this, the upper end edges of the reinforcing members 65 are made to be free ends. Therefore, when the lug sections 66a for welding are fixed to the bottom surface of the installation plate section 54a of the support bracket 17c by welding, the upper end edges of the reinforcing members 65 are not directly connected to the bottom surface of the installation plate section 54a. On the other hand, the upper end edges of the extension plate sections 89 are directly connected to the lower end edges of the lug sections 66a for welding.

Figure 34:
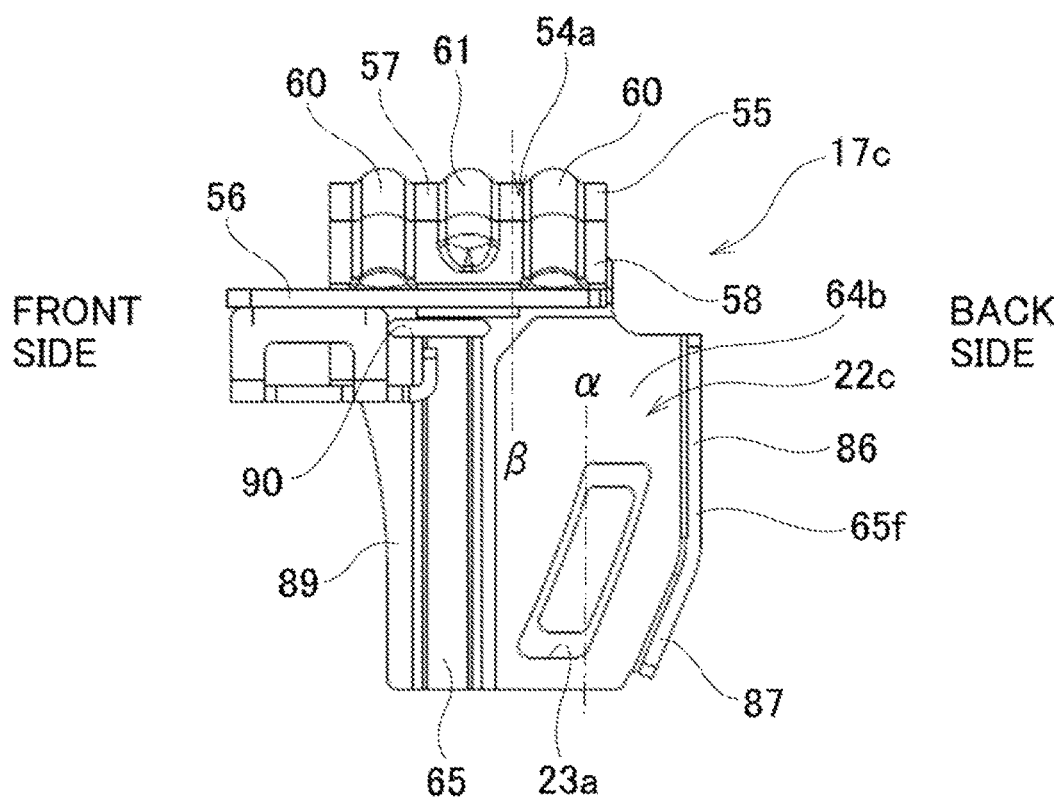
FIG. 34 corresponds to FIG. 26 and illustrates the support bracket of the eighth example of an embodiment.
Figure 35:
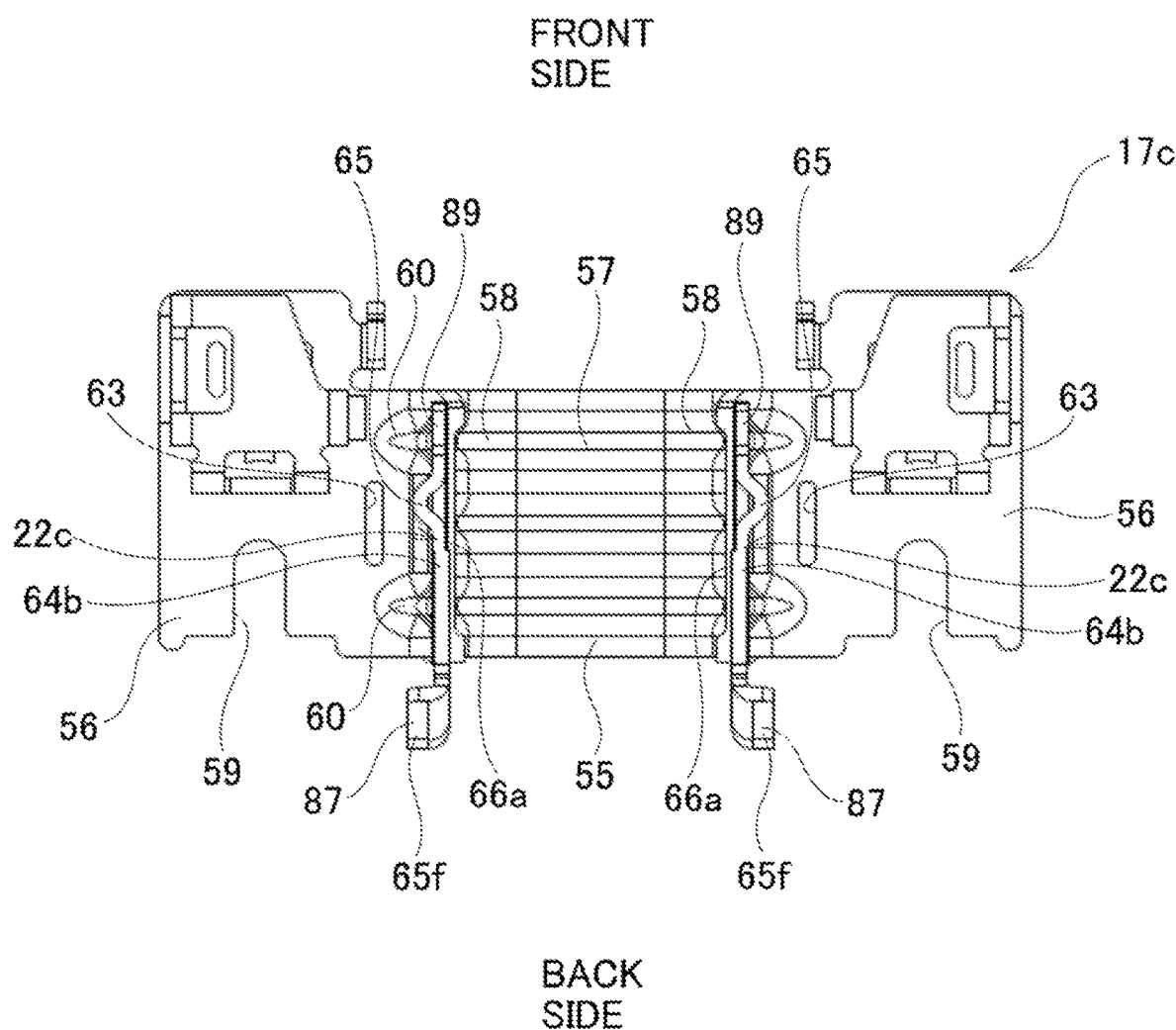
FIG. 35 corresponds to FIG. 27 and illustrates the support bracket of the eighth example of an embodiment.
Figure 36:
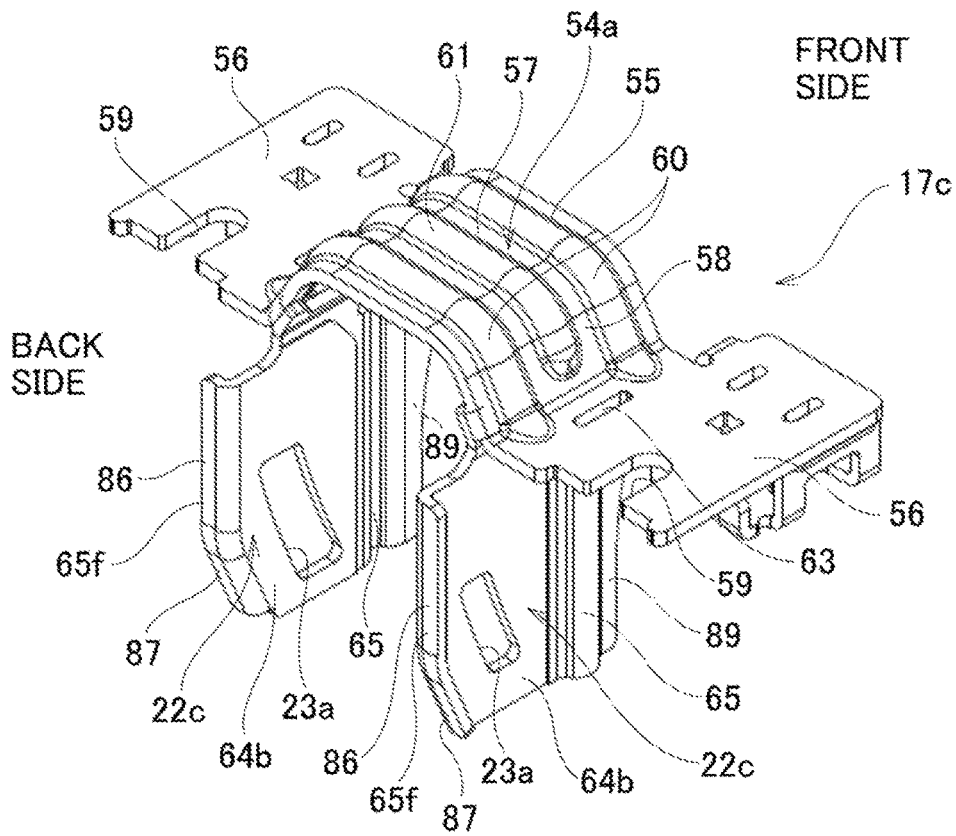
FIG. 36 corresponds to FIG. 28 and illustrates the support bracket of the eighth example of an embodiment.
Figure 37:
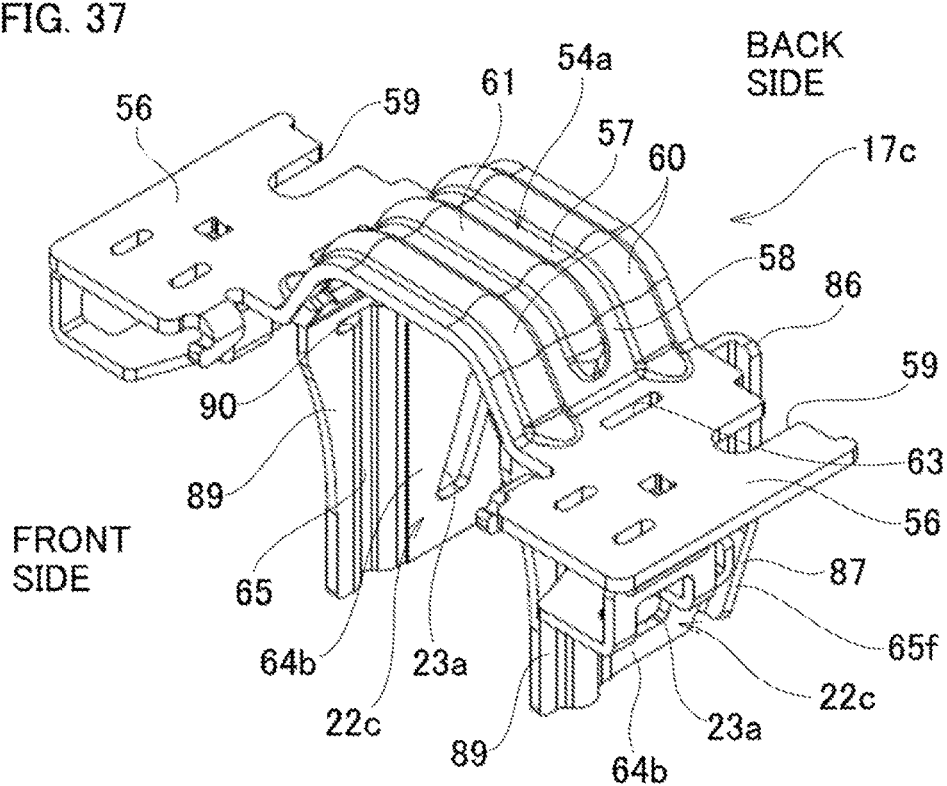
FIG. 37 corresponds to FIG. 29 and illustrates the support bracket of the eighth example of an embodiment.
Figure 38:
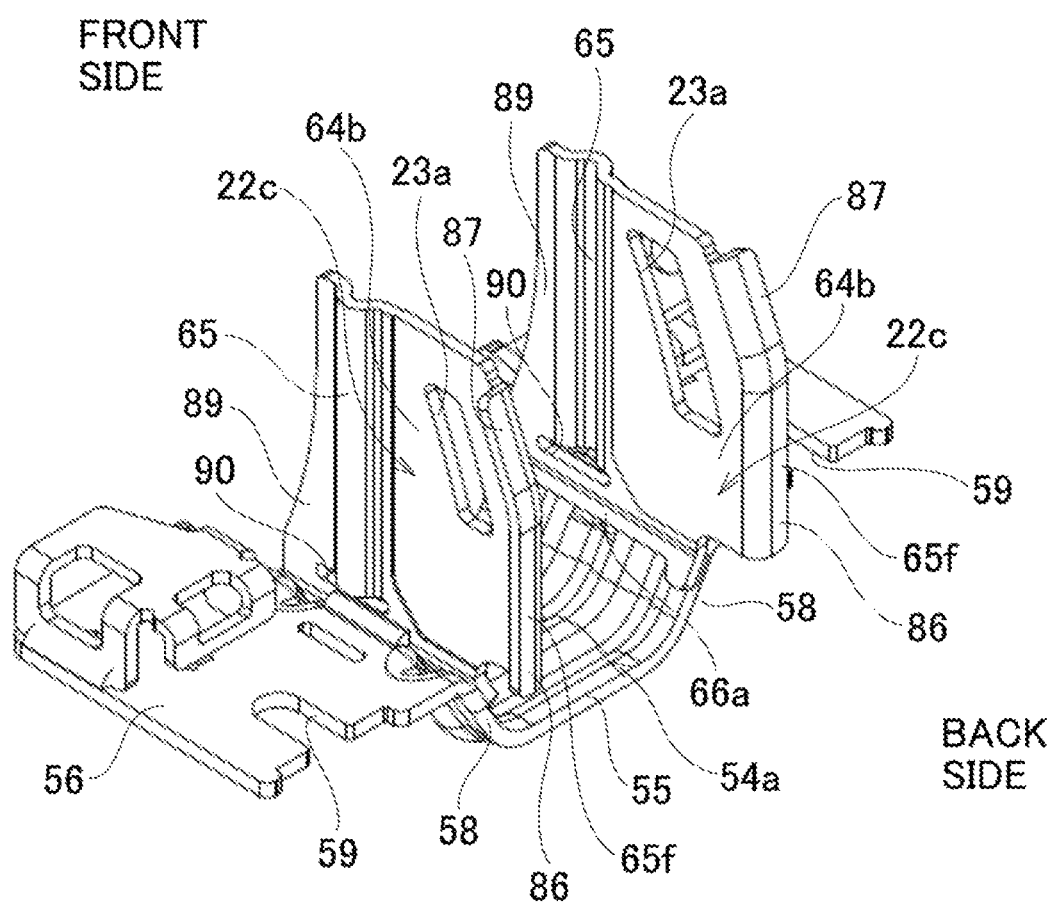
FIG. 38 corresponds to FIG. 30 and illustrates the support bracket of the eighth example of an embodiment.
Figure 39:
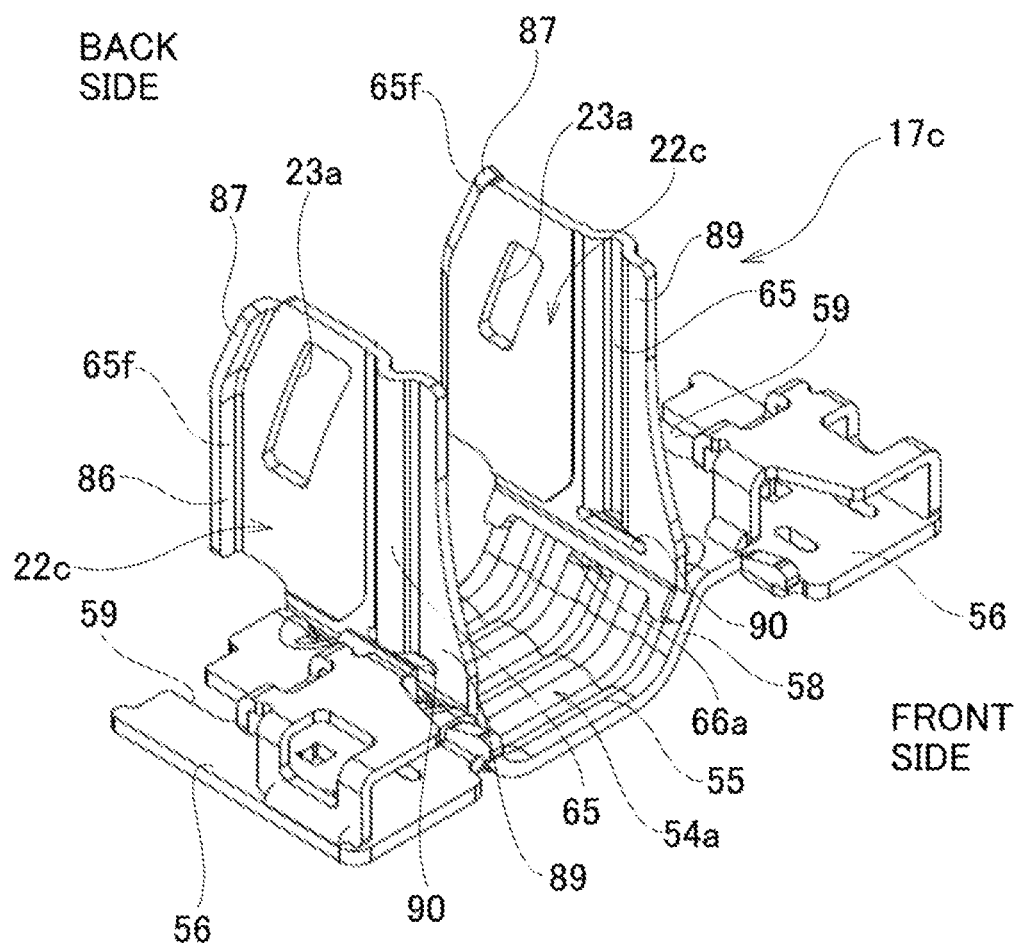
FIG. 39 corresponds to FIG. 31 and illustrates the support bracket of the eighth example of an embodiment.

In the present example having a configuration as described above, the extension plate sections 89 are provided even more forward than the reinforcing members 65 that are provided on the front side so that the dimension in the forward-backward direction of the support plate sections 22c can be enlarged. Due to this, as illustrated in FIG. 34, even when the position a which is tightened by the pair of pressing sections and the position 8 which is fixed to the vehicle body are greatly separated in the forward-backward direction when clamping, the support bracket 17c is effectively prevented from inclining in the up-down direction based on the moment load that acts on the support bracket 17c. The construction and functions of the other parts are the same as in the first example and the seventh example.

Ninth Example

Figure 40A:
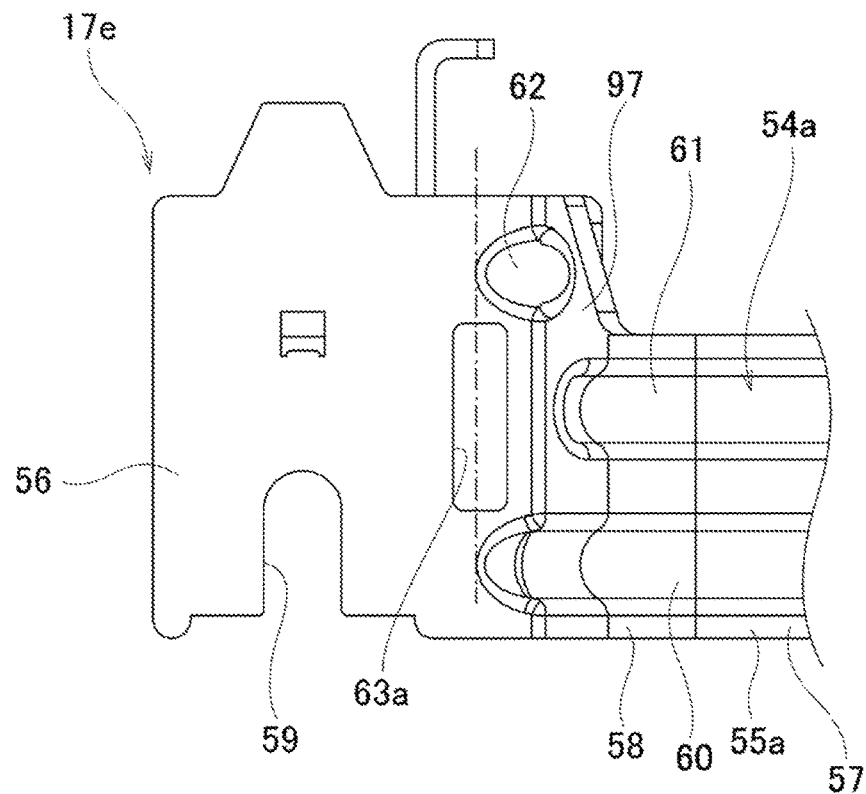
FIG. 40A is a partial top view of the half section on one side in the width direction of an installation plate section of a support bracket of a ninth example of an embodiment.
Figure 40B:
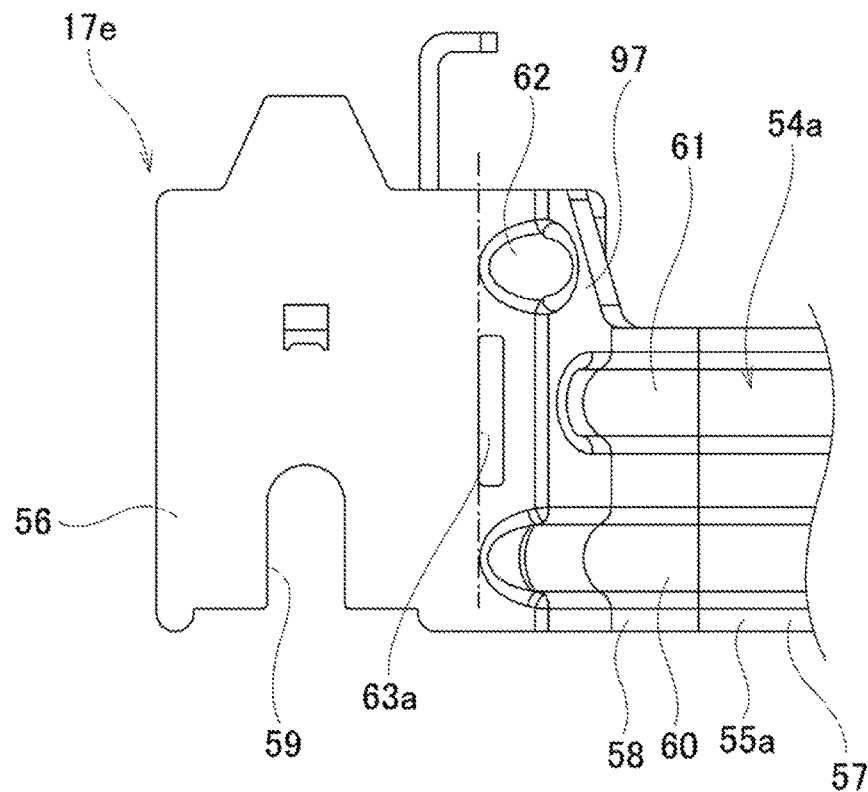
FIG. 40B is a view similar to FIG. 40A, and illustrates a modified example of a support bracket having an installation-side slit with a shape that is different from FIG. 40A.
Figure 41:
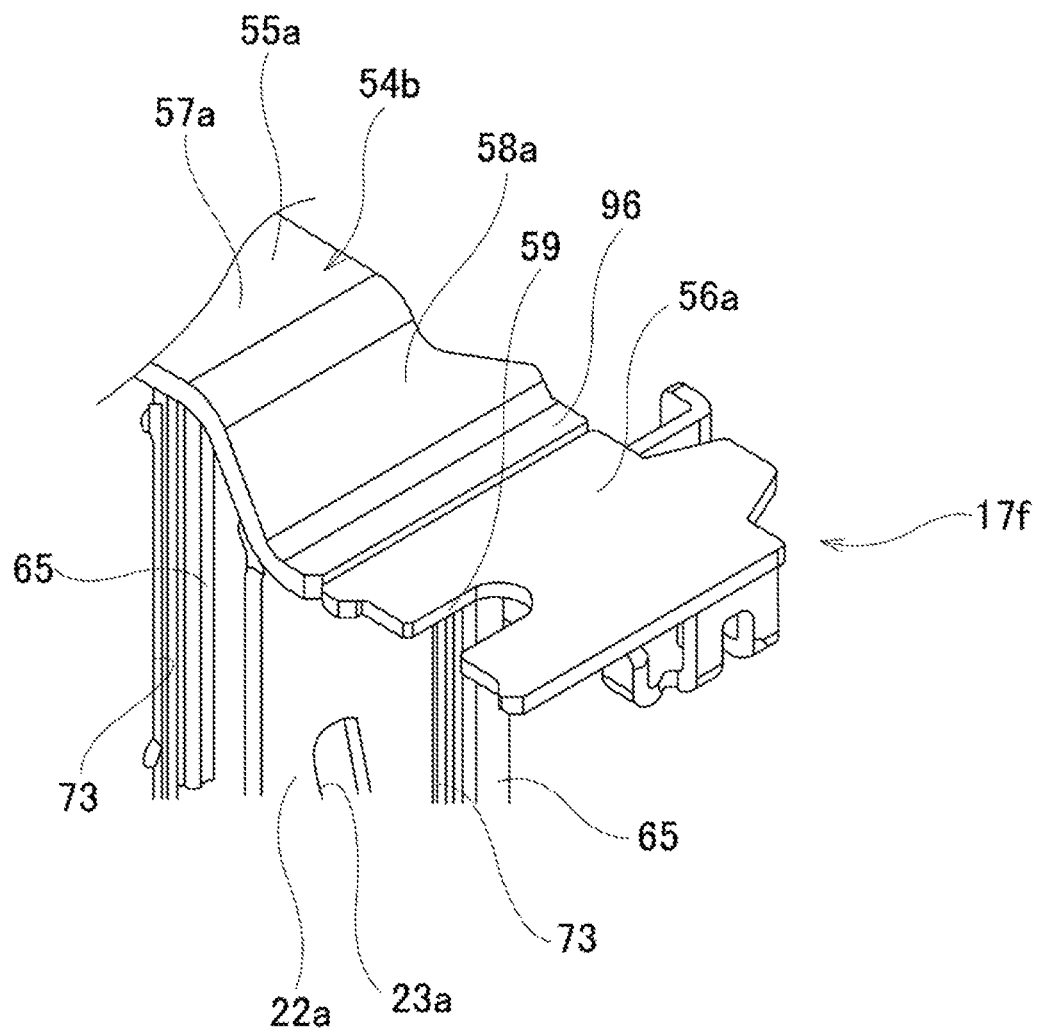
FIG. 41 is a partial perspective view of a support bracket of a first example of a reference example.
Figure 42:
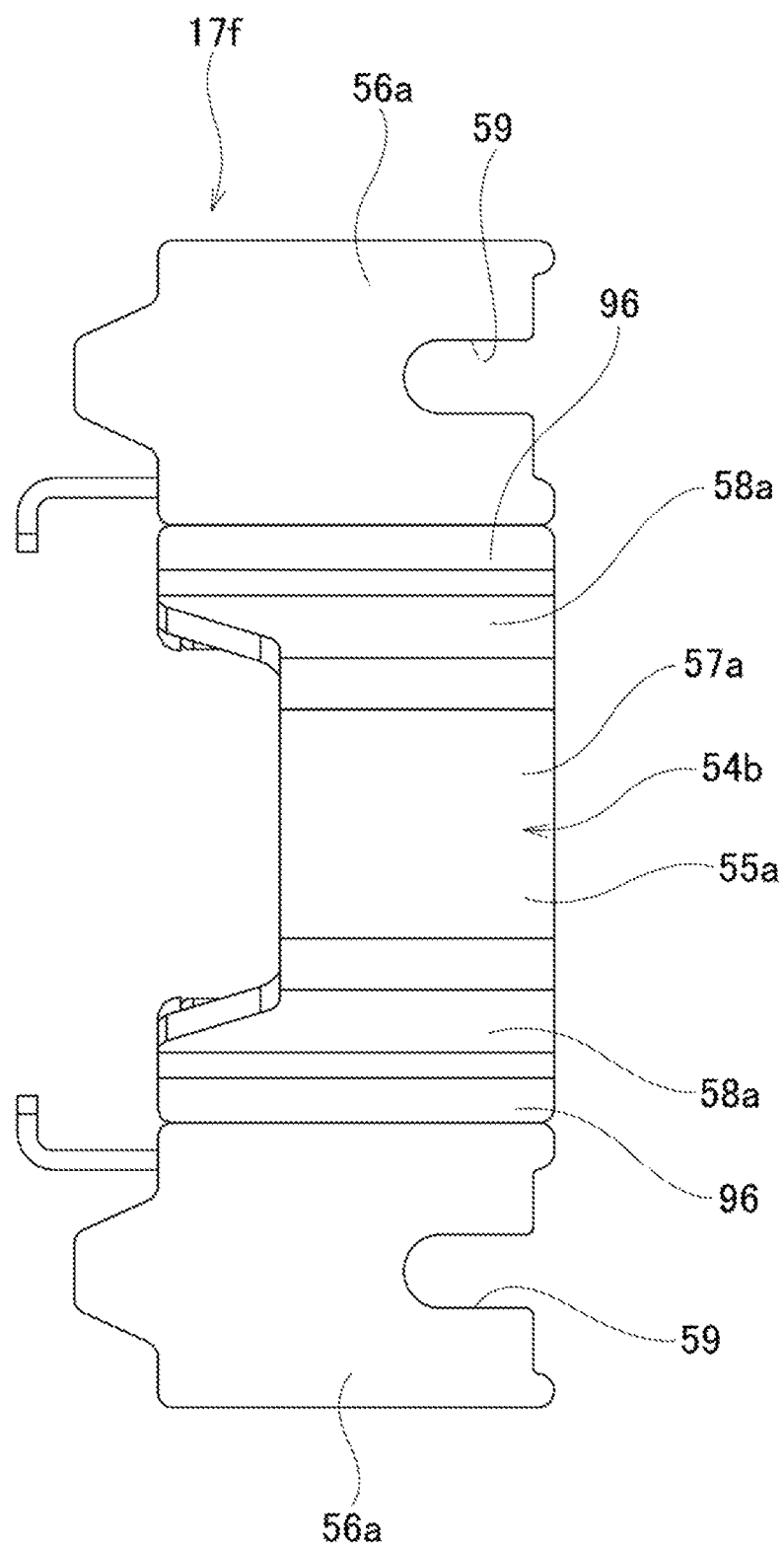
FIG. 42 is a top view of the support bracket illustrated in FIG. 41.
Figure 43:
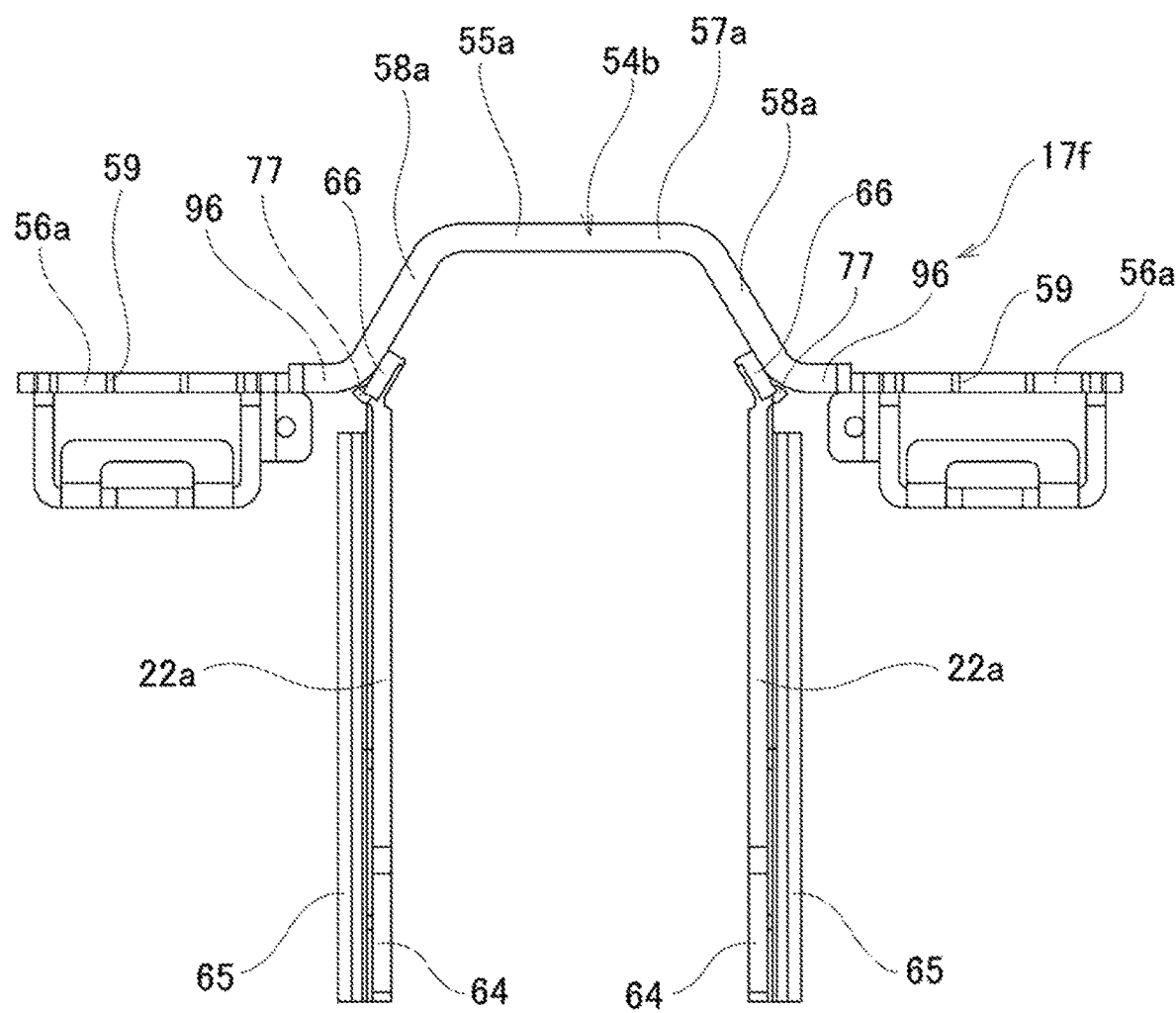
FIG. 43 is a view similar to FIG. 13 and illustrates the support bracket illustrated in FIG. 41.
Figure 44:
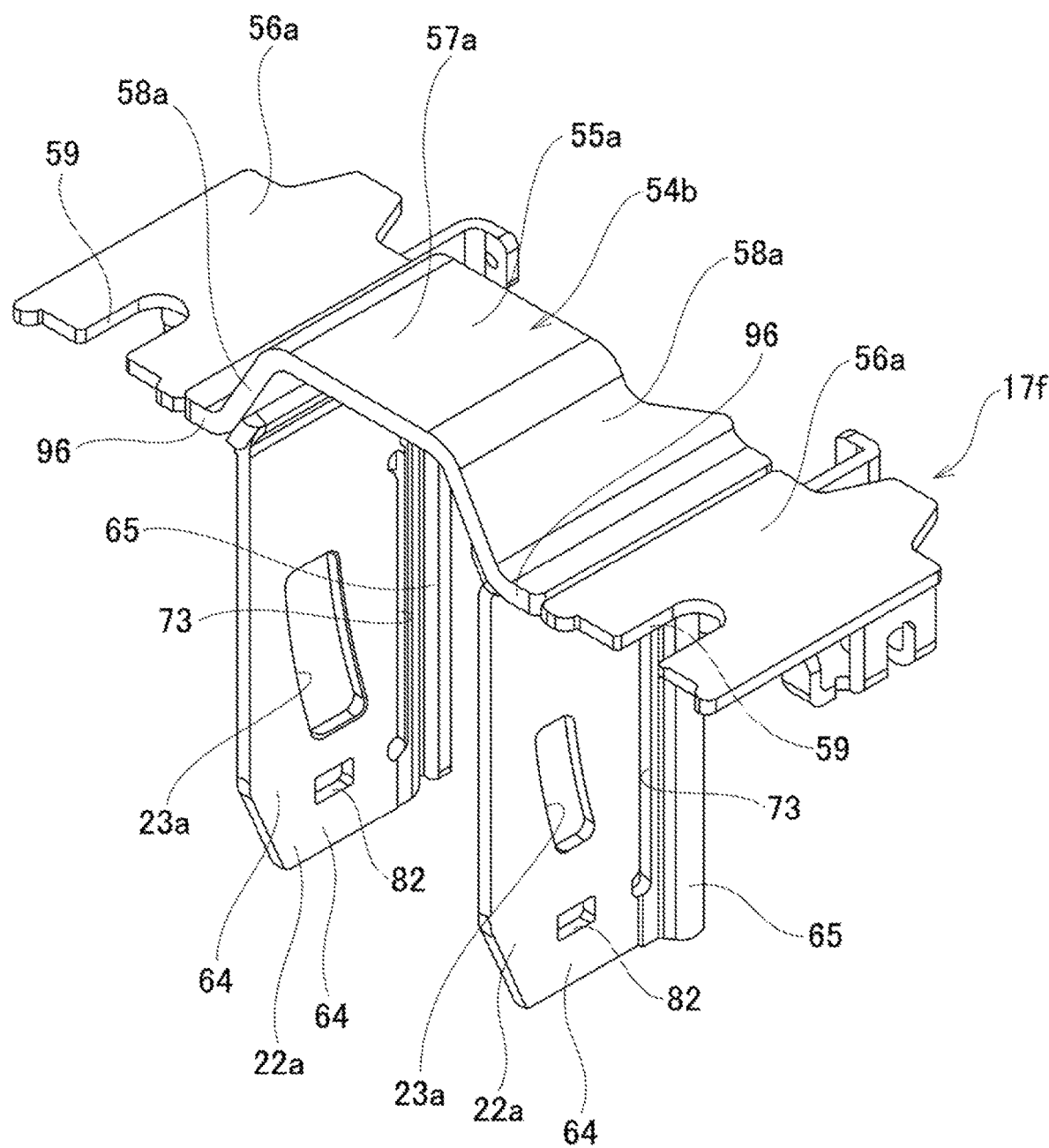
FIG. 44 is a view similar to FIG. 15 and illustrates the support bracket illustrated in FIG. 41.

FIG. 40(A) and FIG. 40(B) illustrate a ninth example of an embodiment of the present invention. In the present example, the configuration of the installation-side slits 63a is different from the installation-side slits 63 of the first example. Specifically, in the present example, as illustrated in FIG. 40(A), the position of the outer end edges in the width direction of the pair of installation-side slits 63a are located on the outside in the width direction than the outer end edges in the width direction of the first rib 60 and the outer end edges in the width direction of the pair of third ribs 62. On the other hand, the inner end edges in the width direction of the pair of installation-side slits 63a are located on the inside in the width direction than the outer end edges in the width direction of the first rib 60 and the outer end edges in the width direction of the pair of third ribs 62.

Here, as illustrated in FIG. 40(B), it is also possible to match the outer end edges in the width direction of the pair of installation-side slits 63a with the outer end edges in the width direction of the first rib 60 and the outer end edges in the width direction of the pair of third ribs 62 with respect to the width direction.

The dimension in the forward-backward direction, the dimension in the width direction, and the shape of the pair of installation-side slits 63a are set in relation to the rigidity of the pair of side plate sections 56. Regarding the position of the pair of installation-side slits 63a in the forward-backward direction, it is possible to change within a range of sections between the both end sections in the width direction of the first rib 60 and the pair of third ribs 62. It is also possible to provide only one installation-side slit 63a of the pair of installation-side slits 63a and omit the other installation-side slit. Further, the pair of installation-side slits 63a can be composed not only of through-holes that pass through the pair of side plate sections 56 in the thickness direction like in this example, but also structures such as recessed sections, grooves, and openings that extend in the forward-backward direction and do not pass through the pair of side plate sections 56 in the thickness direction. Further, instead of the through-holes or the recessed sections or the like that extend in the forward-backward direction, the pair of installation-side slits 63a can be respectively composed of through-holes or recessed sections arranged separately in the forward-backward direction. The construction and functions of the other parts are the same as in the first example.

When carrying out the present invention, the first example to the ninth example can be suitably combined as long as there is no discrepancy with each other.

When carrying out the present invention, the present invention can be applied not only to a structure comprising a mechanism of both the tilt mechanism and the telescoping mechanism, but also to a structure comprising either one of these mechanisms, or to a structure comprising neither mechanism. Further, the structure and the shape of the reinforcing member, the slit in the up-down direction, and the installation-side slit that are provided in the support bracket are not limited to the structures described in the first example to the ninth example.

In the first example to the sixth example, the reinforcing members are provided only in the front-end sections of the support bracket from the aspect of interference prevention with the cam apparatus or the like, however, it is also possible to provide the reinforcing members only in the rear-end sections of this support bracket. Further, as in the seventh example, it is also possible to provide the reinforcing members to the front-end section and the rear-end section of this support bracket. Furthermore, the reinforcing members may not be provided in the front-end section or the rear-end section of the support bracket. That is, the reinforcing members may be provided in the middle section in the forward-backward direction of the support bracket. Further, the reinforcing member is also possible to be provided not only on the outside surface side of the support plate section, but also on the inside surface side (so as to protrude toward the inside surface side).

First Reference Example

FIG. 41 to FIG. 44 illustrate a first reference example related to the present invention. The support bracket 17f of the present reference example is made of metal plate such as steel and aluminum alloy as similar to the first example of an embodiment of the present invention, and comprises an installation plate section 54b and a pair of support plate sections 22a.

The installation plate section 54b comprise a bridge plate section 55a and a pair of side plate sections 56a that is welded and fixed to both end sections in the width direction of the bridge plate section 55a. The bridge plate section 55a has an approximately U-shape that opens downward and in both ends in the forward-backward direction. Specifically, the bridge plate section 55a comprises a center plate section 57a that is provided so as to be parallel in the width direction, a pair of side inclined plate sections 58*a* that is provided so as to be inclined in a direction toward the lower side as going toward the outside in the width direction from the both end edges in the width direction of the center plate section 57*a*, and a pair of joint plate sections 96 that extend so as to be parallel in the width direction from the outer end edges in the width direction of the pair of side inclined plate sections 58*a* to the outside in the width direction. In the present reference example, the outer end surface in the width direction of the pair of joint plate sections 96 is made as a flat plane. When the bridge plate section 55*a* is made of steel, the thickness dimension of the bridge plate section 55*a* can be 1.3 mm to 2.6 mm. Here, in the present reference example, the first rib 60, the second rib 61, and the pair of third ribs 62 that are comprised in the first example of an embodiment of the present invention are not provided in the bridge plate section 55*a*.

The pair of side plate sections 56*a* is formed so as to be separated from the bridge plate section 55*a* and is constructed by plate members having a smaller thickness dimension than the bridge plate section 55*a*. In the present reference example, the inner end surface in the width direction of the pair of side plate sections 56*a* is made as a flat plane. Other configurations of the pair of side plate sections 56*a* are basically the same as the configurations of the pair of side plate sections 56 of the first example of an embodiment of the present invention. The inner end edge in the width direction of the pair of side plate sections 56*a* is fixed on the both end edges in the width direction (outer end edge in the width direction of the pair of joint plate sections 96) of the bridge plate section 55*a* by welding over the entire length in the forward-backward direction.

In the present reference example having a configuration as described above, the thickness dimension of the pair of side plate sections 56*a* is made smaller than the thickness dimension of the bridge plate section 55*a*. Therefore, the rigidity of the pair of side plate sections 56*a* can be made smaller than the bridge plate section 55*a*. As a result, as similar to the first example of an embodiment of the present invention, even when the pair of side plate sections 56*a* inclines or deforms, it is possible for the bridge plate section 55*a* not to be affected or less affected by the influence of this inclination or deformation. The construction and functions of the other parts are the same as in the first example of an embodiment of the present invention.

Second Reference Example

Figure 45:
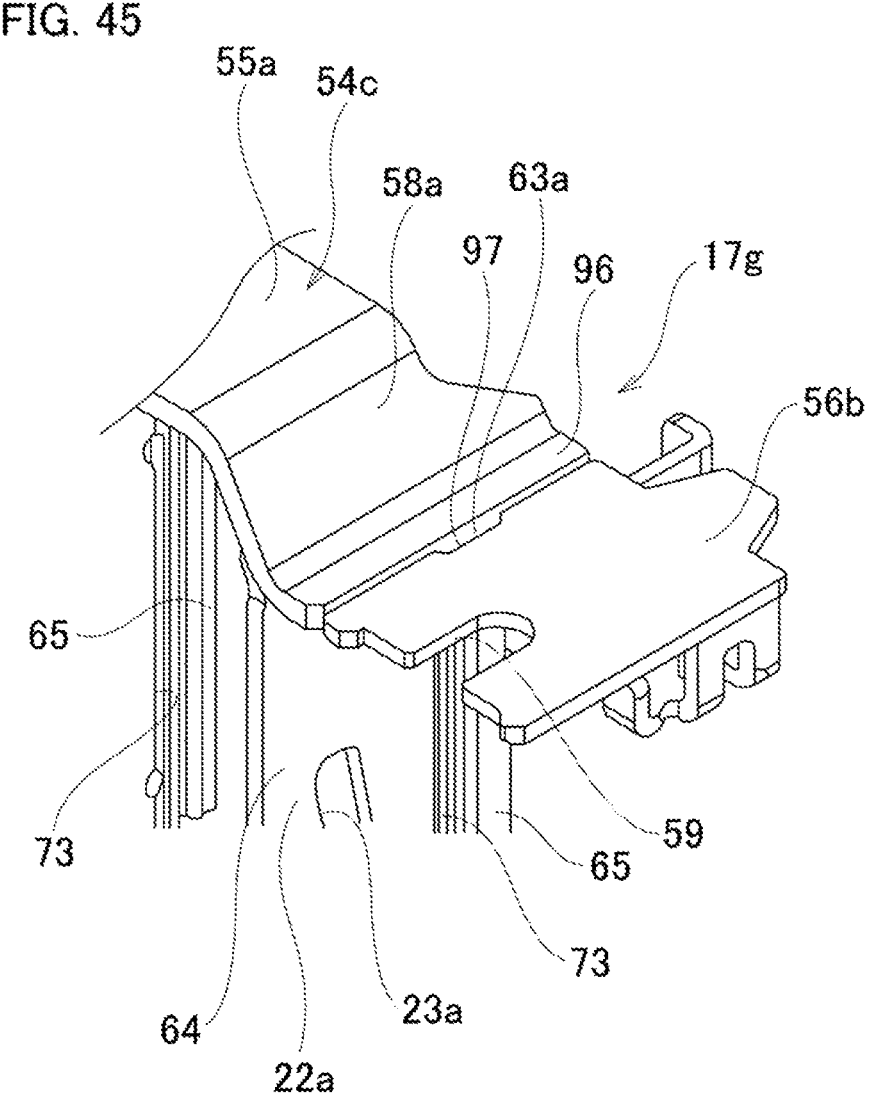
FIG. 45 is a view similar to FIG. 41 and illustrates a support bracket of a second example of a reference example.
Figure 46:
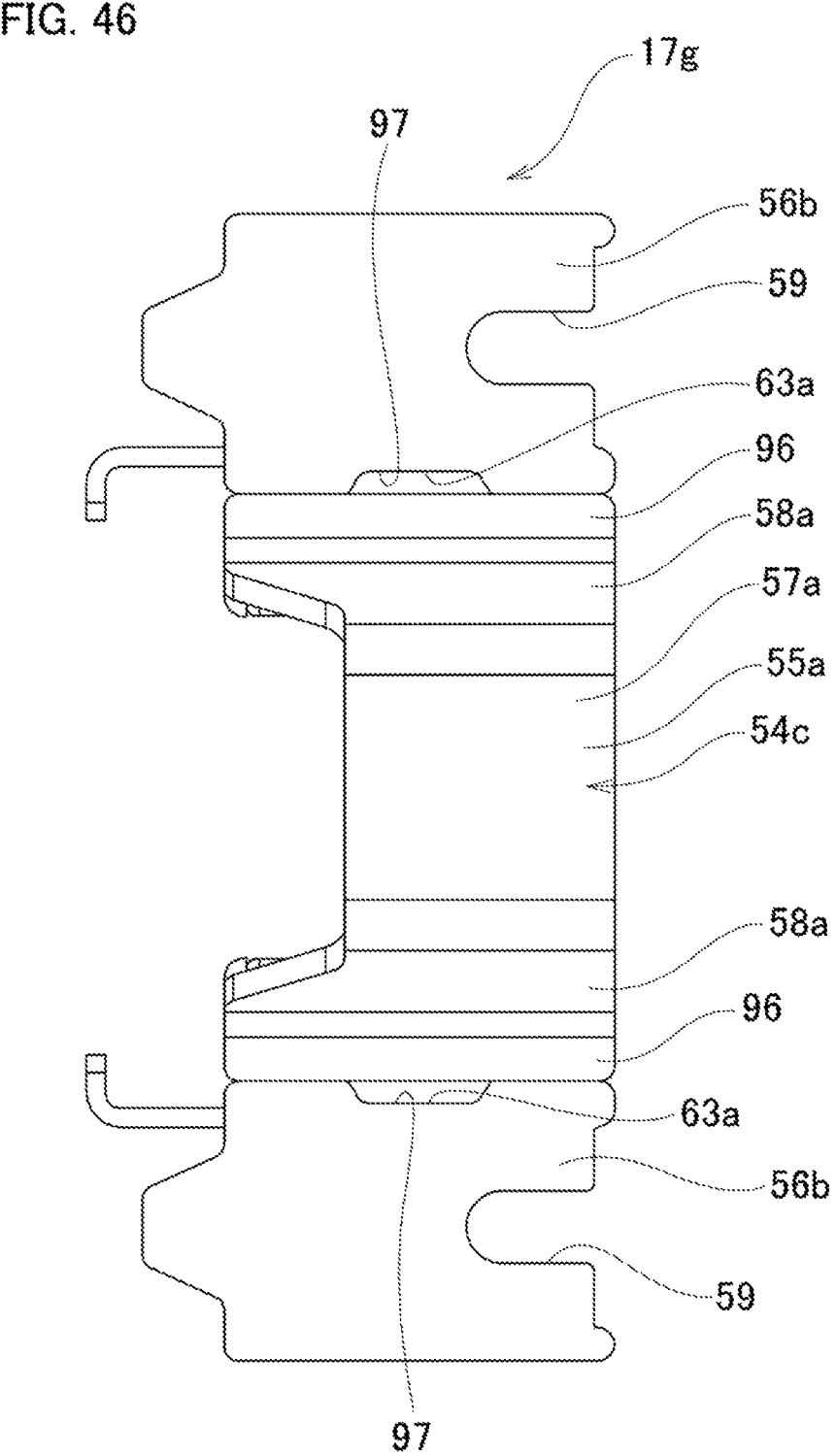
FIG. 46 is a view similar to FIG. 42 and illustrates the support bracket illustrated in FIG. 45.
Figure 47:
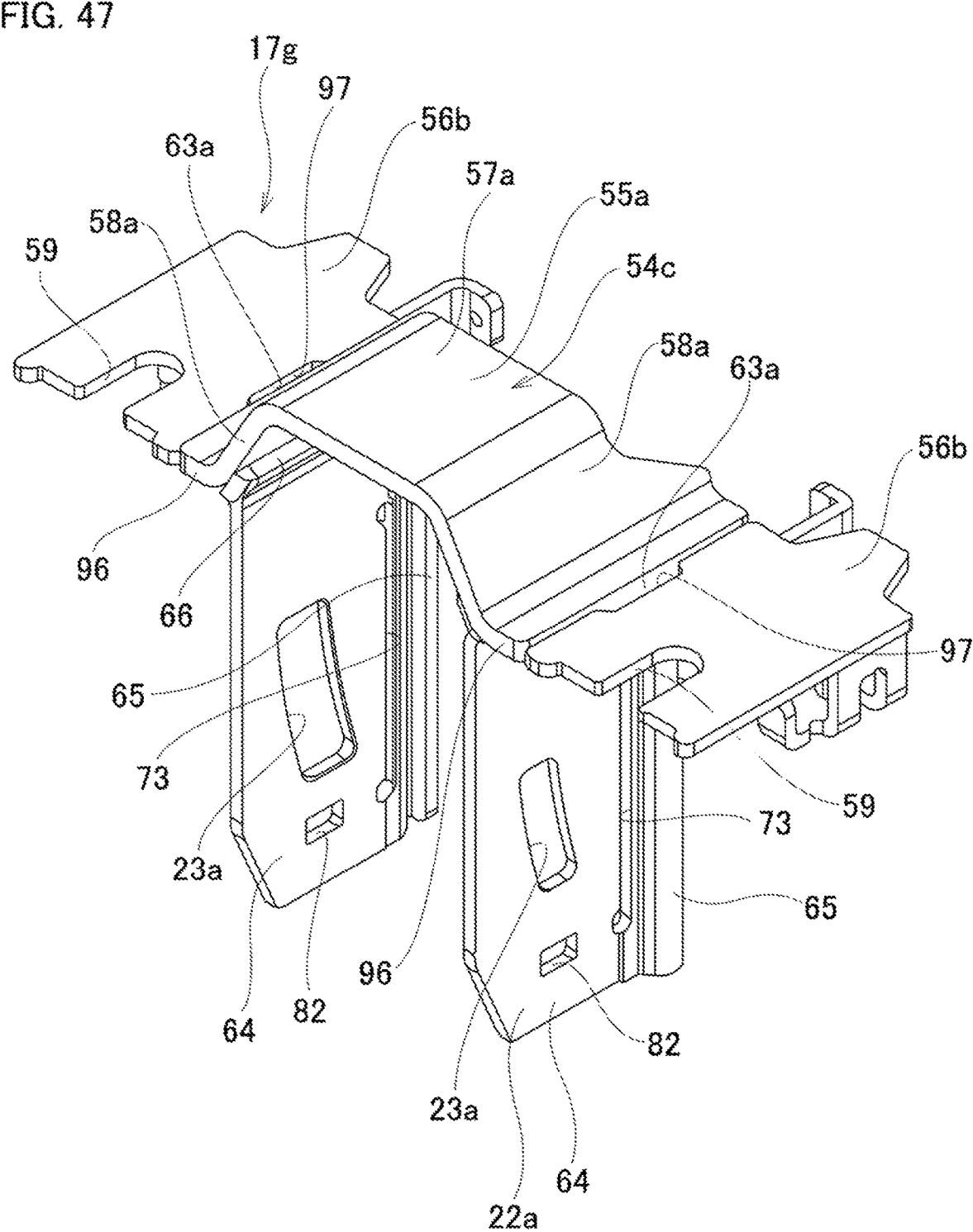
FIG. 47 is a view similar to FIG. 44 and illustrates the support bracket illustrated in FIG. 45.

FIG. 45 to FIG. 47 illustrate a second reference example related to the present invention. In case of the support bracket 17*g* of the present reference example, installation-side slits 63*a* that extend in the forward-backward direction are provided in the middle section in the forward-backward direction of joint sections between the bridge plate section 55*a* and the pair of side plate sections 56*b* of the installation plate section 54*c* respectively so as to pass through these sections in the thickness direction.

Specifically, in the present example, each of the both end surfaces in the width direction of the bridge plate section 55*a* is made as a flat plane. On the other hand, recessed sections 97 on the side plate side that are recessed outward in the width direction are provided in the middle section in the forward-backward direction of the inner end surfaces in the width direction of the pair of side plate sections 56*b*. Further, both end surfaces in the width direction of the bridge plate section 55*a* and sections except for the recessed sections 97 on the side plate side of the inner end surfaces of the pair of side plate sections 56*b* are fixed by welding. In this fixed state, the installation-side slits 63*a* are formed by the bottom surface of the recessed sections 97 on the side plate side and the sections that faces to the recessed sections 97 on the side plate side in the width direction of both end surfaces in the width direction of the bridge plate section 55*a*.

In the present example having a configuration as described above, the rigidity of the bridge plate section 55*a* of the installation plate section 54*c* is made higher than the rigidity of the pair of side plate sections 56*b*, and installation-side slits 63*a* are provided in the pair of side plate sections 56*b*. Therefore, the pair of side plate sections 56*b* becomes easier to incline or deform using the part where the installation-side slits 63*a* are provided as a fulcrum, and the influence of this inclination or deformation is less affected to the bridge plate section 55*a*. As a result, in the present reference example as well, as similar to the first example of an embodiment of the present invention, it becomes possible to prevent the influence of the inclination or deformation of the pair of side plate sections 56*b* affects the pair of support plate sections 22*a*. The construction and functions of the other parts are the same as in the first example of an embodiment of the present invention and the first reference example.

Third Reference Example

Figure 48:
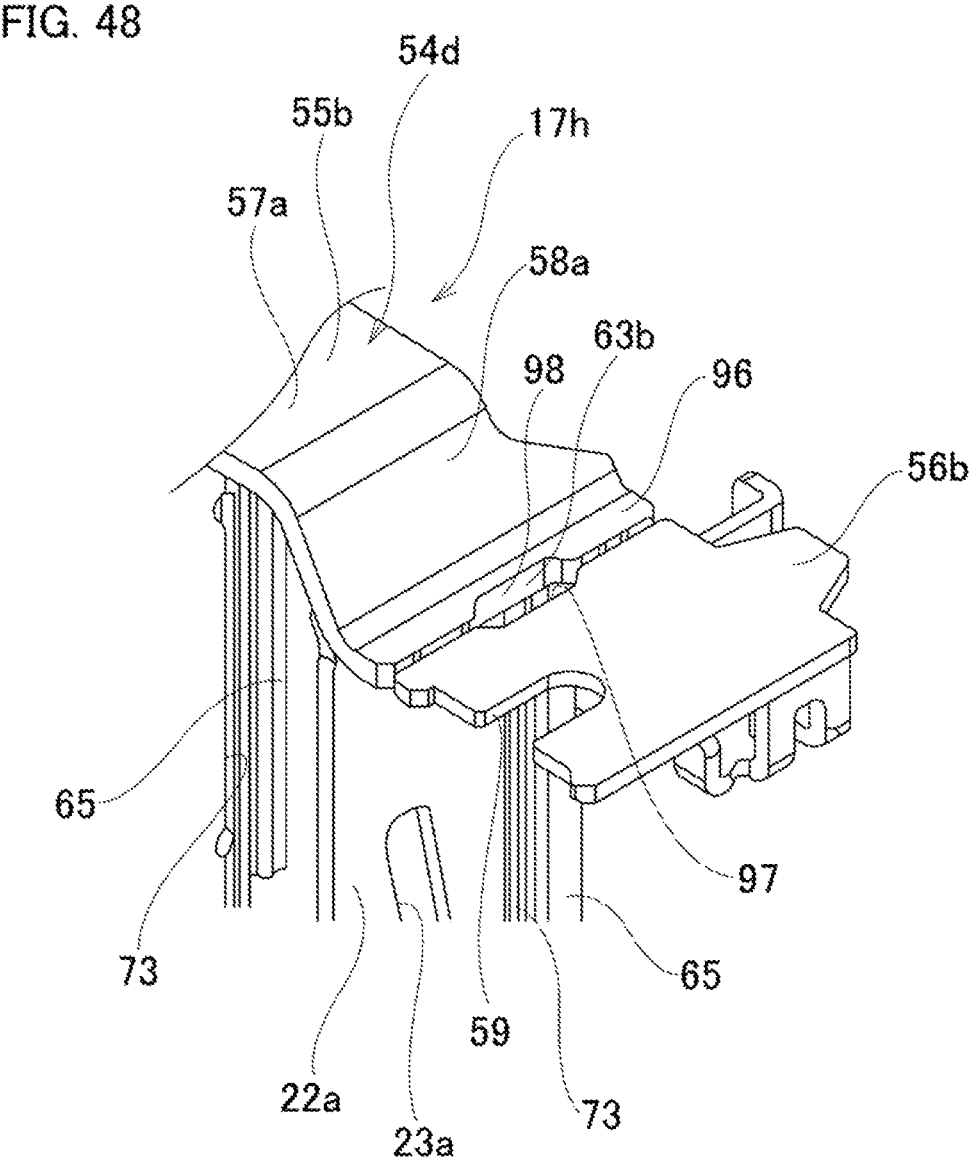
FIG. 48 is a view similar to FIG. 41 and illustrates a support bracket of a third example of a reference example.
Figure 49:
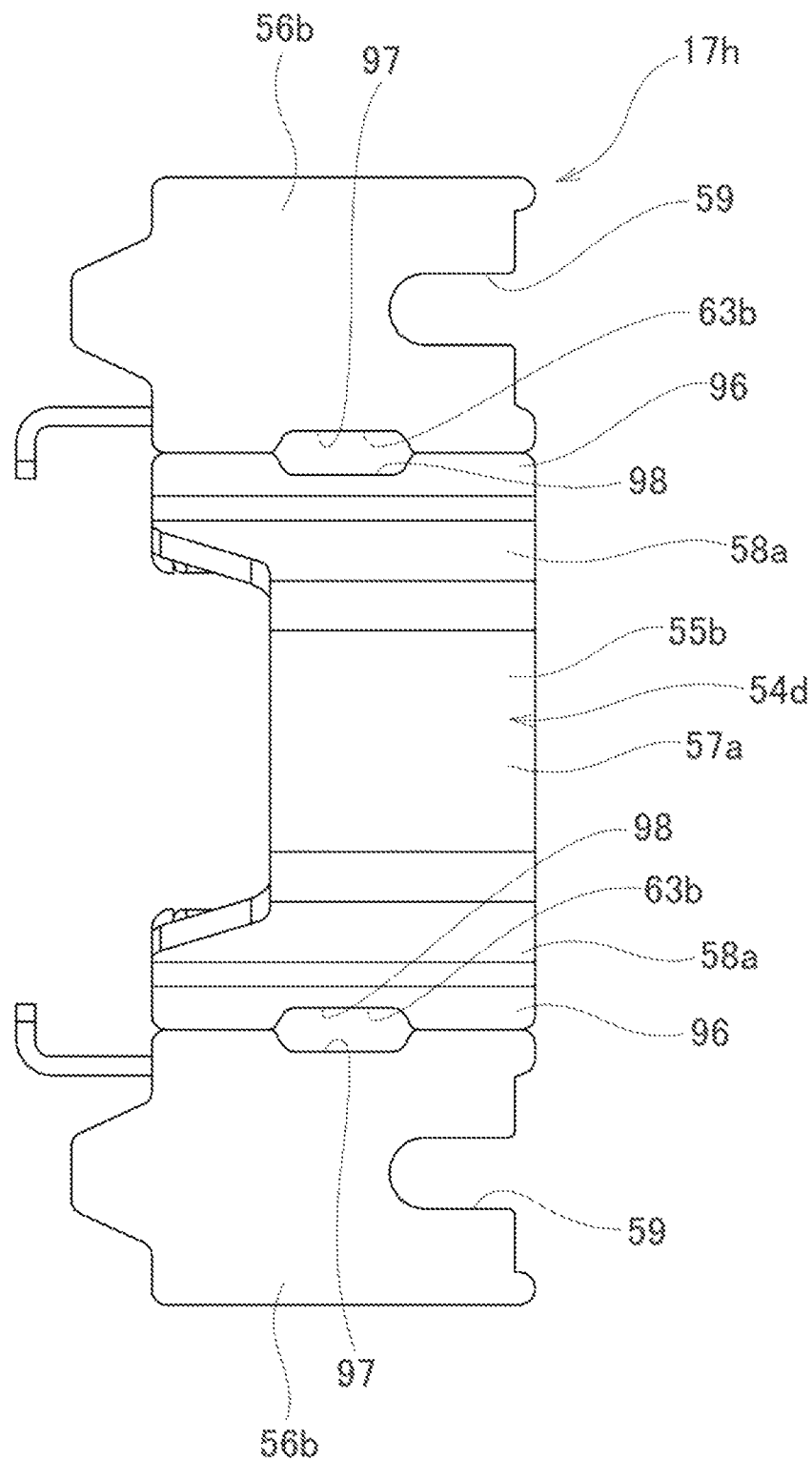
FIG. 49 is a view similar to FIG. 42 and illustrates the support bracket illustrated in FIG. 48.
Figure 50:
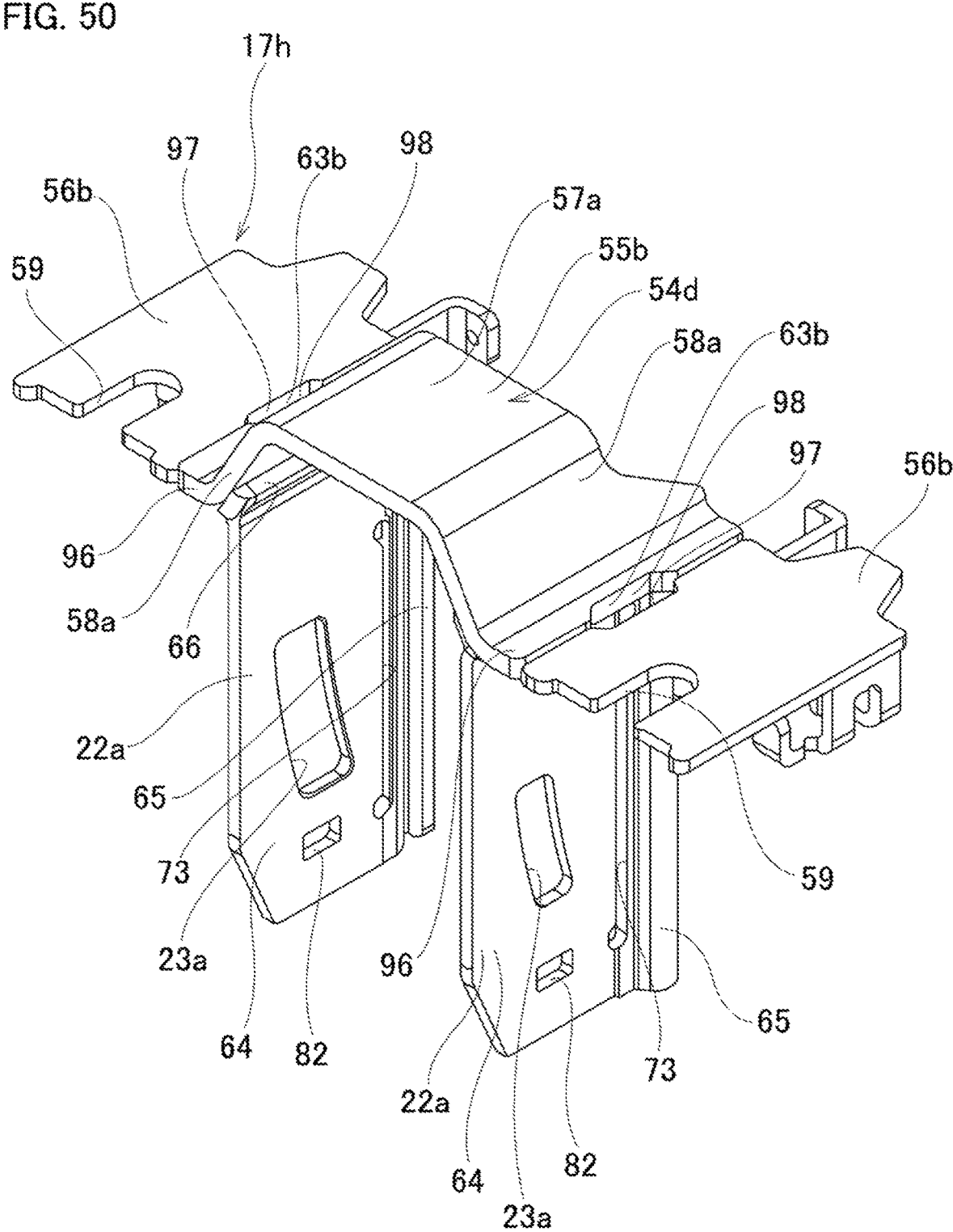
FIG. 50 is a view similar to FIG. 44 and illustrates the support bracket illustrated in FIG. 48.

FIG. 48 to FIG. 50 illustrate a third reference example related to the present invention. The support bracket 17*h* of the present example as well, installation-side slits 63*b* are provided in the middle section in the forward-backward direction of the joint sections between the bridge plate section 55*b* and the pair of side plate sections 56*b* of the installation plate section 54*d* so as to extend in the forward-backward direction that passes through the sections in the thickness direction. The structure of the pair of side plate sections 56*b* is the same as the structure of the second reference example.

In the present example, a pair of bridge-side recessed sections 98 which is recessed inward in the width direction is provided in the middle section in the forward-backward direction of both end surfaces in the width direction of the bridge plate section 55*b*. Further, the sections other than the bridge-side recessed sections 98 of both end surfaces in the width direction of the bridge plate section 55*b* and the sections other than the recessed sections 97 on the side plate side of the inner end surfaces in the width direction of the pair of side plate sections 56*b* are fixed by welding. In this fixed state, the installation-side slits 63*b* are formed by the bottom surfaces of the bridge-side recessed sections 98 and the bottom surfaces of the recessed sections 97 on the side plate side. The construction and functions of the other parts are the same as in the first example of an embodiment of the present invention and the first and second reference examples.

Fourth Reference Example

Figure 51:
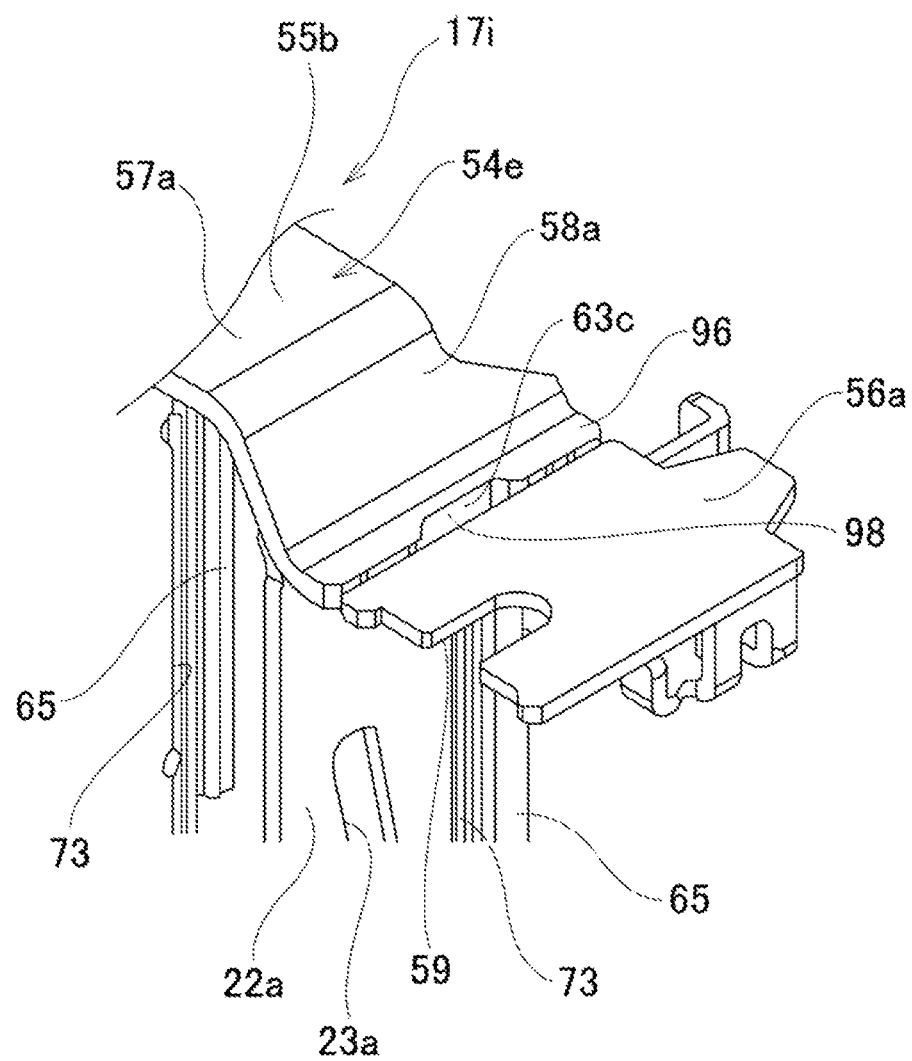
FIG. 51 is a view similar to FIG. 41 and illustrates a support bracket of a fourth example of a reference example.
Figure 52:
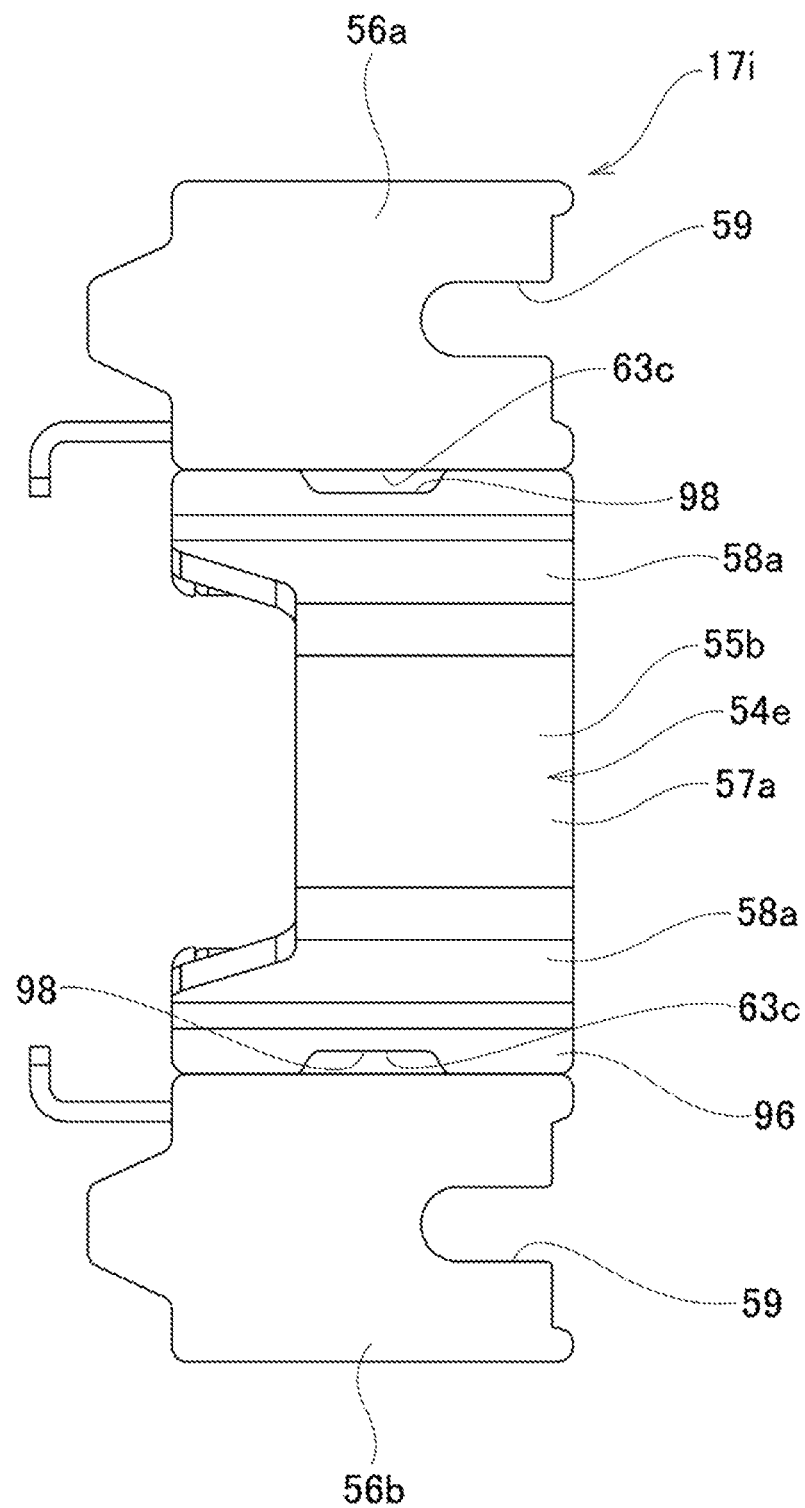
FIG. 52 is a view similar to FIG. 42 and illustrates the support bracket illustrated in FIG. 51.
Figure 53:
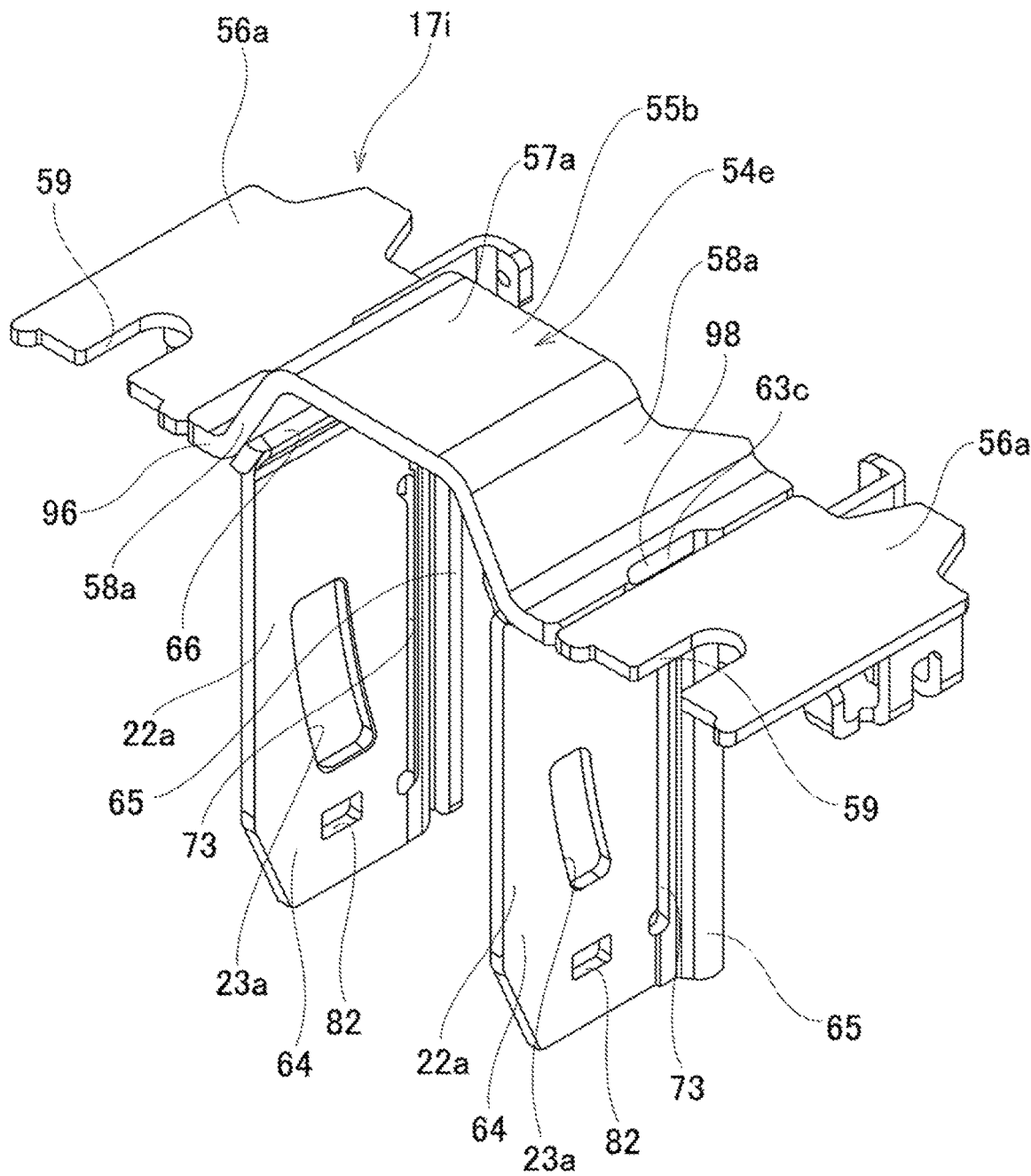
FIG. 53 is a view similar to FIG. 44 and illustrates the support bracket illustrated in FIG. 51.

FIG. 51 to FIG. 53 illustrate a fourth reference example related to the present invention. In the support bracket 17*e* of the present example as well, installation-side slits 63*c* are provided in the middle section in the forward-backward direction of the joint sections between the bridge plate section 55*b* and the pair of side plate sections 56*b* of the installation plate section 54*e* so as to extend in the forward-backward direction that passes through the sections in the thickness direction. The structure of the bride plate section 55b is the same as the structure of the third reference example, and the structure of the pair of side plate sections 56a is the same as the structure of the first reference example.

In the present example having a configuration as described above, the sections other than the bridge-side recessed sections 98 of both end surfaces in the width direction of the bridge plate section 55b and the inner end surfaces in the width direction of the pair of side plate sections 56a are fixed by welding. In this fixed state, the installation-side slit 63c is formed by the bottom surfaces of the bridge-side recessed sections 98 and sections that face in the width direction to the bridge-side recessed sections 98 of the inner end surfaces in the width direction of the pair of side plate sections 56a. The construction and functions of the other parts are the same as in the first example of an embodiment of the present invention and the first to third reference examples.

INDUSTRIAL FIELD OF USE

The present invention can be widely applied to configurations for supporting a steering column of a steering apparatus with respect to a body of vehicles such as cars.

EXPLANATION OF REFERENCE NUMBERS

1 Steering wheel
2 Steering shaft
3 Steered wheel
4 Steering column
5 Steering force assisting apparatus
6 Tie rods
7 Steering gear unit
8 Inner shaft
9 Outer shaft
10 Inner column
11, 11a, 11b Outer column
12 Gear housing
13 Output shaft
14 Lower bracket
15 Vehicle body
16 Tilt axis
17, 17a, 17b, 17c, 17d, 17f, 17g, 17h, 17i Support bracket
18 Locking capsule
19 Slit
20 Clamp sections
21, 21a Telescopic adjustment long hole
22, 22a, 22b, 22c Support plate section
23, 23a Tilt adjustment long hole
24, 24a Adjustment rod
25 Adjustment nut
26, 26a Adjustment lever
27 Anchor section
28 Universal joint
29 Intermediate shaft
30 Universal joint
31 Input shaft
32 Electric motor
33, 33a Lock through hole
34 Held section body
35 Cylindrical section
36 Slit in the axial direction
37a, 37b Slit in the circumferential direction
38 Clamp section
39 Overhang plate section
40 Pressing surface
41 Reinforcement bridge section
42 Reinforcement plate section
43a, 43b Connecting section
44 Flat plate section
45 Lower extension section
46 Notch
47 Space
49a, 49b Torque transmission surface
50a, 50b Protrusion section
51 Reinforcing rib
52 Reinforcing plate connecting section
53 Recessed section
54, 54a, 54b, 54c Installation plate section
55, 55a, 55b Bridge plate section
56, 56a, 56b Side plate section
57, 57a Center plate section
58, 58a Side inclined plate section
59 Locking notch
60 First rib
61 Second rib
62 Third rib
63, 63a, 63b, 63c Installation-side slit
64, 64a, 64b Supporting plate body
65, 65a, 65b, 65c, 65d, 65e, 65f Reinforcing member
66, 66a Lug section for welding
67 First reinforcing element
68 Second reinforcing element
69 First reinforcing element
70 Second reinforcing element
71 Third reinforcing element
72 Slit in the forward-backward direction
73, 73a, 73b, 73c Slit in the up-down direction
74 Upper side slit
75, 75a, 75b, 75c Lower side slit
76 Intermediate slit
77 Welded section
78 Cam apparatus
80 Fixing section
81 Mounting flange
82, 82a, 82b Second slit in the forward-backward direction
83 Front side slit
84 Rear side slit
85 Front-end edge
86 Upper plate section
87 Inclined plate section
88 Seating surface
89 Extension plate section
90 Upper slit
91 Thrust bearing
92 Pressing plate
93 Engagement piece
94 Drive-side cam
95 Driven-side cam
96 Joint plate section
97 Recessed section on the side plate side
98 Recessed section on the bridge side

The invention claimed is:
1. A support bracket for steering apparatus comprising:
an installation section enabling to be fixed to a vehicle body;
a pair of support plate sections arranged separately and oppositely from each other in a width direction of the vehicle body, and respectively comprising an upper end section connected to a bottom surface of the installation section and a fixed-side through hole; and a reinforcing member provided in at least one of positions that are shifted to a front side or a rear side than the fixed-side through hole of each of the pair of support plate sections, extending in an up-down direction, and comprising an upper end edge as a free end, wherein the installation section comprises an installation plate section having a bridge plate section and a pair of side plate sections provided on both sides of the bridge plate sections in the width direction of the vehicle body, and wherein an installation-side slit is provided in a middle section in a forward-backward direction of an inner end section in the width direction of at least one side plate section of the pair of side plate sections, the installation-side slit extending in the forward-backward direction and passing through the at least one side plate section in a thickness direction thereof.

2. The support bracket for steering apparatus according to claim 1, wherein a pair of ribs is provided separately in the forward-backward direction at an inner end section in the width direction of the at least one side plate section and at a part of both end sections in the width direction of the bridge plate section continuous with the inner end section in the width direction of the at least one side plate section.

3. The support bracket for steering apparatus according to claim 2, wherein at least one rib of the pair of ribs is arranged to extend in the width direction of the vehicle body on the bridge plate section.

4. A steering apparatus comprising:
a support bracket for the steering apparatus according to claim 1; and
a steering column for rotatably supporting a steering shaft inside thereof,
wherein the steering column is supported by a vehicle body through the support bracket.

5. A support bracket for steering apparatus comprising:
an installation section enabling to be fixed to a vehicle body;
a pair of support plate sections arranged separately and oppositely from each other in a width direction of the vehicle body, and respectively comprising an upper end section connected to a bottom surface of the installation section and a fixed-side through hole; and
a reinforcing member provided in at least one of positions that are shifted to a front side or a rear side than the fixed-side through hole of each of the pair of support plate sections, extending in an up-down direction, and comprising an upper end edge as a free end,
wherein the reinforcing member comprise a protrusion extending in the up-down direction, the protrusion being convex on an outside with respect to the width direction of the vehicle body and concave on an inside with respect to the width direction of the vehicle body.

6. The support bracket for steering apparatus according to claim 5, wherein a slit in the up-down direction passing through each one of the pair of support plate sections in the width direction is respectively provided therein at a section located between the reinforcing member and the fixed-side through hole with respect to the forward-backward direction and that is aligned with the fixed-side through hole at least in the up-down direction.

7. The support bracket for steering apparatus according to claim 6, wherein the slit in the up-down direction comprise an upper side slit, a lower side slit, and an intermediate slit connecting the upper side slit and the lower side slit in the up-down direction, the upper side slit having an approximately circular shape, or a long circular shape extending in the forward-backward direction, or being made as a long hole extending in the forward-backward direction, or as a long hole inclining upward as going toward the rear, as seen from the width direction, and the lower side slit having an approximately circular shape, or a long circular shape extending in the forward-backward direction, or being made as a long hole extending in the forward-backward direction, or as a long hole inclining upward as going toward the rear, as seen from the width direction.

8. The support bracket for steering apparatus according to claim 7, wherein a slit in the forward-backward direction is provided in a section located under the fixed-side through hole of each of the pair of support plate sections that is aligned with the lower side slit of the slit in the up-down direction with respect to the up-down direction.

9. A steering apparatus comprising:
a support bracket for the steering apparatus according to claim 5; and
a steering column for rotatably supporting a steering shaft inside thereof,
wherein the steering column is supported by a vehicle body through the support bracket.

10. A support bracket for steering apparatus comprising:
an installation section enabling to be fixed to a vehicle body;
a pair of support plate sections arranged separately and oppositely from each other in a width direction of the vehicle body, and respectively comprising an upper end section connected to a bottom surface of the installation section and a fixed-side through hole; and
a reinforcing member provided in at least one of positions that are shifted to a front side or a rear side than the fixed-side through hole of each of the pair of support plate sections, extending in an up-down direction, and comprising an upper end edge as a free end,
wherein a slit in the up-down direction passing through each one of the pair of support plate sections in the width direction is respectively provided therein at a section located between the reinforcing member and the fixed-side through hole with respect to the forward-backward direction and that is aligned with the fixed-side through hole at least in the up-down direction.

11. The support bracket for steering apparatus according to claim 10, wherein the slit in the up-down direction comprise an upper side slit, a lower side slit, and an intermediate slit connecting the upper side slit and the lower side slit in the up-down direction, the upper side slit having an approximately circular shape, or a long circular shape extending in the forward-backward direction, or being made as a long hole extending in the forward-backward direction, or as a long hole inclining upward as going toward the rear, as seen from the width direction, and the lower side slit having an approximately circular shape, or a long circular shape extending in the forward-backward direction, or being made as a long hole extending in the forward-backward direction, or as a long hole inclining upward as going toward the rear, as seen from the width direction.

12. The support bracket for steering apparatus according to claim 11, wherein a slit in the forward-backward direction is provided in a section located under the fixed-side through hole of each of the pair of support plate sections that is aligned with the lower side slit of the slit in the up-down direction with respect to the up-down direction.

13. A steering apparatus comprising:
a support bracket for the steering apparatus according to claim 10; and a steering column for rotatably supporting a steering shaft inside thereof, wherein the steering column is supported by a vehicle body through the support bracket.

14. A support bracket for steering apparatus comprising:
an installation section enabling to be fixed to a vehicle body;
a pair of support plate sections arranged separately and oppositely from each other in a width direction of the vehicle body, and respectively comprising an upper end section connected to a bottom surface of the installation section and a fixed-side through hole; and
a reinforcing member provided in at least one of positions that are shifted to a front side or a rear side than the fixed-side through hole of each of the pair of support plate sections, extending in an up-down direction, and comprising an upper end edge as a free end,
wherein the installation section comprises an installation plate section having a bridge plate section and a pair of side plate sections provided on both sides of the bridge plate sections in the width direction of the vehicle body, and
wherein a pair of ribs is provided separately in the forward-backward direction at an inner end section in the width direction of the at least one side plate section and at a part of both end sections in the width direction of the bridge plate section continuous with the inner end section in the width direction of the at least one side plate section.

15. The support bracket for steering apparatus according to claim 14, wherein at least one rib of the pair of ribs is arranged to extend in the width direction of the vehicle body on the bridge plate section.

16. The support bracket for steering apparatus according to claim 14, wherein the reinforcing member comprise a protrusion extending in the up-down direction, the protrusion being convex on an outside with respect to the width direction of the vehicle body and concave on an inside with respect to the width direction of the vehicle body.

17. The support bracket for steering apparatus according to claim 14, wherein a slit in the up-down direction passing through each one of the pair of support plate sections in the width direction is respectively provided therein at a section located between the reinforcing member and the fixed-side through hole with respect to the forward-backward direction and that is aligned with the fixed-side through hole at least in the up-down direction.

18. The support bracket for steering apparatus according to claim 17, wherein the slit in the up-down direction comprise an upper side slit, a lower side slit, and an intermediate slit connecting the upper side slit and the lower side slit in the up-down direction, the upper side slit having an approximately circular shape, or a long circular shape extending in the forward-backward direction, or being made as a long hole extending in the forward-backward direction, or as a long hole inclining upward as going toward the rear, as seen from the width direction, and the lower side slit having an approximately circular shape, or a long circular shape extending in the forward-backward direction, or being made as a long hole extending in the forward-backward direction, or as a long hole inclining upward as going toward the rear, as seen from the width direction.

19. The support bracket for steering apparatus according to claim 18, wherein a slit in the forward-backward direction is provided in a section located under the fixed-side through hole of each of the pair of support plate sections that is aligned with the lower side slit of the slit in the up-down direction with respect to the up-down direction.

20. A steering apparatus comprising:
a support bracket for the steering apparatus according to claim 14; and
a steering column for rotatably supporting a steering shaft inside thereof,
wherein the steering column is supported by a vehicle body through the support bracket.

21. The support bracket for steering apparatus according to claim 14, wherein an installation-side slit is provided in a middle section in a forward-backward direction of an inner end section in the width direction of at least one side plate section of the pair of side plate sections, the installation-side slit extending in the forward-backward direction and passing through the at least one side plate section in a thickness direction thereof.

* * * * *